US011424882B2

United States Patent
Wu et al.

(10) Patent No.: US 11,424,882 B2
(45) Date of Patent: Aug. 23, 2022

(54) METHOD AND DEVICE FOR WIRELESS COMMUNICATION IN UE AND BASE STATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 94 days.

(21) Appl. No.: 16/917,929

(22) Filed: Jul. 1, 2020

(65) Prior Publication Data
US 2020/0366432 A1 Nov. 19, 2020

Related U.S. Application Data

(63) Continuation of application No. PCT/CN2019/070213, filed on Jan. 3, 2019.

(30) Foreign Application Priority Data

Jan. 5, 2018 (CN) .......................... 201810011633.0

(51) Int. Cl.
*H04L 1/00* (2006.01)
*H04L 5/00* (2006.01)
(Continued)

(52) U.S. Cl.
CPC .......... *H04L 5/0048* (2013.01); *H04L 5/0094* (2013.01); *H04W 24/10* (2013.01); *H04W 72/0446* (2013.01); *H04W 72/0453* (2013.01)

(58) Field of Classification Search
CPC ... H04L 5/0053; H04L 5/0094; H04L 5/0055; H04L 5/0007; H04L 5/0044;
(Continued)

(56) References Cited

U.S. PATENT DOCUMENTS

| 2014/0056243 A1 | 2/2014 | Pelletier et al. |
| 2015/0181574 A1* | 6/2015 | Lee ...................... H04J 11/0069 370/329 |
| 2019/0140769 A1* | 5/2019 | Rong .................... H04L 1/0052 |

FOREIGN PATENT DOCUMENTS

| CN | 102244564 A | 11/2011 |
| CN | 102739593 A | 10/2012 |

(Continued)

OTHER PUBLICATIONS

First Office Action in application No. IN202017032468 dated Jun. 30, 2021.
(Continued)

*Primary Examiner* — Dady Chery

(57) ABSTRACT

A method and a device in a UE and a base station for wireless communications are provided in the present disclosure. A UE first receives a first signaling, the first signaling is used for indicating M first-type time window(s) in a first sub-band, and the M first-type time window(s) in the first sub-band is(are) reserved for a first-type reference signal, M being a positive integer; the UE then determines that it is only needed to receive the first-type reference signal in M1 first-type time window(s) of the M first-type time window(s) in a first sub-band, M1 being a positive integer no greater than the M. The present disclosure is advantageous in avoiding possible loss of performance in Unlicensed Spectrum resulting from belated determination of beam link failure due to the fact that the reference signal is not transmitted on time.

20 Claims, 25 Drawing Sheets

(51) Int. Cl.
*H04W 24/10* (2009.01)
*H04W 72/04* (2009.01)

(58) Field of Classification Search
CPC H04L 1/0038; H04W 56/005; H04W 88/023; H04W 88/08; H04W 92/10; H04W 72/04; H04W 72/12; H04W 72/042; H04W 72/1268; H04W 24/08; H04W 72/0446; H04W 72/0453; H04W 48/16; H04W 72/044; H04W 72/085; H04B 7/0617; H04B 7/0695
See application file for complete search history.

(56) References Cited

FOREIGN PATENT DOCUMENTS

| | | |
|---|---|---|
| CN | 104219180 A | 12/2014 |
| CN | 106685498 | 5/2017 |
| CN | 106877984 A | 6/2017 |
| WO | 2014031989 A | 2/2014 |
| WO | 2017026985 A | 2/2017 |

OTHER PUBLICATIONS

Discussion on beam recovery mechanism R1-1710185 ZTE, Jun. 30, 2017.
ISR in application No. PCT/CN2019/070213 dated Feb. 18, 2019.
ISR application No. PCT/CN2017/070213 dated Feb. 18, 2019.
First Office Action No. 201810011633.0 dated Jun. 3, 2020.
First Search Report No. 201810011633.0 dated May 26, 2020.

\* cited by examiner

METHOD AND DEVICE FOR WIRELESS COMMUNICATION IN UE AND BASE STATION

CROSS REFERENCE TO RELATED APPLICATIONS

This application is a continuation of International Application No. PCT/CN2019/070213, filed Jan. 3, 2019, claims the priority benefit of Chinese Patent Application No. 201810011633.0, filed on Jan. 5, 2018, the full disclosure of which is incorporated herein by reference.

BACKGROUND

Technical Field

The present disclosure relates to transmission methods and devices in wireless communication systems, and in particular to a communication scheme and device that support data transmission on Unlicensed Spectrum.

Related Art

Application scenarios of future wireless communication systems are becoming increasingly diversified, and different application scenarios have different performance demands on systems. In order to meet different performance requirements of various application scenarios, the study item of access to Unlicensed Spectrum under New Radio (NR) was approved at the 3rd Generation Partner Project (3GPP) Radio Access Network (RAN) #75th plenary session, which is expected to be completed in R15 version and a work item (WI) will be initiated in R16 to standardize relevant techniques. To ensure compatibility with other access technologies on Unlicensed Spectrum, in Long Term Evolution (LTE) License Assisted Access (LAA) project, a transmitter (i.e., a base station or a User Equipment) is supposed to perform Listen Before Talk (LBT) before transmitting data on Unlicensed Spectrum to avoid interference to other ongoing wireless transmissions on Unlicensed Spectrum.

Massive Multi-Input Multi-Output (MIMO) is another hot topic when it comes to NR system. In the massive MIMO, multiple antennas based on beamforming form a narrow beam which points to a particular direction to improve the quality of communication. In NR system, massive MIMO will be applied in Unlicensed Spectrum on millimeter wave band. Since the introduction of massive MIMO, beam-based communications will be a specific part of the NR system, particularly in millimeter eave band. A narrow beam is of great benefit to compensating for large pathloss in millimeter wave band with massive MIMO multi-antenna gains, but there is some deficiency of beam management and beam recovery. In 5G systems, the concept of Beam Link Failure and a mechanism of immediate and effective Beam Recovery are under discussion. A User Equipment (UE) periodically detects the current channel qualities of multiple serving beams, as long as the channel quality of each serving beam gets poorer, the UE sends Beam Recovery Request to a base station and meanwhile recommends candidate ones as serving beams.

Discussions about beam management and beam recovery mechanisms in 3GPP at present mainly apply to Licensed Spectrum. When applied in Unlicensed Spectrum, proper adjustments will be requested to be made to the current mechanisms so as to fit the features of Unlicensed Spectrum.

SUMMARY

Inventors find through researches that when these mechanisms are applied to Unlicensed Spectrum, transmission of reference signals used for beam management and beam recovery may not be guaranteed due to the uncertainty of LBT. If relevant reference signals cannot be detected, the UE is unable to determine the channel quality of the current serving beam, as a result, beam management and beam recovery cannot be effectively implemented.

In view of the above discovery, the present disclosure proposes a solution. It should be noted that the embodiments of a User Equipment (UE) in the present disclosure and characteristics in the embodiments may be applied to a base station if there is no conflict, and vice versa. And the embodiments of the present disclosure and the characteristics in the embodiments may be mutually combined if no conflict is incurred.

The present disclosure provides a method in a UE for wireless communications, comprising:

receiving a first signaling, the first signaling being used to indicate M first-type time window(s) in a first sub-band, the M first-type time window(s) in the first sub-band being reserved for a first-type reference signal, and M being a positive integer; and determining that it is only needed to receive the first-type reference signal in M1 first-type time window(s) of the M first-type time window(s) in the first sub-band, M1 being a positive integer no greater than the M;

in instances in which a first set of conditions is met, a first radio signal is transmitted in a first time-frequency resource;

herein, the first set of conditions is used to determine whether the first radio signal is transmitted, and the first set of conditions comprises that the M1 is no greater than a first threshold.

In one embodiment, the above method is characterized in that the first-type reference signal is a periodic reference signal used for detecting the channel quality of serving beams, and the first radio signal is Beam Recovery Request (BRR) or Beam Failure Recovery reQuest (BFRQ). The UE determines whether the first set of conditions is satisfied according to the first-type reference signal, and will transmit the first radio signal once the first set of conditions is met. As described in the above method, the first set of conditions comprises a number of failed transmissions of the first-type reference signal, which is advantageous in that the case of the UE's failing to make a timely determination and to transmit the first radio signal due to belated transmission of the first-type reference signal caused by LBT or other matters can be avoided in Unlicensed Spectrum, therefore, the UE can still make a quick response to Beam Link Failure in Unlicensed Spectrum.

According to one aspect of the present disclosure, comprising:

receiving M1 first-type reference sub-signal(s) respectively in the M1 first-type time window(s);

herein, the first-type reference signal comprises the M1 first-type reference sub-signal(s), and the M1 first-type time window(s) is(are) respectively reserved for the M1 first-type reference sub-signal(s); measurement(s) on the M1 first-type reference sub-signal(s) is(are) respectively used to determine M1 first-type value(s), among the M1 first-type value(s) there is(are) M3 first-type value(s) lower than a second threshold; the first set of conditions comprises that M3 is greater than a third threshold.

In one embodiment, an advantage of the above method is that a number of successful transmissions of the first-type reference signal of which received qualities are lower than the second threshold and a number of failed transmissions of the first-type reference signal are both taken into account in the first set of conditions, thus enabling the UE to make a determination on and respond to Beam Link Failure more flexibly and precisely.

According to one aspect of the present disclosure, comprising:

monitoring M second radio signal(s) respectively in M second time-frequency resource(s), and detecting M2 second radio signal(s) of the M second radio signal(s);

herein, the M second radio signal(s) respectively corresponds(correspond) to the M first-type time window(s); among the M2 second radio signal(s) there is(are) M1 second radio signal(s) being respectively used to indicate that the first-type reference signal is to be received in the M1 first-type time window(s); M2 is equal to M1, or, the M2 is greater than the M1 and second radio signal(s) of the M2 second radio signals other than the M1 second radio signal(s) is(are) respectively used to indicate that the first-type reference signal is not to be received in (a) corresponding first-type time window(s).

According to one aspect of the present disclosure, comprising:

performing a first-type access detection in the first sub-band;

herein, the UE transmits the first radio signal in the first time-frequency resource, the first radio signal being transmitted in the first sub-band, and the first-type access detection comprising:

performing Q energy detection(s) respectively in Q time sub-pool(s) in the first sub-band to obtain Q detection value(s);

herein, each of Q1 detection value(s) among the Q detection value(s) is lower than a fourth threshold; Q being a positive integer, and Q1 being a positive integer no greater than the Q.

According to one aspect of the present disclosure, comprising:

monitoring a second signaling in a third time-frequency resource;

herein, the second signaling is used to determine that the first radio signal is correctly received.

According to one aspect of the present disclosure, wherein the first radio signal is used to determine a first antenna port group, and any transmission antenna port of the second signaling is Quasi Co-Located (QCL) with one antenna port in the first antenna port group.

According to one aspect of the present disclosure, comprising:

receiving N second-type reference signal(s);

herein, measurement(s) on the N second-type reference signal(s) is(are) used to determine the first radio signal, N being a positive integer.

According to one aspect of the present disclosure, comprising:

receiving first information;

herein, the first information is used to determine the first set of conditions.

The present disclosure provides a method in a base station for wireless communications, comprising:

transmitting a first signaling, the first signaling being used to indicate M first-type time window(s) in a first sub-band, the M first-type time window(s) in the first sub-band being reserved for a first-type reference signal, and M being a positive integer;

determining that it is only needed to transmit the first-type reference signal in M1 first-type time window(s) of the M first-type time window(s) in the first sub-band, M1 being a positive integer no greater than the M; and monitoring a first radio signal in a first time-frequency resource;

herein, a first set of conditions is used to determine whether the first radio signal is transmitted, and the first set of conditions comprises that the M1 is no greater than a first threshold.

According to one aspect of the present disclosure, comprising:

transmitting M1 first-type reference sub-signal(s) respectively in the M1 first-type time window(s);

herein, the first-type reference signal comprises the M1 first-type reference sub-signal(s), and the M1 first-type time window(s) is(are) respectively reserved for the M1 first-type reference sub-signal(s); measurement(s) on the M1 first-type reference sub-signal(s) is(are) respectively used to determine M1 first-type value(s), among the M1 first-type value(s) there is(are) M3 first-type value(s) lower than a second threshold; the first set of conditions comprises that M3 is greater than a third threshold.

According to one aspect of the present disclosure, comprising:

transmitting M2 second radio signal(s) of M second radio signal(s) respectively in M2 second time-frequency resource(s);

herein, the M second radio signal(s) respectively corresponds(correspond) to the M first-type time window(s); among the M2 second radio signal(s) there is(are) M1 second radio signal(s) being respectively used to indicate that the first-type reference signal is to be received in the M1 first-type time window(s); M2 is equal to M1, or, the M2 is greater than the M1 and second radio signal(s) of the M2 second radio signals other than the M1 second radio signal(s) is(are) respectively used to indicate that the first-type reference signal is not to be received in (a) corresponding first-type time window(s).

According to one aspect of the present disclosure, comprising:

performing M second-type access detection(s) respectively in the first sub-band;

herein, start time(s) for the M first-type time window(s) is(are) no earlier than end time(s) for the M second-type access detection(s) respectively; a given second-type access detection comprises:

performing P energy detection(s) respectively in P time sub-pool(s) in the first sub-band to obtain P detection value(s);

herein, the given second-type access detection is one of the M second-type access detection(s), and each of P1 detection value(s) among the P detection value(s) is lower than a fifth threshold; P is a positive integer, and P1 is a non-negative integer no greater than the P.

According to one aspect of the present disclosure, comprising:

transmitting a second signaling in a third time-frequency resource;

herein, the first radio signal is detected in the first time-frequency resource, and the second signaling is used to determine that the first radio signal is correctly received.

According to one aspect of the present disclosure, wherein the first radio signal is used to determine a first antenna port group, and any transmission antenna port of the second signaling is QCL with one antenna port in the first antenna port group.

According to one aspect of the present disclosure, comprising:

performing a third-type access detection in the first sub-band;

herein, a start time for time resources occupied by the third time-frequency resource is no earlier than an end time for the third-type access detection; the third-type access detection comprises:

performing W energy detection(s) respectively in W time sub-pool(s) in the first sub-band to obtain W detection value(s);

herein, each of W1 detection value(s) among the W detection value(s) is lower than a seventh threshold; W is a positive integer, and W1 is a positive integer no greater than the W.

According to one aspect of the present disclosure, comprising:

transmitting N second-type reference signal(s);

herein, measurement(s) on the N second-type reference signal(s) is(are) used to determine the first radio signal, N being a positive integer.

According to one aspect of the present disclosure, comprising:

transmitting first information;

herein, the first information is used to determine the first set of conditions.

The present disclosure provides a UE for wireless communications, comprising:

a first receiver, which receives a first signaling, the first signaling being used to indicate M first-type time window(s) in a first sub-band, the M first-type time window(s) in the first sub-band being reserved for a first-type reference signal, and M being a positive integer;

a first processor, which determines that it is only needed to receive the first-type reference signal in M1 first-type time window(s) of the M first-type time window(s) in the first sub-band, M1 being a positive integer no greater than the M; and a first transmitter, which transmits a first radio signal in a first time-frequency resource if a first set of conditions is met;

herein, the first set of conditions is used to determine whether the first radio signal is transmitted; the first set of conditions comprises that the M1 is no greater than a first threshold.

In one embodiment, the above UE for wireless communications is characterized in that the first receiver receives M1 first-type reference sub-signal(s) respectively in the M1 first-type time window(s); wherein the first-type reference signal comprises the M1 first-type reference sub-signal(s), and the M1 first-type time window(s) is(are) respectively reserved for the M1 first-type reference sub-signal(s); measurement(s) on the M1 first-type reference sub-signal(s) is(are) respectively used to determine M1 first-type value(s), among the M1 first-type value(s) there is(are) M3 first-type value(s) lower than a second threshold; the first set of conditions comprises that M3 is greater than a third threshold.

In one embodiment, the above UE for wireless communications is characterized in that the first receiver monitors M second radio signal(s) respectively in M second time-frequency resource(s) and detects M2 second radio signal(s) of the M second radio signal(s); wherein the M second radio signal(s) respectively corresponds(correspond) to the M first-type time window(s); among the M2 second radio signal(s) there is(are) M1 second radio signal(s) being respectively used to indicate that the first-type reference signal is to be received in the M1 first-type time window(s); M2 is equal to M1, or, the M2 is greater than the M1 and second radio signal(s) of the M2 second radio signals other than the M1 second radio signal(s) is(are) respectively used to indicate that the first-type reference signal is not to be received in (a) corresponding first-type time window(s).

In one embodiment, the above UE for wireless communications is characterized in that the first receiver performs a first-type access detection in the first sub-band; wherein the UE transmits the first radio signal in the first time-frequency resource, the first radio signal being transmitted in the first sub-band, and the first-type access detection comprising:

performing Q energy detection(s) respectively in Q time sub-pool(s) in the first sub-band to obtain Q detection value(s);

herein, each of Q1 detection value(s) among the Q detection value(s) is lower than a fourth threshold; Q being a positive integer, and Q1 being a positive integer no greater than the Q.

In one embodiment, the above UE for wireless communications is characterized in that the first receiver monitors a second signaling in a third time-frequency resource; wherein the second signaling is used to determine that the first radio signal is correctly received.

In one embodiment, the above UE for wireless communications is characterized in that the first radio signal is used to determine a first antenna port group, and any transmission antenna port of the second signaling is QCL with one antenna port in the first antenna port group.

In one embodiment, the above UE for wireless communications is characterized in that the first receiver receives N second-type reference signal(s); wherein measurement(s) on the N second-type reference signal(s) is(are) used to determine the first radio signal, N being a positive integer.

In one embodiment, the above UE for wireless communications is characterized in that the first receiver receives first information; wherein the first information is used to determine the first set of conditions.

The present disclosure provides a base station for wireless communications, comprising:

a second transmitter, which transmits a first signaling, the first signaling being used to indicate M first-type time window(s) in a first sub-band, the M first-type time window(s) in the first sub-band being reserved for a first-type reference signal, and M being a positive integer;

a second processor, which determines that it is only needed to transmit the first-type reference signal in M1 first-type time window(s) of the M first-type time window(s) in the first sub-band, M1 being a positive integer no greater than the M; and a second receiver, which monitors a first radio signal in a first time-frequency resource;

herein, a first set of conditions is used to determine whether the first radio signal is transmitted, and the first set of conditions comprises that the M1 is no greater than a first threshold.

In one embodiment, the above base station for wireless communications is characterized in that the second transmitter transmits M1 first-type reference sub-signal(s) respectively in the M1 first-type time window(s); wherein the first-type reference signal comprises the M1 first-type reference sub-signal(s), and the M1 first-type time window (s) is(are) respectively reserved for the M1 first-type reference sub-signal(s); measurement(s) on the M1 first-type reference sub-signal(s) is(are) respectively used to determine M1 first-type value(s), among the M1 first-type value (s) there is(are) M3 first-type value(s) lower than a second threshold; the first set of conditions comprises that M3 is greater than a third threshold.

In one embodiment, the above base station for wireless communications is characterized in that the second transmitter transmits M2 second radio signal(s) of M second radio signal(s) respectively in M2 second time-frequency resource(s); wherein the M second radio signal(s) respectively corresponds(correspond) to the M first-type time window(s); among the M2 second radio signal(s) there is(are) M1 second radio signal(s) being respectively used to indicate that the first-type reference signal is to be received in the M1 first-type time window(s); M2 is equal to M1, or, the M2 is greater than the M1 and second radio signal(s) of the M2 second radio signals other than the M1 second radio signal(s) is(are) respectively used to indicate that the first-type reference signal is not to be received in (a) corresponding first-type time window(s).

In one embodiment, the above base station for wireless communications is characterized in that the second receiver performs M second-type access detection(s) respectively in the first sub-band; wherein start time(s) for the M first-type time window(s) is(are) no earlier than end time(s) for the M second-type access detection(s) respectively; a given second-type access detection comprises:
  performing P energy detection(s) respectively in P time sub-pool(s) in the first sub-band to obtain P detection value(s);
  herein, the given second-type access detection is one of the M second-type access detection(s), and each of P1 detection value(s) among the P detection value(s) is lower than a fifth threshold; P is a positive integer, and P1 is a non-negative integer no greater than the P.

In one embodiment, the above base station for wireless communications is characterized in that the second transmitter transmits a second signaling in a third time-frequency resource; wherein the first radio signal is detected in the first time-frequency resource, and the second signaling is used to determine that the first radio signal is correctly received.

In one embodiment, the above base station for wireless communications is characterized in that the first radio signal is used to determine a first antenna port group, and any transmission antenna port of the second signaling is QCL with one antenna port in the first antenna port group.

In one embodiment, the above base station for wireless communications is characterized in that the second receiver performs a third-type access detection in the first sub-band; wherein a start time for time resources occupied by the third time-frequency resource is no earlier than an end time for the third-type access detection; the third-type access detection comprises:
  performing W energy detection(s) respectively in W time sub-pool(s) in the first sub-band to obtain W detection value(s);
  herein, each of W1 detection value(s) among the W detection value(s) is lower than a seventh threshold; W is a positive integer, and W1 is a positive integer no greater than the W.

In one embodiment, the above base station for wireless communications is characterized in that the second transmitter transmits N second-type reference signal(s); wherein measurement(s) on the N second-type reference signal(s) is(are) used to determine the first radio signal, N being a positive integer.

In one embodiment, the above base station for wireless communications is characterized in that the second transmitter transmits first information; wherein the first information is used to determine the first set of conditions.

In one embodiment, the present disclosure is advantageous over conventional schemes in the following aspects:
  In Unlicensed Spectrum, the UE not only determines whether Beam Link Failure occurs but also considers how many times a reference signal used for detecting the channel quality of serving beams is transmitted successfully but is received with a received quality lower than a threshold, and how many times the reference signal is not transmitted successfully. Such method helps prevent the situation of the UE's belated determination of Beam Link Failure in Unlicensed Spectrum resulting from that the reference signal cannot be transmitted on time due to LBT, thereby ensuring that the UE still can make a quick and accurate determination on Beam Link Failure and recover these beams. This practice guarantees the quality of beam-based communications in Unlicensed Spectrum.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
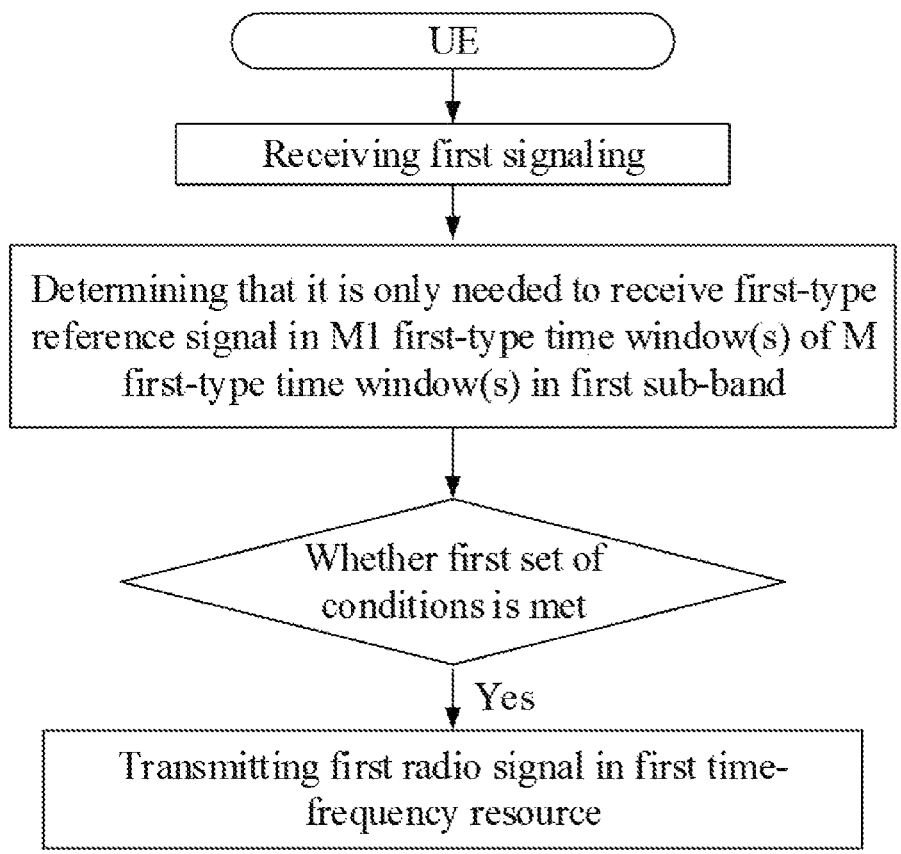
FIG. 1 illustrates a flowchart of a first signaling, a first-type reference signal and a first radio signal according to one embodiment of the present disclosure.

Embodiment 1 illustrates a flowchart of a first signaling, a first-type reference signal and a first radio signal, as shown in FIG. 1.

In Embodiment 1, the UE of the present disclosure receives a first signaling, the first signaling being used to indicate M first-type time window(s) in a first sub-band, the M first-type time window(s) in the first sub-band being reserved for a first-type reference signal, and M being a positive integer. The UE then determines that it is only needed to receive the first-type reference signal in M1 first-type time window(s) of the M first-type time window(s) in the first sub-band, M1 being a positive integer no greater than the M. After that the UE determines whether a first set of conditions is met. In instances in which a first set of conditions is met, the UE transmits a first radio signal in a first time-frequency resource; herein, the first set of conditions comprises that the M1 is no greater than a first threshold.

In one embodiment, the first signaling explicitly indicates the M first-type time window(s) in the first sub-band.

In one embodiment, the first signaling implicitly indicates the M first-type time window(s) in the first sub-band.

In one embodiment, the first sub-band is deployed on Unlicensed Spectrum.

In one embodiment, the first sub-band comprises a carrier.

In one embodiment, the first sub-band comprises multiple carriers.

In one embodiment, the first sub-band comprises multiple Bandwidth Parts (BWPs) in a carrier.

In one embodiment, the first sub-band comprises a BWP in a carrier.

In one embodiment, the first sub-band comprises a positive integer number of Physical Resource Block(s) (PRB).

In one embodiment, the first sub-band comprises a positive integer number of contiguous PRBs.

In one embodiment, the first sub-band comprises a positive integer number of Resource Block(s) (RB).

In one embodiment, the first sub-band comprises a positive integer number of contiguous RBs.

In one embodiment, the first sub-band comprises a positive integer number of contiguous subcarriers.

In one embodiment, the M first-type time windows are mutually orthogonal (i.e., non-overlapping) in time domain.

In one embodiment, any of the M first-type time window(s) is a sub-frame.

In one embodiment, any of the M first-type time window(s) is a slot.

In one embodiment, any of the M first-type time window(s) is a positive integer number of contiguous sub-frames.

In one embodiment, any of the M first-type time window(s) is a positive integer number of contiguous slots.

In one embodiment, any of the M first-type time window(s) is a positive integer number of contiguous multicarrier symbols.

In one embodiment, the multicarrier symbol is an Orthogonal Frequency Division Multiplexing (OFDM) symbol.

In one embodiment, the multicarrier symbol is a Single-Carrier-Frequency Division MultipleAccess (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises Cyclic Prefix (CP).

In one embodiment, the first-type reference signal is transmitted in the first sub-band.

In one embodiment, the first signaling is transmitted in the first sub-band.

In one embodiment, the first signaling is transmitted on a frequency band other than the first sub-band.

In one embodiment, the first signaling is transmitted on a frequency band deployed at Licensed Spectrum.

In one embodiment, the first signaling is a higher-layer signaling.

In one embodiment, the first signaling is a Radio Resource Control (RRC) signaling.

In one embodiment, the first signaling is a Medium Access Control layer Control Element (MAC CE) signaling.

In one embodiment, the first signaling is a physical-layer signaling.

In one embodiment, the first signaling is UE-specific.

In one embodiment, the M first-type time window(s) is(are) reserved for a multicarrier symbol carrying the first-type reference signal.

In one embodiment, the UE drops transmitting the first-type reference signal in any of the M first-type time windows that does not belong to the M1 first-type time window(s).

In one embodiment, the first time-frequency resource comprises a positive integer number of multicarrier symbol(s) in time domain.

In one embodiment, the first time-frequency resource comprises a positive integer number of contiguous multi-carrier symbols in time domain.

In one embodiment, the first time-frequency resource comprises a slot in time domain.

In one embodiment, the first time-frequency resource comprises a positive integer number of contiguous slots in time domain.

In one embodiment, the first time-frequency resource comprises a sub-frame in time domain.

In one embodiment, the first time-frequency resource comprises a positive integer number of contiguous sub-frames in time domain.

In one embodiment, the first time-frequency resource comprises a positive integer number of subcarrier(s) in frequency domain.

In one embodiment, the first time-frequency resource comprises a positive integer number of contiguous subcarriers in frequency domain.

In one embodiment, the first time-frequency resource comprises a positive integer number of contiguous PRBs in frequency domain.

In one embodiment, the first time-frequency resource comprises a positive integer number of contiguous RBs in frequency domain.

In one embodiment, the first time-frequency resource is located behind the M first-type time window(s) in time domain.

In one embodiment, the first time-frequency resource is a Physical Random Access CHannel (PRACH) that first arrives following the M first-type time window(s).

In one embodiment, the first time-frequency resource is a Physical UplinkControl CHannel (PUCCH) that first arrives following the M first-type time window(s).

In one embodiment, the first time-frequency resource is a PRACH that first arrives on a second sub-band located behind the M first-type time window(s).

In one embodiment, the first time-frequency resource is a PUCCH that first arrives on a second sub-band located behind the M first-type time window(s).

In one embodiment, the second sub-band is deployed on Unlicensed Spectrum.

In one embodiment, the second sub-band is deployed on Licensed Spectrum.

In one embodiment, the first radio signal is generated by modulation of a first characteristic sequence.

In one subembodiment, the first characteristic sequence comprises a pseudo-random sequence.

In one subembodiment, the first characteristic sequence comprises a Zadoff-Chu sequence.

In one subembodiment, the first characteristic sequence comprises a Cyclic Prefix (CP).

In one embodiment, the first time-frequency resource and the first characteristic sequence constitute a first radio resource, the first radio resource belongs to a first radio resource pool, and the first radio resource pool comprises a positive integer number of radio resource(s), of which each radio resource comprises a time-frequency resource and a characteristic sequence.

In one subembodiment, the characteristic sequence comprises a pseudo-random sequence.

In one subembodiment, the characteristic sequence comprises a Zadoff-Chu sequence.

In one subembodiment, the characteristic sequence comprises a CP.

In one subembodiment, the first radio resource pool is reserved for the UE.

In one subembodiment, the UE itself selects the first radio resource from the first radio resource pool.

In one embodiment, the first time-frequency resource comprises W Resource Unit(s) (RU), W being a positive integer. The first radio signal is generated by modulation of a first characteristic sequence of the length of W, namely, a modulation symbol is multiplied by the first characteristic sequence and then mapped into the W RU(s).

In one reference embodiment of the above embodiment, one RU occupies a duration of a multicarrier symbol in time domain, and a subcarrier in frequency domain.

In one embodiment, the first radio signal comprises a Random Access Channel (RACH) Preamble.

In one embodiment, the first radio signal comprises Uplink control information (UCI).

In one embodiment, the first radio signal comprises Channel State Information (CSI).

In one embodiment, the first radio signal comprises a Channel-state information reference signals Resource Indicator (CRI).

In one embodiment, the first radio signal comprises a Precoding Matrix Indicator (PMI).

In one embodiment, the first radio signal comprises a Reference Signal Received Power (RSRP).

In one embodiment, the first radio signal comprises a Reference Signal Received Quality (RSRQ).

In one embodiment, the first radio signal comprises a Channel Quality Indicator (CQI).

In one embodiment, the first radio signal comprises Beam Recovery Request (BRR).

In one embodiment, the first radio signal comprises Beam Failure Recovery reQuest (BFRQ).

In one embodiment, the first threshold is a positive integer.

In one embodiment, the first threshold is unrelated to the M.

In one embodiment, the first threshold is related to the M.

In one embodiment, the M is fixed.

In one embodiment, the M is configurable.

In one embodiment, the M is configured by a higher-layer signaling.

In one embodiment, the M is greater than 1.

In one embodiment, the M1 is less than the M.

In one embodiment, it is determined based on energy detection whether there is need to receive the first-type reference signal in each of the M first-type time window(s) in the first sub-band.

In one subembodiment, the energy detection refers to sensing energy of all radio signals in a given first-type time window and averaging in time to acquire a received energy. If the received energy is greater than a first given threshold, it is determined that it's necessary to receive the first-type reference signal in the given first-type time window; or if the received energy is no greater than a first given threshold, it is determined that it's unnecessary to receive the first-type reference signal in the given first-type time window. The given first-type time window is any of the M first-type time window(s).

In one embodiment, according to a reference signal sequence of the first-type reference signal, coherent detection is used to determine whether there is need to receive the first-type reference signal in each of the M first-type time window(s) in the first sub-band.

In one subembodiment, the coherent detection refers to performing coherent reception on all radio signals in a given first-type time window using a reference signal sequence of the first-type reference signal, and measuring energy of signals obtained from the coherent reception. If the energy of signals obtained from the coherent reception is greater than a second given threshold, it is determined that it's necessary to receive the first-type reference signal in the given first-type time window; or if the energy of signals obtained from the coherent reception is not greater than a second given threshold, it is determined that it's unnecessary to receive the first-type reference signal in the given first-type time window. The given first-type time window is any of the M first-type time window(s).

In one subembodiment, the reference signal sequence of the first-type reference signal comprises a pseudo-random sequence.

In one subembodiment, the reference signal sequence of the first-type reference signal comprises a Zadoff-Chu sequence.

In one embodiment, it is determined based on blind detection whether there is need to receive the first-type reference signal in each of the M first-type time window(s).

In one subembodiment, the blind detection refers to receiving a signal in a given time-frequency resource and performing decoding, if the decoding is determined to be correct according to a check bit, then it is determined that it's necessary to receive the first-type reference signal in a given first-type time window; or if the decoding is determined to be incorrect according to a check bit, it is determined that it's unnecessary to receive the first-type reference signal in a given first-type time window. The given first-type time window is any of the M first-type time window(s), and the given time-frequency resource is one of M second time-frequency resource(s), the M second time-frequency resource(s) respectively corresponds(correspond) to the M first-type time window(s), and the given time-frequency resource corresponds to the given first-type time window.

In one reference embodiment of the above subembodiment, the check bit is a Cyclic Redundancy Check (CRC) bit.

Embodiment 2

Figure 2:
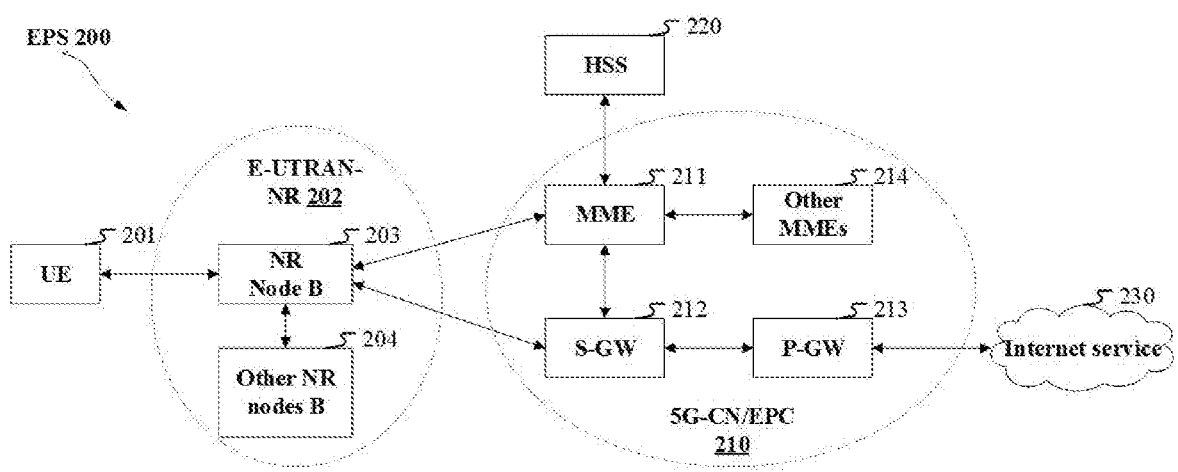
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200, which may comprise one or more UEs 201, an Evolved UMTS Terrestrial Radio Access Network New Radio (E-UTRAN-NR) 202, a 5G-Core Network/Evolved Packet Core (5G-CN/EPC) 210, a Home Subscriber Server (HSS) 220 and an Internet Service 230, herein the UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201-oriented user plane and control plane terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises a Mobility Management Entity (MME) 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the UE in the present disclosure.

In one embodiment, the gNB203 corresponds to the base station in the present disclosure.

In one subembodiment, the UE 201 supports wireless communications with data transmitted on Unlicensed Spectrum.

In one subembodiment, the gNB203 supports wireless communications with data transmitted on Unlicensed Spectrum.

In one subembodiment, the UE 201 supports wireless communications with massive MIMO.

In one subembodiment, the gNB203 supports wireless communications with massive MIMO.

Embodiment 3

Figure 3:
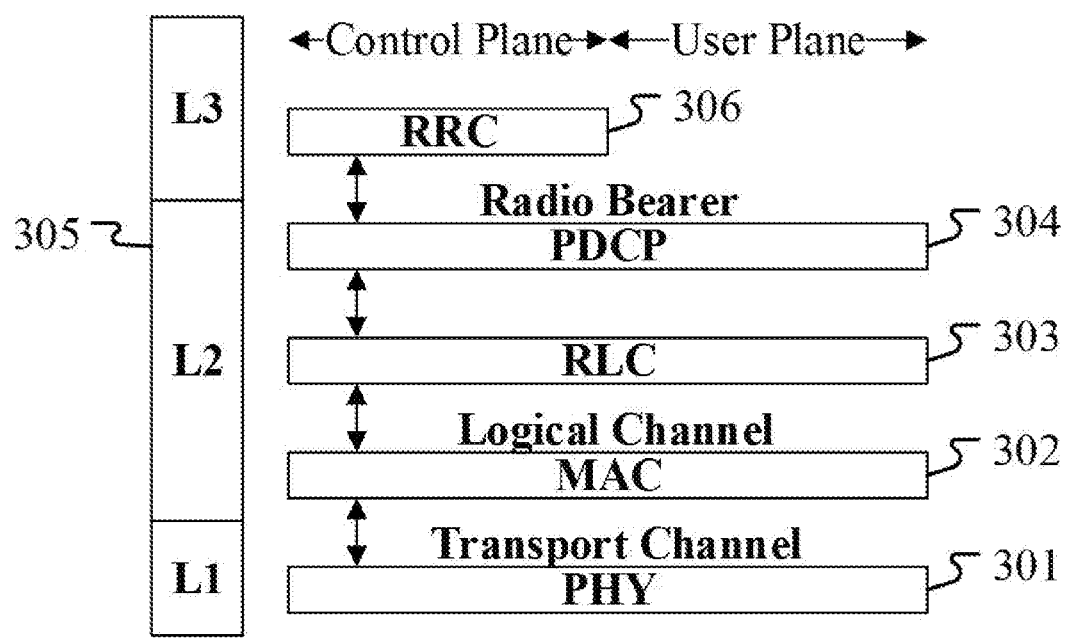
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling of the present disclosure is generated by the PHY 301.

In one embodiment, the first signaling of the present disclosure is generated by the MAC sublayer 302.

In one embodiment, the first signaling of the present disclosure is generated by the RRC sublayer 306.

In one embodiment, the first-type reference signal of the present disclosure is generated by the PHY 301.

In one embodiment, the first radio signal of the present disclosure is generated by the PHY 301.

In one embodiment, the M2 second radio signal(s) of the present disclosure is(are) generated by the PHY 301.

In one embodiment, the second signaling of the present disclosure is generated by the PHY 301.

In one embodiment, the second signaling of the present disclosure is generated by the MAC sublayer 302.

In one embodiment, the second signaling of the present disclosure is generated by the RRC sublayer 306.

In one embodiment, the N second-type reference signal(s) of the present disclosure is(are) generated by the PHY 301.

In one embodiment, the first information of the present disclosure is generated by the MAC sublayer 302.

In one embodiment, the first information of the present disclosure is generated by the RRC sublayer 306.

Embodiment 4

Figure 4:
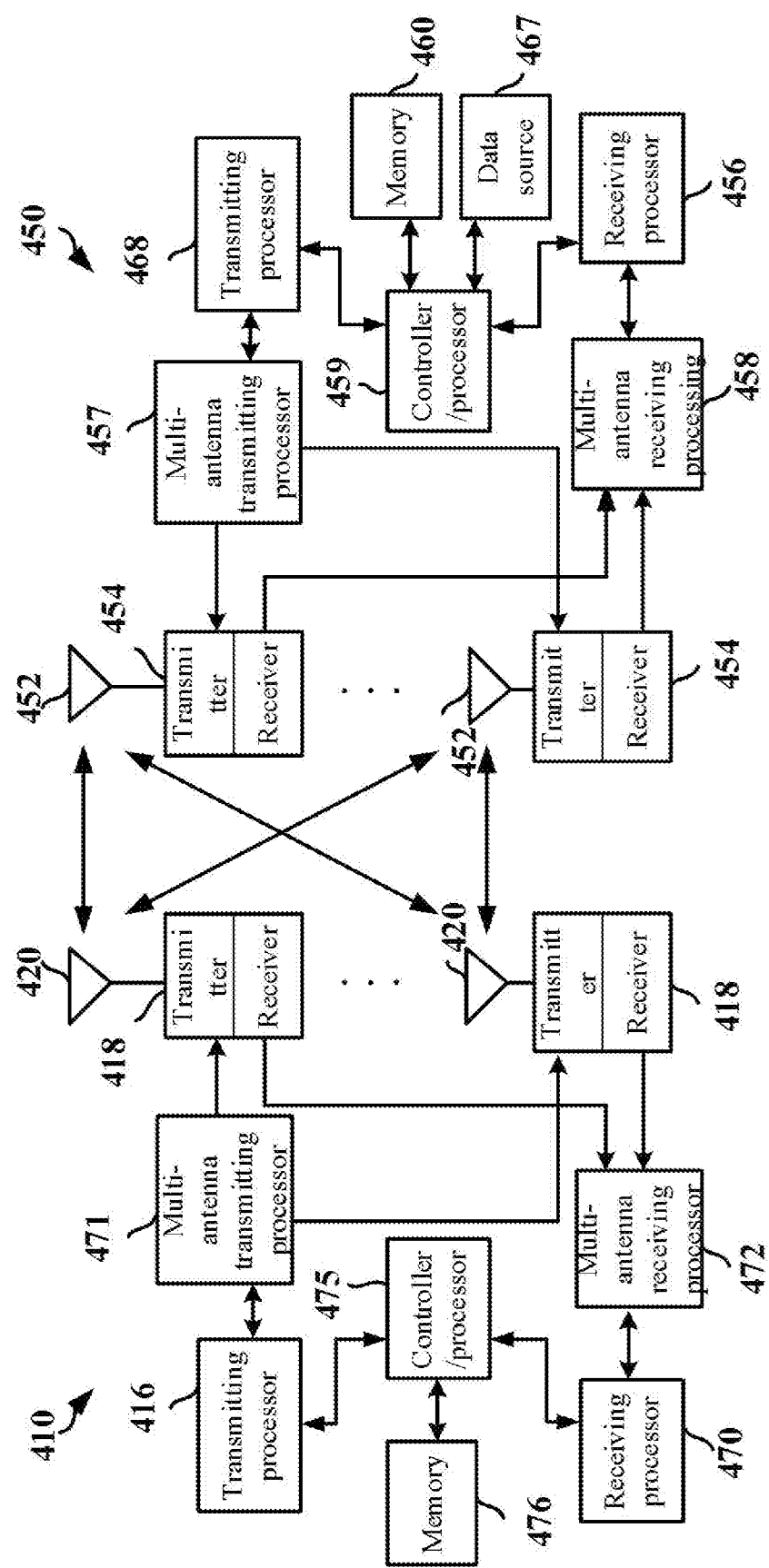
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram of a UE 450 and a gNB 410 in communication with each other in an access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE450. The transmitting processor 416 and the multi-antenna transmitting processor 471 perform signal processing functions used for the L1 layer (that is, PHY). The transmitting processor 416 performs coding and interleaving so as to ensure a Forward Error Correction (FEC) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding/beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided from the receiver 454. The receiving processor 456 converts the baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation, mapping and channel coding. The multi-antenna transmitting processor 457 implements digital multi-antenna spatial precoding/beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be associated with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least receives the first signaling of the present disclosure, the first signaling being used to indicate M first-type time window(s) in a first sub-band, and the M first-type time window(s) in the first sub-band being reserved for a first-type reference signal; determines that it is only needed to receive the first-type reference signal in M1 first-type time window(s) of the M first-type time window(s) in the first sub-band; and determines whether the first set of conditions of the present disclosure is met; and transmits the first radio signal of the present disclosure in the first time-frequency resource of the present disclosure.

In one embodiment, the UE 450 comprises a memory that stores a computer readable instruction program. The computer readable instruction program generates actions when executed by at least one processor, which include: receiving the first signaling of the present disclosure, the first signaling being used to indicate M first-type time window(s) in a first sub-band, and the M first-type time window(s) in the first sub-band being reserved for a first-type reference signal; determining that it is only needed to receive the first-type reference signal in M1 first-type time window(s) of the M first-type time window(s) in the first sub-band; and determining whether the first set of conditions of the present disclosure is met; and transmitting the first radio signal of the present disclosure in the first time-frequency resource of the present disclosure.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the first signaling of the present disclosure, the first signaling being used to indicate M first-type time window(s) in a first sub-band, and the M first-type time window(s) in the first sub-band being reserved for a first-type reference signal; determines that it is only needed to transmit the first-type reference signal in M1 first-type time window(s) of the M first-type time window(s) in the first sub-band; and monitors the first radio signal of the present disclosure in the first time-frequency resource of the present disclosure.

In one embodiment, the gNB 410 comprises a memory that stores a computer readable instruction program. The computer readable instruction program generates actions when executed by at least one processor, which include: transmitting the first signaling of the present disclosure, the first signaling being used to indicate M first-type time window(s) in a first sub-band, and the M first-type time window(s) in the first sub-band being reserved for a first-type reference signal; determining that it is only needed to transmit the first-type reference signal in M1 first-type time window(s) of the M first-type time window(s) in the first sub-band; and monitoring the first radio signal of the present disclosure in the first time-frequency resource of the present disclosure.

In one embodiment, the UE 450 corresponds to the UE in the present disclosure.

In one embodiment, the gNB410 corresponds to the base station in the present disclosure.

In one embodiment, at least one of the antenna 452, the receiver 454, the receiving processor 456, the multi-antenna receiving processor 458 or the controller/processor 459 is used to receive the first signaling of the present disclosure; at least one of the antenna 420, the transmitter 418, the transmitting processor 416, the multi-antenna transmitting processor 471 or the controller/processor 475 is used to transmit the first signaling of the present disclosure.

In one embodiment, at least one of the receiving processor 456, the multi-antenna receiving processor 458 or the controller/processor 459 is used to determine that it is only needed to receive the first-type reference signal in M1 first-type time window(s) of the M first-type time window(s) in the first sub-band; at least one of the receiving processor 470, the multi-antenna receiving processor 472 or the controller/processor 475 is used to determine that it is only needed to transmit the first-type reference signal in M1 first-type time window(s) of the M first-type time window(s) in the first sub-band.

In one embodiment, at least one of the receiving processor 456, the multi-antenna receiving processor 458 or the controller/processor 459 is used to determine whether the first set of conditions of the present disclosure is met.

In one embodiment, at least one of the antenna 420, the receiver 418, the receiving processor 470, the multi-antenna receiving processor 472 or the controller/processor 475 is used to monitor the first radio signal of the present disclosure in the first time-frequency resource of the present disclosure; at least one of the antenna 452, the transmitter 454, the transmitting processor 468, the multi-antenna transmitting processor 457 or the controller/processor 459 is used to transmit the first radio signal of the present disclosure in the first time-frequency resource of the present disclosure.

In one embodiment, at least one of the antenna 452, the receiver 454, the receiving processor 456, the multi-antenna receiving processor 458 or the controller/processor 459 is used to receive the M1 first-type reference sub-signal(s) of the present disclosure respectively in the M1 first-type time window(s) of the present disclosure; at least one of the antenna 420, the transmitter 418, the transmitting processor 416, the multi-antenna transmitting processor 471 or the controller/processor 475 is used to transmit the M1 first-type reference sub-signal(s) of the present disclosure respectively in the M1 first-type time window(s) of the present disclosure.

In one embodiment, at least one of the antenna 452, the receiver 454, the receiving processor 456, the multi-antenna receiving processor 458 or the controller/processor 459 is used to monitor the M second radio signal(s) of the present disclosure respectively in the M second time-frequency resource(s) of the present disclosure; at least one of the antenna 420, the transmitter 418, the transmitting processor 416, the multi-antenna transmitting processor 471 or the controller/processor 475 is used to transmit M2 second radio signal(s) of M second radio signal(s) of the present disclosure respectively in the M2 second time-frequency resource(s) of the present disclosure.

In one embodiment, at least one of the antenna 452, the receiver 454, the receiving processor 456, the multi-antenna receiving processor 458 or the controller/processor 459 is used to perform the first-type access detection of the present disclosure in the first sub-band of the present disclosure.

In one embodiment, at least one of the antenna 420, the receiver 418, the receiving processor 470, the multi-antenna receiving processor 472 or the controller/processor 475 is used to perform the M second-type access detection(s) of the present disclosure respectively in the first sub-band of the present disclosure.

In one embodiment, at least one of the antenna 420, the receiver 418, the receiving processor 470, the multi-antenna receiving processor 472 or the controller/processor 475 is used to monitor the second signaling of the present disclosure in the third time-frequency resource of the present disclosure; at least one of the antenna 420, the transmitter 418, the transmitting processor 416, the multi-antenna transmitting processor 471 or the controller/processor 475 is used to transmit the second signaling of the present disclosure in the third time-frequency resource of the present disclosure.

In one embodiment, at least one of the antenna 420, the receiver 418, the receiving processor 470, the multi-antenna receiving processor 472 or the controller/processor 475 is used to receive the N second-type reference signal(s) of the present disclosure; at least one of the antenna 420, the transmitter 418, the transmitting processor 416, the multi-antenna transmitting processor 471 or the controller/processor 475 is used to transmit the N second-type reference signal(s) of the present disclosure.

In one embodiment, at least one of the antenna 420, the receiver 418, the receiving processor 470, the multi-antenna receiving processor 472 or the controller/processor 475 is used to receive the first information of the present disclosure; at least one of the antenna 420, the transmitter 418, the transmitting processor 416, the multi-antenna transmitting processor 471 or the controller/processor 475 is used to transmit the first information of the present disclosure.

Embodiment 5

Figure 5:
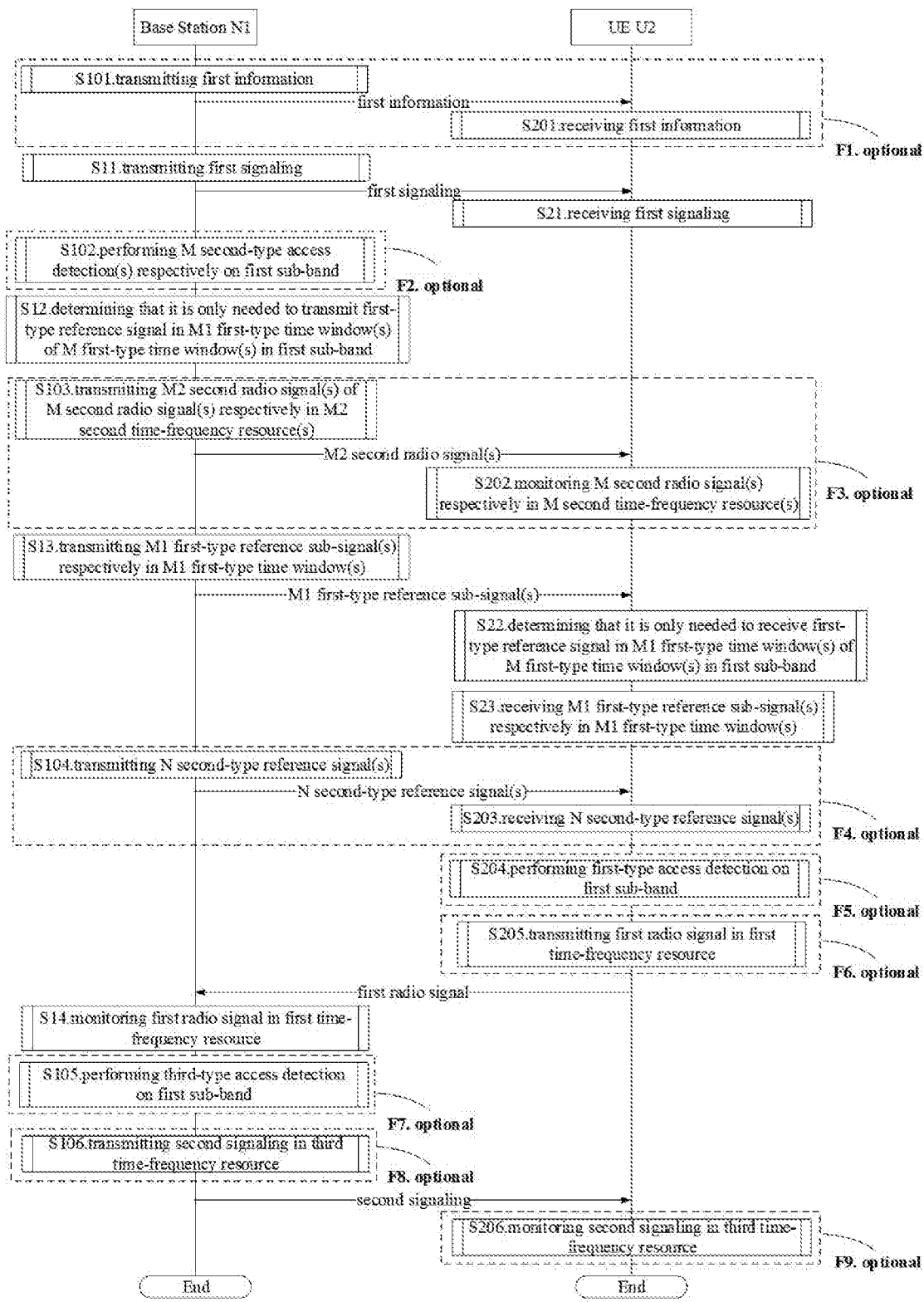
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is a maintenance base station for a serving cell of a UE U2. In FIG. 5, steps in boxes F1 to F9 are optional, respectively.

The N1 transmits first information in step S101; transmits a first signaling in step S11, the first signaling being used to indicate M first-type time window(s) in a first sub-band, the M first-type time window(s) in the first sub-band being reserved for a first-type reference signal; performs M second-type access detection(s) respectively in the first sub-band in step S102; determines in step S12 that it is only needed to transmit the first-type reference signal in M1 first-type time window(s) of the M first-type time window(s) in the first sub-band; transmits M2 second radio signal(s) of M second radio signal(s) respectively in M2 second time-frequency resource(s) in step S103; and transmits M1 first-type reference sub-signal(s) respectively in the M1 first-type time window(s) in step S13; transmits N second-type reference signal(s) in step S104; monitors a first radio signal in a first time-frequency resource in step S14; performs a third-type access detection in the first sub-band in step S105; and transmits a second signaling in a third time-frequency resource in step S106.

The U2 receives first information in step S201; receives a first signaling in step S21; the first signaling being used to indicate M first-type time window(s) in a first sub-band, the M first-type time window(s) in the first sub-band being reserved for a first-type reference signal; monitors M second radio signal(s) respectively in M second time-frequency resource(s) in step S202; determines in step S22 that it is only needed to receive the first-type reference signal in M1 first-type time window(s) of the M first-type time window(s) in the first sub-band; receives M1 first-type reference sub-signal(s) respectively in the M1 first-type time window(s) in step S23; and receives N second-type reference signal(s) in step S203; performs a first-type access detection in the first sub-band in step S204; transmits a first radio signal in a first time-frequency resource in step S205; and monitors a second signaling in a third time-frequency resource in step S206.

In Embodiment 5, the M is a positive integer, and the M1 is a positive integer no greater than the M; in instances in which a first set of conditions is met, the U2 transmits the first radio signal in the first time-frequency resource; the first set of conditions comprises that the M1 is no greater than a first threshold. The first-type reference signal comprises the M1 first-type reference sub-signal(s), and the M1 first-type time window(s) is(are) respectively reserved for the M1 first-type reference sub-signal(s); measurement(s) on the M1 first-type reference sub-signal(s) is(are) respectively used by the U2 to determine M1 first-type value(s), among the M1 first-type value(s) there is(are) M3 first-type value(s) lower than a second threshold; the first set of conditions comprises that M3 is greater than a third threshold. The M second radio signal(s) respectively corresponds(correspond) to the M first-type time window(s); the U2 detects the M2 second radio signal(s) of the M second radio signal(s). Among the M2 second radio signal(s) there is(are) M1 second radio signal(s) being respectively used to indicate that the first-type reference signal is to be received in the M1 first-type time window(s). The first-type access detection comprises: performing Q energy detection(s) respectively in Q time sub-pool(s) in the first sub-band to obtain Q detection value(s); wherein each of Q1 detection value(s) among the Q detection value(s) is lower than a fourth threshold; Q being a positive integer, and Q1 being a positive integer no greater than the Q. Start time(s) for the M first-type time window(s) is(are) no earlier than end time(s) for the M second-type access detection(s) respectively. A given second-type access detection comprises: performing P energy detection(s) respectively in P time sub-pool(s) in the first sub-band to obtain P detection value(s); wherein the given second-type access detection is one of the M second-type access detection(s), and each of P1 detection value(s) among the P detection value(s) is lower than a fifth threshold; P is a positive integer, and P1 is a non-negative integer no greater than the P. A start time for time resources occupied by the third time-frequency resource is no earlier than an end time for the third-type access detection. The third-type access detection comprises: performing W energy detection(s) respectively in W time sub-pool(s) in the first sub-band to obtain W detection value(s); wherein each of W1 detection value(s) among the W detection value(s) is lower than a seventh threshold; W is a positive integer, and W1 is a positive integer no greater the W. The second signaling is used by the U2 to determine that the first radio signal is correctly received. Measurement(s) on the N second-type reference signal(s) is(are) used by the U2 to determine the first radio signal, N being a positive integer. The first information is used by the U2 to determine the first set of conditions.

In one embodiment, the M1 first-type time window(s) is(are) respectively reserved for multicarrier symbol(s) carrying the M1 first-type reference sub-signal(s).

In one embodiment, among the M1 first-type value(s) only the M3 first-type value(s) is(are) lower than the second threshold.

In one embodiment, among first-type value(s) of the M1 first-type values other than the M3 first-type value(s) there is at least one first-type value lower than the second threshold.

In one subembodiment, positions of the M3 first-type values among the M1 first-type values are consecutive.

In one subembodiment, positions of the M3 first-type time windows among the M1 first-type time windows are consecutive, and the M3 first-type time windows are first-type time windows of the M1 first-type time windows that correspond to the M3 first-type values.

In one embodiment, the M1 first-type value(s) is(are) BLock Error Rate(s) (BLER) respectively.

In one embodiment, the M3 is a non-negative integer.
In one embodiment, the M3 is greater than 0.
In one embodiment, the M3 is equal to 0.
In one embodiment, the M3 is equal to the M1.
In one embodiment, the M3 is less than the M1.
In one embodiment, the M2 is equal to the M1.
In one embodiment, the M2 is greater than the M1, second radio signal(s) of the M2 second radio signals other than the M1 second radio signal(s) is(are) respectively used to indicate that the first-type reference signal is not to be received in corresponding first-type time window(s).

In one embodiment, the M2 second radio signal(s) is(are) transmitted in the first sub-band respectively.

In one embodiment, the M second time-frequency resource(s) is(are) respectively located within the first sub-band in frequency domain.

In one embodiment, the phrase of monitoring M second radio signal(s) respectively in M second time-frequency resource(s) refers to receiving the M second radio signal(s) respectively in the M second time-frequency resource(s) in a way based on blind detection, namely, receiving signal(s) in a given second time-frequency resource and performing decoding, if the decoding is determined to be correct according to a check bit, then it is determined that a given second radio signal is detected; or if the decoding is determined to be incorrect according to a check bit, then it is determined that a given second radio signal is not detected. The given second time-frequency resource is any of the M second time-frequency resource(s), and the given second radio signal is one of the M second radio signal(s) corresponding to the given second time-frequency resource.

In one subembodiment, the check bit refers to CRC bit.

In one embodiment, the phrase of monitoring M second radio signal(s) respectively in M second time-frequency resource(s) refers to determining respectively in the M second time-frequency resource(s) whether the M second radio signal(s) can be detected based on energy detection.

In one embodiment, energy of all radio signals is sensed in a given second time-frequency resource and averaged in time to acquire a received energy. If the received energy is greater than a fourth given threshold, it is determined that a given second radio signal is detected; or if the received energy is no greater than the fourth given threshold, it is determined that the given second radio signal is not detected. The given second time-frequency resource is any of the M second time-frequency resource(s), and the given second radio signal is one of the M second radio signal(s) corresponding to the given second time-frequency resource.

In one embodiment, each of the M2 second radio signal(s) explicitly indicates whether the first-type reference signal is received in a corresponding first-type time window.

In one embodiment, each of the M2 second radio signal(s) implicitly indicates whether the first-type reference signal is received in a corresponding first-type time window.

In one embodiment, each of the M1 second radio signal(s) explicitly indicates that the first-type reference signal is received in a corresponding first-type time window.

In one embodiment, each of the M1 second radio signal(s) implicitly indicates that the first-type reference signal is received in a corresponding first-type time window.

In one embodiment, any of the M2 second radio signals other than the M1 second radio signal(s) explicitly indicates that the first-type reference signal is not received in a corresponding first-type time window.

In one embodiment, any of the M2 second radio signals other than the M1 second radio signal(s) implicitly indicates that the first-type reference signal is not received in a corresponding first-type time window.

In one embodiment, each of the M2 second radio signal(s) is used to indicate a number of multicarrier symbols occupied in a corresponding first-type time window.

In one embodiment, each of the M2 second radio signal(s) is used to indicate a number of multicarrier symbols occupied by a transmitter of the first-type reference signal in a corresponding first-type time window.

In one embodiment, for any given first-type time window of M2 first-type time window(s), when a number of multicarrier symbols occupied within is greater than a third given threshold, the U2 receives the first-type reference signal in the any given first-type time window; when a number of multicarrier symbols occupied within is no greater than a third given threshold, the U2 drops receiving the first-type reference signal in the any given first-type time window. The M2 first-type time window(s) is(are) first-type time window(s) among the M first-type time window(s) respectively corresponding to the M2 second radio signal(s).

In one subembodiment of the above embodiment, when a number of multicarrier symbols occupied within the any given first-type time window is greater than the third given threshold, the N1 transmits the first-type reference signal in the any given first-type time window; when a number of multicarrier symbols occupied within the any given first-type time window is no greater than the third given threshold, the N1 drops transmitting the first-type reference signal in the any given first-type time window.

In one subembodiment of the above embodiment, the third given threshold is a positive integer no greater than 14.

In one subembodiment of the above embodiment, the third given threshold is a positive integer no less than 7.

In one subembodiment of the above embodiment, the third given threshold is a positive integer greater than 1.

In one subembodiment of the above embodiment, the third given threshold is configurable.

In one subembodiment of the above embodiment, the third given threshold is dependent on the length of a Transmission Time Interval (TTI).

In one subembodiment of the above embodiment, the third given threshold is fixed, that is, non-configurable.

In one subembodiment of the above embodiment, the third given threshold is UE-specific.

In one subembodiment of the above embodiment, the third given threshold is cell-common.

In one embodiment, a given second radio signal is used by the U2 to determine a reference antenna port set, when the reference antenna port set comprises all antenna ports in a reference antenna port group, the U2 receives the first-type reference signal in a first-type time window corresponding to the given second radio signal; otherwise the U2 does not receive the first-type reference signal in a first-type time window corresponding to the given second radio signal. The given second radio signal is any of the M2 second radio signal(s), and the reference antenna port group is associated with a transmission antenna port group of the first-type reference signal, wherein the reference antenna port set comprises a positive integer number of antenna port(s) and an antenna port group comprises a positive integer number of antenna port(s).

In one subembodiment, when the reference antenna port set comprises the reference antenna port group, the N1 transmits the first-type reference signal in a first-type time window corresponding to the given second radio signal; otherwise the N1 drops transmitting the first-type reference signal in a first-type time window corresponding to the given second radio signal.

In one subembodiment, the given second radio signal explicitly indicates the reference antenna port set.

In one subembodiment, the given second radio signal implicitly indicates the reference antenna port set.

In one subembodiment, any transmission antenna port of the first-type reference signal is Quasi Co-Located (QCL) with an antenna port in the reference antenna port group.

In one subembodiment, any transmission antenna port of the first-type reference signal is spatial QCL with an antenna port in the reference antenna port group.

In one subembodiment, a spatial coverage of a transmitting beam for any transmission antenna port of the first-type reference signal is within a spatial coverage of a transmitting beam for an antenna port in the reference antenna port group.

In one subembodiment, the number of antenna ports comprised by the reference antenna port set is no smaller than the number of antenna ports comprised by the reference antenna port group.

In one subembodiment, the reference antenna port group comprises 1 antenna port.

In one subembodiment, the reference antenna port group comprises multiple antenna ports.

In one subembodiment, any two antenna ports in the reference antenna port group are QCL.

In one subembodiment, any two antenna ports in the reference antenna port group are spatial QCL.

In one subembodiment, at least two antenna ports in the reference antenna port group are non-QCL.

In one subembodiment, at least two antenna ports in the reference antenna port group are not spatial QCL.

In one embodiment, any of the M second radio signal(s) comprises Downlink Control Information (DCI).

In one embodiment, any of the M second radio signal(s) comprises DCI identified by a Component Carrier-Radio Network Temporary Identifier (CC-RNTI).

In one embodiment, a CC-RNTI is used for generating an RS sequence of DeModulation Reference Signals (DMRS) corresponding to any of the M second radio signal(s).

In one embodiment, a CRC bit sequence of any second radio signal of the M second radio signal(s) is scrambled by a CC-RNTI.

In one embodiment, the M2 is a positive integer.

In one embodiment, the M2 is less than the M.

In one embodiment, the M2 is equal to the M1.

In one embodiment, the M2 is greater than the M1.

In one embodiment, each of the Q time sub-pool(s) is located before time resources occupied by the first time-frequency resource in time domain.

In one embodiment, the first-type access detection is used by the U2 to determine whether the first sub-band is idle.

In one embodiment, the first-type access detection is used by the U2 to determine whether the first sub-band can be used by the U2 for radio signal transmission.

In one embodiment, the first-type access detection is an uplink access detection.

In one embodiment, the first-type access detection is Cat4 LBT, for detailed definition of the Cat4 LBT, refer to 3GPPTR36.889.

In one embodiment, the first-type access detection is Cat2 LBT, for detailed definition of the Cat2 LBT, refer to 3GPPTR36.889.

In one embodiment, the first-type access detection is Type 1 UL channel access procedure, for detailed definition of the Type 1 UL channel access procedure, refer to 3GPP TS36.213, section 15.2.

In one embodiment, the first-type access detection is Type 2 UL channel access procedure, for detailed definition of the Type 2 UL channel access procedure, refer to 3GPP TS36.213, section 15.2.

In one embodiment, the first-type access detection is implemented in a way defined by 3GPP TS36.213, section 15.2.

In one embodiment, the M second-type access detection(s) is(are) respectively used by the N1 to determine whether the first sub-band is idle.

In one embodiment, the M second-type access detection(s) is(are) respectively used by the N1 to determine whether the first sub-band can be used by the N1 for radio signal transmission.

In one embodiment, the M second-type access detection(s) is(are) respectively downlink access detection(s).

In one embodiment, the given second-type access detection is Cat4 LBT, for detailed definition of the Cat4 LBT, refer to 3GPPTR36.889.

In one embodiment, the given second-type access detection is Cat2 LBT, for detailed definition of the Cat2 LBT, refer to 3GPPTR36.889.

In one embodiment, each of the M second-type access detection(s) is implemented in a way defined by 3GPP TS36.213, section 15.1.

In one embodiment, any of the M second-type access detection(s) includes performing a positive integer number of energy detection(s) respectively in a positive integer number of time sub-pool(s) in the first sub-band, to obtain a positive integer number of detection value(s).

In one embodiment, at least two second-type access detections among the M second-type access detections comprise different numbers of energy detections.

In one embodiment, the M second-type access detection(s) is(are) respectively used by the N1 for determining whether to transmit the first-type reference signal in the M first-type time window(s) in the first sub-band.

In one embodiment, if the first sub-band is determined as idle according to a result of any one of the M second-type access detection(s), the N1 transmits the first-type reference signal in a corresponding first-type time window; or if the first sub-band is determined as not idle according to a result of any one of the M second-type access detection(s), the N1 drops transmitting the first-type reference signal in a corresponding first-type time window.

In one embodiment, if it is determined that the first sub-band can be used for downlink transmission according to a result of any one of the M second-type access detection(s), the N1 transmits the first-type reference signal in a corresponding first-type time window; or if it is determined that the first sub-band cannot be used for downlink transmission according to a result of any one of the M second-type access detection(s), the N1 drops transmitting the first-type reference signal in a corresponding first-type time window.

In one embodiment, the phrase of monitoring a first radio signal in a first time-frequency resource refers to receiving a first radio signal in the first time-frequency resource in a way based on blind detection, namely, receiving a signal in the first time-frequency resource and performing decoding, if the decoding is determined as correct according to a check bit, it is determine that the first radio signal is received successfully, or if the decoding is determined as incorrect according to a check bit, it is determine that reception of the first radio signal is failed.

In one subembodiment of the above embodiment, the check bit refers to CRC bit.

In one embodiment, the N1 determines whether the M second radio signal(s) is(are) transmitted respectively according to result(s) of the M second-type access detection(s).

In one embodiment, if the first sub-band is determined as idle according to a result of any one of the M second-type access detection(s), the N1 transmits a corresponding second radio signal out of the M second radio signal(s); or if the first sub-band is determined as not idle according to a result of any one of the M second-type access detection(s), the N1 drops transmitting a corresponding second radio signal out of the M second radio signal(s).

In one embodiment, if it is determined that the first sub-band can be used for downlink transmission according to a result of any one of the M second-type access detection(s), the N1 transmits a corresponding second radio signal out of the M second radio signal(s); or if it is determined that the first sub-band cannot be used for downlink transmission according to a result of any one of the M second-type access detection(s), the N1 drops transmitting a corresponding second radio signal out of the M second radio signal(s).

In one embodiment, the third-type access detection is used by the N1 to determine whether the first sub-band is idle.

In one embodiment, the third-type access detection is used by the N1 to determine whether the first sub-band can be used by the N1 for radio signal transmission.

In one embodiment, the third-type access detection is a downlink access detection.

In one embodiment, the third-type access detection is Cat4 LBT, for detailed definition of the Cat4 LBT, refer to 3GPPTR36.889.

In one embodiment, the third-type access detection is Cat2 LBT, for detailed definition of the Cat2 LBT, refer to 3GPPTR36.889.

In one embodiment, the third-type access detection is implemented in a way defined by 3GPP TS36.213, section 15.1.

In one embodiment, the second signaling is transmitted in the first sub-band.

In one embodiment, the third time-frequency resource is located in the first sub-band in frequency domain.

In one embodiment, the second signaling is transmitted on a frequency band other than the first sub-band.

In one embodiment, the third time-frequency resource is located in a frequency other than the first sub-band in frequency domain.

In one embodiment, the second signaling comprises BRR response.

In one embodiment, the second signaling comprises BFRQ response.

In one embodiment, the second signaling explicitly indicates that the first radio signal is correctly received.

In one embodiment, the second signaling implicitly indicates that the first radio signal is correctly received.

In one embodiment, the first radio signal is used by the N1 to determine a first antenna port group, and any transmission antenna port of the second signaling is QCL with one antenna port in the first antenna port group.

In one subembodiment, the word QCL refers to spatial QCL.

In one embodiment, the N second-type reference signal(s) is(are) transmitted in the first sub-band.

In one embodiment, the first information is carried by a higher-layer signaling.

In one embodiment, the first information is carried by a MAC CE signaling.

In one embodiment, the first information is carried by a physical layer signaling.

In one embodiment, the first information indicates the first set of conditions.

In one embodiment, the first information indicates at least one of the first threshold, the second threshold or the third threshold.

In one embodiment, the first information is transmitted in the first sub-band.

In one embodiment, the first information is transmitted on a frequency band other than the first sub-band.

In one embodiment, the first information is transmitted on a frequency band deployed on Licensed Spectrum.

In one embodiment, the first signaling is transmitted on a downlink physical layer data channel (i.e., a downlink channel capable of carrying physical layer data).

In one subembodiment, the downlink physical layer data channel is a Physical Downlink Shared CHannel (PDSCH).

In one subembodiment, the downlink physical layer data channel is a short PDSCH (sPDSCH).

In one subembodiment, the downlink physical layer data channel is a NewRadio PDSCH (NR-PDSCH).

In one subembodiment, the downlink physical layer data channel is a NarrowBand PDSCH (NB-PDSCH).

In one embodiment, the first signaling is transmitted on a downlink physical layer control channel (i.e., a downlink channel only capable of carrying a physical layer signaling).

In one subembodiment, the downlink physical layer control channel is a Physical DownlinkControl CHannel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a NarrowBand PDCCH (NB-PDCCH).

In one embodiment, the first radio signal is transmitted on an uplink physical layer control channel (i.e., an uplink channel only capable of carrying a physical layer signaling).

In one subembodiment, the uplink physical layer control channel is a Physical UplinkControl CHannel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a NarrowBand PUCCH (NB-PUCCH).

In one embodiment, the first radio signal is transmitted on a PRACH.

In one embodiment, the second signaling is transmitted on a downlink physical layer control channel (i.e., a downlink channel only capable of carrying a physical layer signaling).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the first information is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, the first information is transmitted on a downlink physical layer control channel (i.e., a downlink channel only capable of carrying a physical layer signaling).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, if the U2 transmits the first radio signal in the first time-frequency resource and the first radio signal is transmitted in the first sub-band, the box F5 in FIG. 5 exists, which means that the U2 performs the first-type access detection in the first sub-band. If the U2 does not transmit the first radio signal in the first time-frequency resource or the first radio signal is transmitted on a frequency band other than the first sub-band, the box F5 in FIG. 5 does not exist, which means that the U2 does not perform the first-type access detection in the first sub-band.

In one embodiment, in instances in which the first set of conditions is met, the box F6 in FIG. 5 exists, namely, the U2 transmits the first radio signal in the first time-frequency resource.

In one embodiment, if the N1 detects the first radio signal in the first time-frequency resource and the third time-frequency resource is located within the first sub-band in frequency domain, the box F7 in FIG. 5 exists, which means that the N1 performs the third-type access detection in the first sub-band. If the N1 does not detect the first radio signal in the first time-frequency resource and the third time-frequency resource is located within a frequency band other than the first sub-band in frequency domain, the box F7 in FIG. 5 does not exist, which means that the N1 does not perform the third-type access detection in the first sub-band.

In one embodiment, if the N1 detects the first radio signal in the first time-frequency resource, the box F8 in FIG. 5 exists, which means that the N1 transmits the second signaling in the third time-frequency resource. If the N1 does not detect the first radio signal in the first time-frequency resource, the box F8 in FIG. 5 does not exist, which means that the N1 does not transmit the second signaling in the third time-frequency resource.

In one embodiment, if the U2 transmits the first radio signal in the first time-frequency resource, the box F9 in FIG. 5 exists, which means that the U2 monitors the second signaling in the third time-frequency resource. If the U2 does not transmit the first radio signal in the first time-frequency resource, the box F9 in FIG. 5 does not exist, which means that the U2 does not monitor the second signaling in the third time-frequency resource.

Embodiment 6

Figure 6:
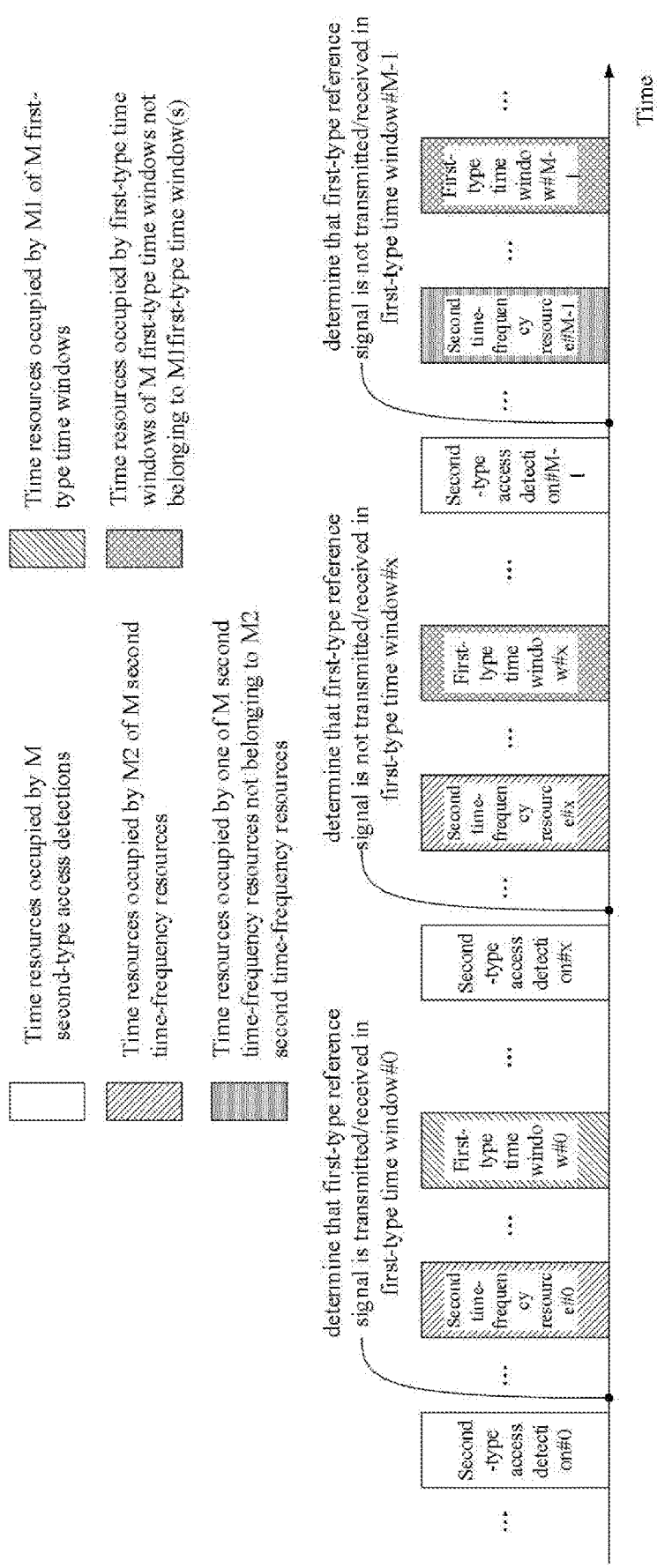
FIG. 6 illustrates a schematic diagram of sequential relations of M first-type time windows, M second time-frequency resources and M second-type access detections in time domain according to one embodiment of the present disclosure.

Embodiment 6 illustrates a schematic diagram of sequential relations of M first-type time windows, M second time-frequency resources and M second-type access detections in time domain; as shown in FIG. 6.

In Embodiment 6, the M first-type time windows are reserved for the first-type reference signal of the present disclosure, the UE of the present disclosure determines that it is only needed to receive the first-type reference signal in M1 first-type time window(s) of the M first-type time windows, and the base station of the present disclosure determines that it is only needed to transmit the first-type reference signal in M1 first-type time window(s) of the M first-type time windows. The UE monitors the M second radio signals of the present disclosure respectively in the M second time-frequency resources, and detects M2 second radio signal(s) of the M second radio signals; the M second radio signals respectively correspond to the M first-type time windows. The base station determines whether the first-type reference signal is transmitted in the M first-type time windows respectively according to results of the M second-type access detections. The M2 is greater than the M1, M1 second radio signal(s) of the M2 second radio signals respectively corresponds(correspond) to the M1 first-type time window(s). M is a positive integer, M2 is a positive integer no greater than the M. Start times for the M first-type time windows are no earlier than end times for the M second-type access detections respectively; Start times for time resources occupied by the M second time-frequency resources are no earlier than end times for the M second-type access detections respectively.

In FIG. 6, indexes for the M first-type time windows, the M second time-frequency resources and the M second-type access detections are #0, . . . , #x . . . , and #M−1, respectively, where x is a positive integer less than M−1. The base station determines to transmit the first-type reference signal in first-type time window #0 and not to transmit the first-type reference signal in first-type time window #x and first-type time window #M−1 respectively according to results of second-type access detection #0, second-type access detection #x and second-type access detection #M−1. The UE determines to receive the first-type reference signal in first-type time window #0 and not to receive the first-type reference signal in first-type time window #x and first-type time window #M−1. The base station transmits corresponding second radio signals respectively in second time-frequency resource #0 and second time-frequency resource #x, and does not transmit a corresponding second radio signal in second time-frequency resource #M−1. In FIG. 6, the blank boxes represent time resources occupied by the M second-type access detections, the slash-filled boxes represent time resources occupied by M2 of the M second time-frequency resources, and the dot-filled box represents time resources occupied by one of the M second time-frequency resources not belonging to the M2 second time-frequency resources; the back-slash-filled box represents time resources occupied by M1 of the M first-type time windows, the cross-filled boxes represent time resources occupied by first-type time windows of the M first-type time windows not belonging to the M1 first-type time window(s). The M2 second time-frequency resource are second time-frequency resources of the M second time-frequency resources respectively corresponding to the M2 second radio signals.

In one embodiment, the M first-type time windows are mutually orthogonal (that is, non-overlapped) in time domain.

In one embodiment, any of the M first-type time windows is a consecutive duration.

In one embodiment, any two of the M first-type time windows are not contiguous in time domain.

In one embodiment, any two adjacent first-type time windows of the M first-type time windows are spaced by an equal time interval.

In one embodiment, any two of the M first-type time windows are of a same duration.

In one embodiment, at least two of the M first-type time windows are of different durations.

In one embodiment, the UE drops receiving the first-type reference signal in any of the M first-type time windows not belonging to the M1 first-type time window(s).

In one embodiment, the base station drops transmitting the first-type reference signal in any of the M first-type time windows not belonging to the M1 first-type time window(s).

In one embodiment, positions of the M1 first-type time windows in the M first-type time windows are contiguous.

In one embodiment, positions of the M1 first-type time windows in the M first-type time windows are non-contiguous.

In one embodiment, the UE receives M1 first-type reference sub-signal(s) respectively in the M1 first-type time window(s); the first-type reference signal comprises the M1 first-type reference sub-signal(s), and the M1 first-type time window(s) is(are) respectively reserved for the M1 first-type reference sub-signal(s). Measurement(s) on the M1 first-type reference sub-signal(s) is(are) respectively used to determine M1 first-type value(s), among the M1 first-type value(s) there is(are) M3 first-type value(s) lower than a second threshold. M3 first-type time window(s) is(are) first-type time window(s) of the M first-type time windows corresponding to the M3 first-type value(s).

In one subembodiment, positions of the M3 first-type time windows in the M first-type time windows are contiguous.

In one subembodiment, positions of the M3 first-type time windows in the M first-type time windows are non-contiguous.

In one subembodiment, among the M1 first-type value(s) there is(are) only M3 first-type value(s) lower than a second threshold.

In one embodiment, a start time for a first-type time window of the M first-type time window corresponding to the given second-type access detection of the present disclosure is no earlier than (an) end time(s) for the P time sub-pool(s) of the present disclosure.

In one embodiment, any of the M second time-frequency resources is located before a corresponding first-type time window in time domain.

In one embodiment, any of the M second time-frequency resources is located behind time resources occupied by a corresponding second-type access detection.

In one embodiment, the M1 second radio signal(s) of the M2 second radio signals is(are) respectively used to indicate that the first-type reference signal is to be received in the M1 first-type time window(s).

In one embodiment, each second radio signal of the M2 second radio signals other than the M1 second radio signal(s) is used to indicate that the first-type reference signal is not to be received in a corresponding first-type time window.

Embodiment 7

Figure 7:
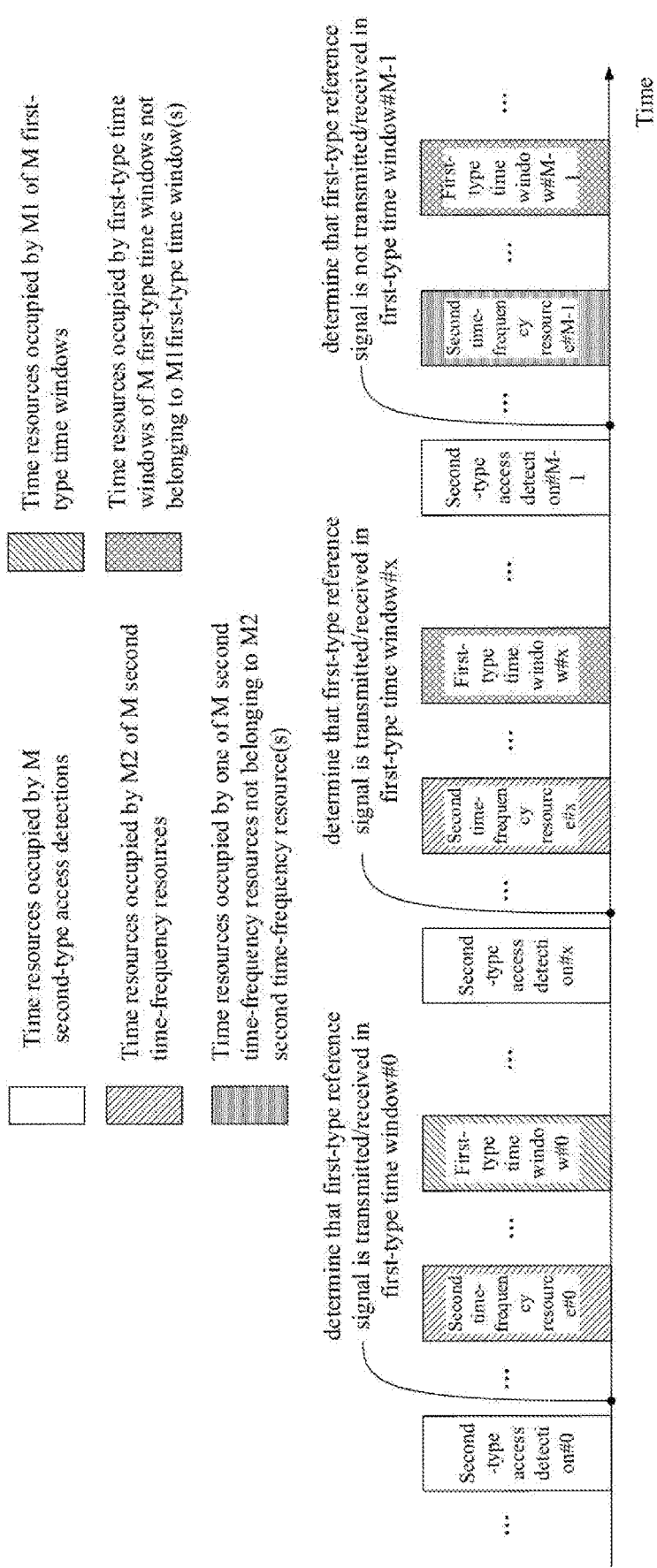
FIG. 7 illustrates a schematic diagram of sequential relations of M first-type time windows, M second time-frequency resources and M second-type access detections in time domain according to one embodiment of the present disclosure.

Embodiment 7 illustrates a schematic diagram of sequential relations of M first-type time windows, M second time-frequency resources and M second-type access detections in time domain; as shown in FIG. 7.

In Embodiment 7, the M first-type time windows are reserved for the first-type reference signal of the present disclosure, the UE of the present disclosure determines that it is only needed to receive the first-type reference signal in M1 first-type time window(s) of the M first-type time windows, and the base station of the present disclosure determines that it is only needed to transmit the first-type reference signal in M1 first-type time window(s) of the M first-type time windows. The UE monitors the M second radio signals of the present disclosure respectively in the M second time-frequency resources, and detects M2 second radio signal(s) of the M second radio signals; the M second radio signals respectively correspond to the M first-type time windows. The base station determines whether the first-type reference signal is transmitted in the M first-type time windows respectively according to results of the M second-type access detections. The M2 is equal to the M1, the M2 second radio signal(s) respectively corresponds(correspond) to the M1 first-type time window(s). M is a positive integer, M2 is a positive integer no greater than the M. Start times for the M first-type time windows are no earlier than end times for the M second-type access detections respectively; Start times for time resources occupied by the M second time-frequency resources are no earlier than end times for the M second-type access detections respectively.

In FIG. 7, indexes for the M first-type time windows, the M second time-frequency resources and the M second-type access detections are #0, . . . , #x . . . , and #M−1, respectively, where x is a positive integer less than M−1. The base station determines to transmit the first-type reference signal in first-type time window #0 and first-type time window #x, and not to transmit the first-type reference signal in first-type time window #M−1 respectively according to results of second-type access detection #0, second-type access detection #x and second-type access detection #M−1. The UE determines to receive the first-type reference signal in first-type time window #0 and first-type time window #x and not to receive the first-type reference signal in first-type time window #M−1. The base station transmits corresponding second radio signals respectively in second time-frequency resource #0 and second time-frequency resource #x, and does not transmit a corresponding second radio signal in second time-frequency resource #M−1. In FIG. 7, the blank boxes represent time resources occupied by the M second-type access detections, the slash-filled boxes represent time resources occupied by M2 of the M second time-frequency resources, and the dot-filled box represents time resources occupied by one of the M second time-frequency resources not belonging to the M2 second time-frequency resource(s); the back-slash-filled box represents time resources occupied by M1 of the M first-type time windows, the cross-filled boxes represent time resources occupied by first-type time windows of the M first-type time windows not belonging to the M1 first-type time window(s). The M2 second time-frequency resource(s) is(are) second time-frequency resource(s) of the M second time-frequency resources respectively corresponding to the M2 second radio signal(s).

Embodiment 8

Figure 8:
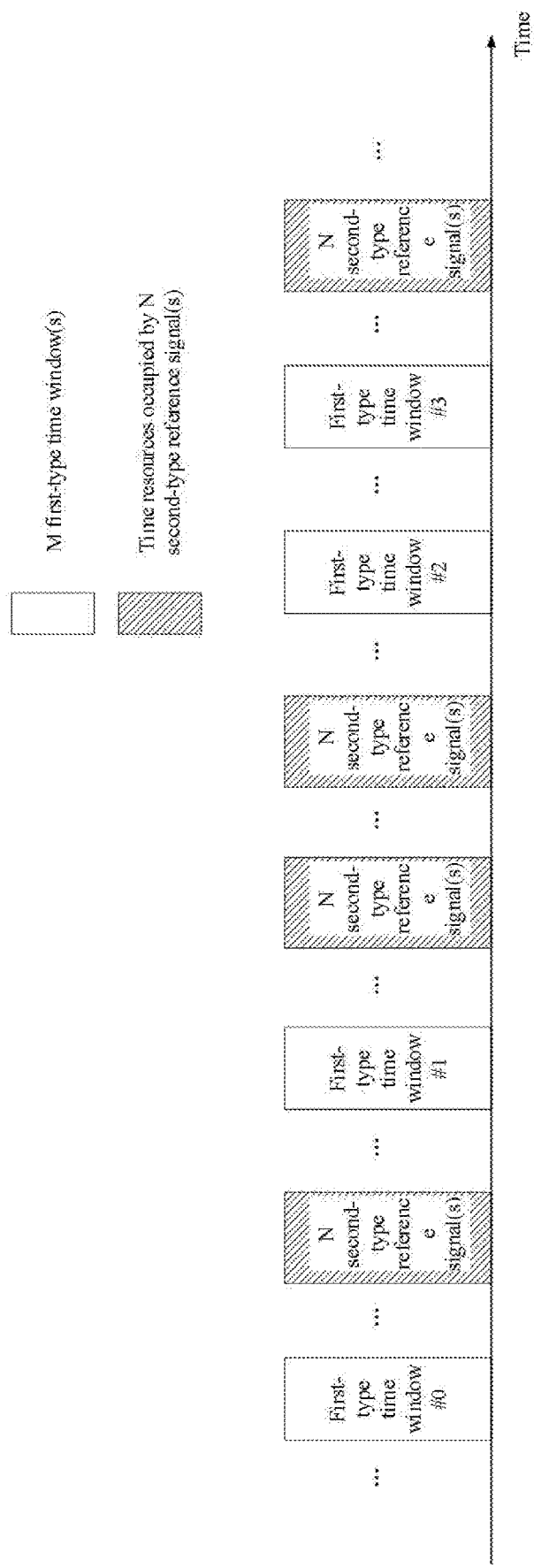
FIG. 8 illustrates a schematic diagram of sequential relation(s) of M first-type time window(s) and N second-type reference signal(s) in time domain according to one embodiment of the present disclosure.

Embodiment 8 illustrates a schematic diagram of sequential relation(s) of M first-type time window(s) and N second-type reference signal(s) in time domain; as shown in FIG. 8.

In Embodiment 8, the N second-type reference signal(s) occurs(occur) multiple times in time domain, time resources occupied by the N second-type reference signal(s) being orthogonal (non-overlapping) with time resources occupied by the M first-type time window(s). In FIG. 8, the blank box represents each of the M first-type time window(s), while the slash-filled box represents time resources occupied by the N second-type reference signal(s).

In one embodiment, any two adjacent occurrences of the N second-type reference signal(s) in time domain are spaced by an equal time interval.

In one embodiment, any two adjacent occurrences of the N second-type reference signal(s) in time domain are spaced by unequal time intervals.

Embodiment 9

Figure 9:
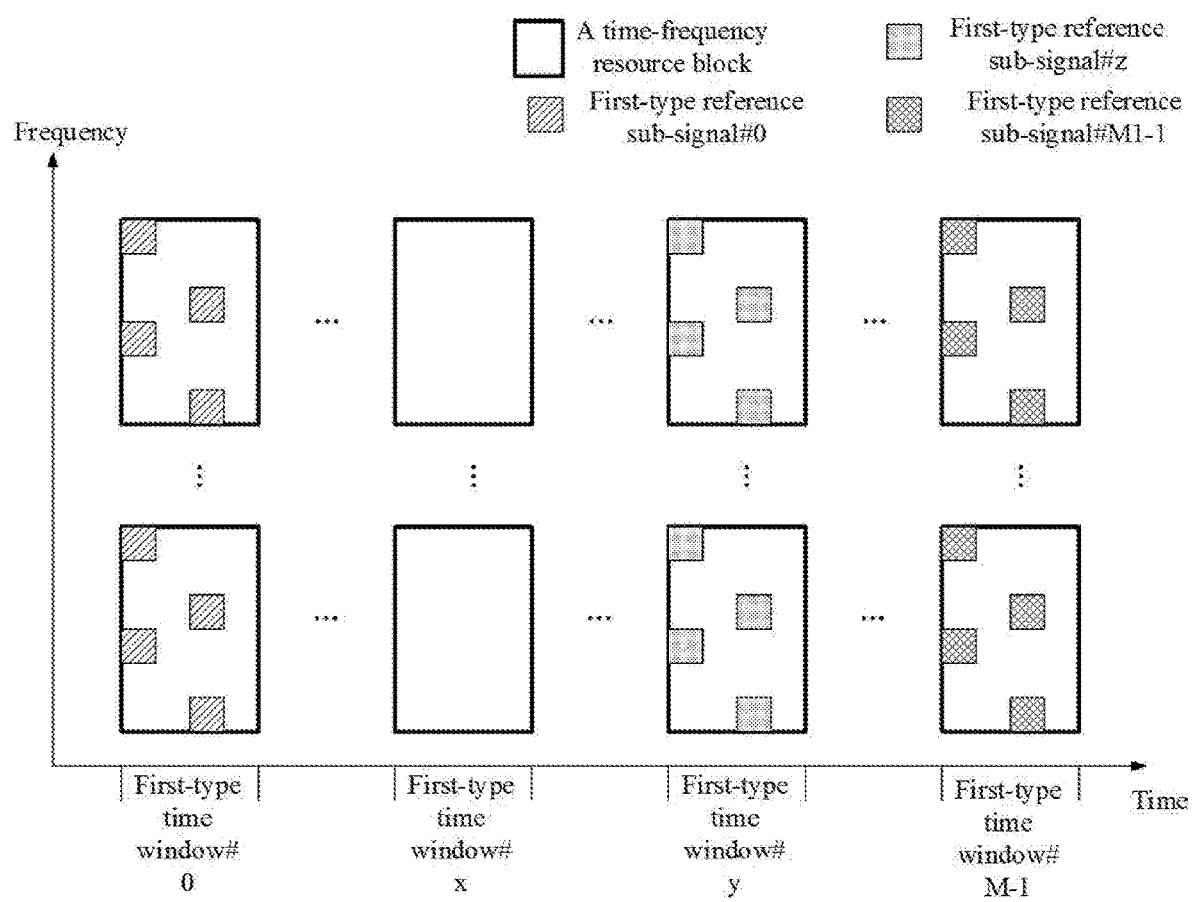
FIG. 9 illustrates a schematic diagram of resource mapping of M1 first-type reference sub-signals in time-frequency domain according to one embodiment of the present disclosure.

Embodiment 9 illustrates a schematic diagram of resource mapping of M1 first-type reference sub-signals in time-frequency domain; as shown in FIG. 9.

In Embodiment 9, the M first-type time windows of the present disclosure are reserved for the first-type reference signal of the present disclosure, the UE of the present disclosure determines that it is only needed to receive the first-type reference signal in M1 first-type time windows of the M first-type time windows; the first-type reference signal comprises the M1 first-type reference sub-signals, and the M1 first-type time windows are respectively reserved for the M1 first-type reference sub-signals. The M1 first-type reference sub-signals occupy a same frequency-domain resource, and any two of the M1 first-type reference sub-signals share a same pattern in a time-frequency resource block.

In FIG. 9, indexes for the M first-type time windows are #0 . . . , #x . . . , #y . . . , and #M−1, respectively, where x and y are positive integers less than M−1 and the x is less than the y; indexes for the M1 first-type reference sub-signals are #0 . . . , #z . . . , and #M1-1, respectively, where z is a positive integer less than M1-1. Each large box framed with thick solid lines represents a time-frequency resource; the slash-filled box represents first-type reference sub-signal #0 of the M1 first-type reference sub-signals; the dot-filled box represents first-type reference sub-signal #z of the M1 first-type reference sub-signals; the cross-filled box represents first-type reference sub-signal #M1-1 of the M1 first-type reference sub-signals. First-type time window #0, first-type time window #y and first-type time window #M−1 of the M first-type reference sub-signals all belong to the M1 first-type time windows, while first-type time window #x of the M first-type reference sub-signals does not belong to the M1 first-type time windows.

In one embodiment, the M first-type time windows are non-contiguous in time domain.

In one embodiment, any two adjacent first-type time windows of the M first-type time windows are spaced by an equal time interval.

In one embodiment, positions of the M1 first-type time windows in the M first-type time windows are consecutive.

In one embodiment, positions of the M1 first-type time windows in the M first-type time windows are non-consecutive.

In one embodiment, the first-type reference signal comprises Channel State Information-Reference Signal (CSI-RS).

In one embodiment, the first-type reference signal comprises DeModulation Reference Signals (DMRS).

In one embodiment, the first-type reference signal comprises either Primary Synchronization Signal (PSS) or Secondary Synchronization Signal (SSS) or both.

In one embodiment, the first-type reference signal comprises one or more of Master Information Block (MIB) or a System Information Block (SIB).

In one embodiment, the first-type reference signal comprises finetime/frequency Tracking Reference Signals (TRS).

In one embodiment, the first-type reference signal comprises Phase error Tracking Reference Signals (PRTS).

In one embodiment, the first-type reference signal is periodic.

In one embodiment, the first-type reference signal is semi-persistent.

In one embodiment, the first-type reference signal occurs multiple times in time domain.

In one subembodiment, any two adjacent occurrences of the first-type reference in time domain are spaced by an equal time interval.

In one subembodiment, any two adjacent occurrences of the first-type reference in time domain are spaced by unequal time intervals.

In one embodiment, the first-type reference signal is wideband.

In one embodiment, the first sub-band is divided into a positive integer number of frequency-domain zones, and the first-type reference signal occurs in each of the positive integer number of frequency-domain zones, any frequency-domain zone of the positive integer number of frequency-domain zones comprising a positive integer number of contiguous subcarriers.

In one subembodiment, any two of the positive integer number of the frequency-domain zones comprise equal numbers of subcarriers.

In one embodiment, the first-type reference signal is narrowband.

In one embodiment, the first sub-band is divided into a positive integer number of frequency-domain zones, and the first-type reference signal only occurs in part of the positive integer number of frequency-domain zones, any frequency-domain zone of the positive integer number of frequency-domain zones comprising a positive integer number of contiguous subcarriers.

In one subembodiment, any two of the positive integer number of the frequency-domain zones comprise equal numbers of subcarriers.

In one embodiment, time-domain resources occupied by the M1 first-type reference sub-signals are mutually orthogonal (i.e., non-overlapping).

In one embodiment, a time-frequency resource block is a Physical Resource Block Pair (PRBP).

In one embodiment, a time-frequency resource block occupies a positive integer number of subcarrier(s) in frequency domain and a positive integer number of multicarrier symbol(s) in time domain.

Embodiment 10

Figure 10:
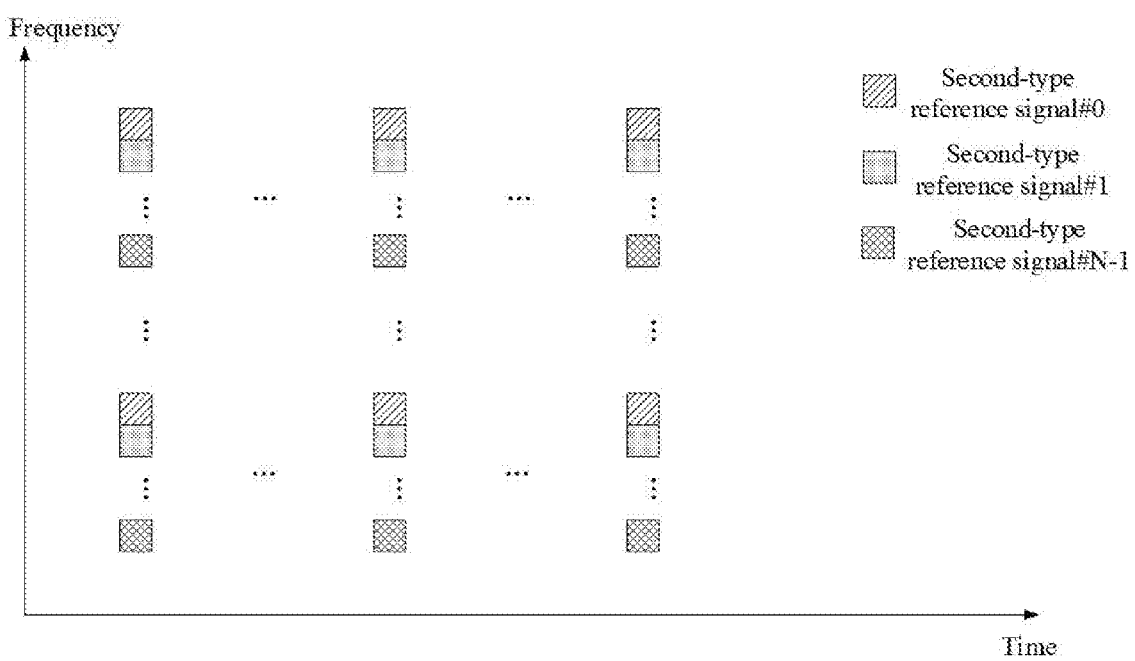
FIG. 10 illustrates a schematic diagram of resource mapping of N second-type reference signal(s) in time-frequency domain according to one embodiment of the present disclosure.

Embodiment 10 illustrates a schematic diagram of resource mapping of N second-type reference signal(s) in time-frequency domain; as shown in FIG. 10.

In Embodiment 10, the N second-type reference signal(s) occurs(occur) multiple times in time domain. In FIG. 10, index(indexes) of the N second-type reference signal(s) is(are) #0, #1 . . . , and #N−1, respectively. The slash-filled box represents second-type reference signal #0 of the N second-type reference signal(s); the dot-filled box represents second-type reference signal #1 of the N second-type reference signal(s); and the cross-filled box represents second-type reference signal #N−1 of the N second-type reference signal(s).

In one embodiment, any of the N second-type reference signal(s) comprises a CSI-RS.

In one embodiment, any of the N second-type reference signal(s) comprises a DMRS.

In one embodiment, any of the N second-type reference signal(s) comprises one or more of a PSS or an SSS.

In one embodiment, any of the N second-type reference signal(s) comprises one or more of a MIB or a SIB.

In one embodiment, any of the N second-type reference signal(s) comprises a TRS.

In one embodiment, any of the N second-type reference signal(s) comprises a PRTS.

In one embodiment, each of the N second-type reference signal(s) is periodic.

In one embodiment, each of the N second-type reference signal(s) is semi-persistent.

In one embodiment, any two adjacent occurrences of any second-type reference signal of the N second-type reference signal(s) in time domain are spaced by an equal time interval.

In one embodiment, any two adjacent occurrences of at least one of the N second-type reference signal(s) in time domain are spaced by unequal time intervals.

In one embodiment, any of the N second-type reference signal(s) is wideband.

In one embodiment, the first sub-band is divided into a positive integer number of frequency-domain zones, any of the N second-type reference signal(s) occurs in each of the positive integer number of frequency-domain zones, any frequency-domain zone of the positive integer number of frequency-domain zones comprising a positive integer number of contiguous subcarriers.

In one subembodiment, any two of the positive integer number of the frequency-domain zones comprise equal numbers of subcarriers.

In one embodiment, any of the N second-type reference signal(s) is narrowband.

In one embodiment, the first sub-band is divided into a positive integer number of frequency-domain zones, and any of the N second-type reference signal(s) only occurs in part of the positive integer number of frequency-domain zones, any frequency-domain zone of the positive integer number of frequency-domain zones comprising a positive integer number of contiguous subcarriers.

In one subembodiment, any two of the positive integer number of the frequency-domain zones comprise equal numbers of subcarriers.

Embodiment 11

Figure 11:
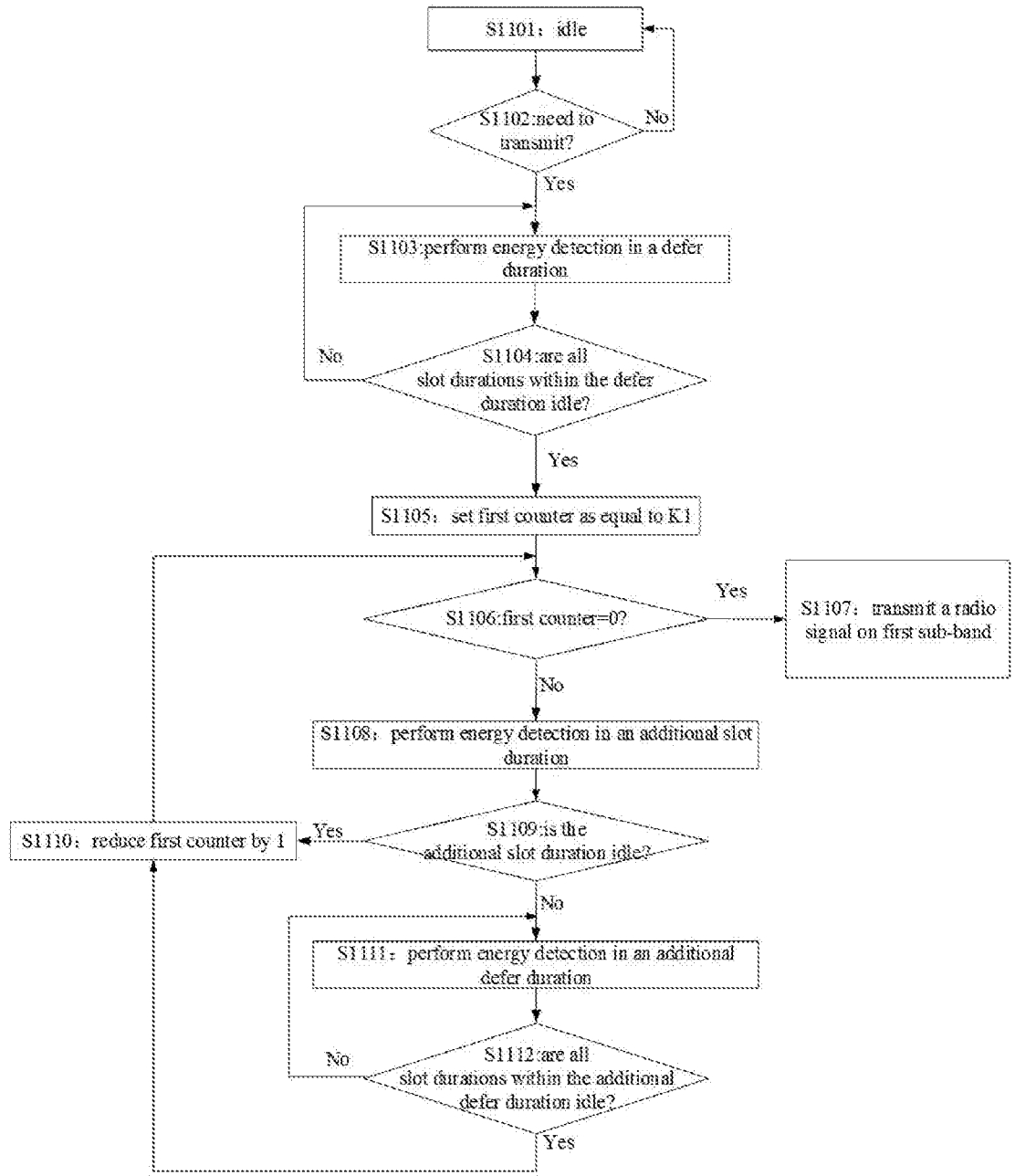
FIG. 11 illustrates a schematic diagram of a given access detection according to one embodiment of the present disclosure.

Embodiment 11 illustrates a schematic diagram of a given access detection; as shown in FIG. 11. The given access detection is one of the first-type access detection of the present disclosure, the given second-type access detection of the present disclosure or the third-type access detection of the present disclosure.

In Embodiment 11, the given access detection comprises: performing T energy detection(s) respectively in T time sub-pool(s) in the first sub-band of the present disclosure to obtain T detection value(s); herein, each of T1 detection value(s) among the T detection value(s) is lower than a reference threshold; T is a positive integer, and T1 is a positive integer no greater than the T. T1 time sub-pool(s) is(are) time sub-pool(s) respectively corresponding to the T1 detection value(s) among the T time sub-pool(s). The process of the T energy detection(s) can be depicted by the flowchart in FIG. 11. If the given access detection is the first-type access detection, T is equal to the Q of the present disclosure, T1 is equal to the Q1 of the present disclosure, and the reference threshold is the fourth threshold of the present disclosure; if the given access detection is the given second-type access detection, T is equal to the P of the present disclosure, T1 is equal to the P1 of the present disclosure, and the reference threshold is the fifth threshold of the present disclosure; if the given access detection is the third-type access detection, T is equal to the W of the present disclosure, T1 is equal to the W1 of the present disclosure, and the reference threshold is the seventh threshold of the present disclosure.

In FIG. 11, a given node is idle in step S1101, and determines in step S1102 whether there is need to transmit; performs energy detection in a defer duration in step S1103; and determine in step S1104 whether all slot durations within the defer duration are idle, if yes, move forward to step S1105 to set a first counter as K1; otherwise go back to step S1104; the given node determines whether the first counter is 0 in step S1106, if yes, move forward to step S1107 to transmit a radio signal in the first sub-band of the present disclosure; otherwise move forward to step S1108 to perform energy detection in an additional slot duration; determines in step S1109 whether the additional slot duration is idle, if yes, move forward to step S1110 to reduce the first counter by 1 and then go back to step S1106; otherwise, move forward to step S1111 to perform energy detection in an additional defer duration; the given node determines in step S1112 whether all slot durations within the additional defer duration are idle, if yes, move back to step S1110; otherwise go back to step S1111. If the given access detection is the first-type access detection, the given node is the UE of the present disclosure; if the given access detection is the given second-type access detection or the third-type access detection, the given node is the base station of the present disclosure. K1 is one of K candidate integer(s), where K is a positive integer.

In Embodiment 11, a first given duration comprises a positive integer number of time sub-pool(s) of the T time sub-pool(s), and the first given duration is any duration of all defer durations, all additional slot durations, and all additional defer durations comprised in FIG. 11. A second given duration comprises one of the T1 time sub-pool(s), and the second given duration is any duration of all additional slot durations and all additional defer durations in FIG. 11, which is determined as idle through energy detection.

In one embodiment, any slot duration in a given duration comprises one of the T time sub-pool(s); the given duration is any duration of all defer durations, all additional slot durations, and all additional defer durations comprised in FIG. 11.

In one embodiment, the phrase of performing energy detection in a given duration refers to performing energy detection on all slot durations within the given duration; the given duration is any duration of all defer durations, all additional slot durations, and all additional defer durations comprised in FIG. 11.

In one embodiment, the phrase that a given duration is determined to be idle through energy detection means that all slot durations comprised in the given duration are determined to be idle through energy detection; the given duration is any duration of all defer durations, all additional slot durations, and all additional defer durations comprised in FIG. 11.

In one embodiment, the phrase that a given slot duration is determined to be idle through energy detection means that the given node senses power of all radio signals in the first sub-band in a given time unit and averages in time, from which a received power acquired is lower than the reference threshold; the given time unit is a consecutive time duration in the given slot duration.

In one subembodiment, the given time unit lasts no shorter than 4 μs.

In one embodiment, the phrase that a given slot duration is determined to be idle through energy detection means that the given node senses energy of all radio signals in the first sub-band in a given time unit and averages in time, from which a received energy acquired is lower than the reference threshold; the given time unit is a consecutive time duration in the given slot duration.

In one subembodiment, the given time unit lasts no shorter than 4 μs.

In one embodiment, the phrase that a given slot duration is determined to be idle through energy detection means that the given node performs energy detection on a time sub-pool comprised by the given slot duration, from which a detection value acquired is lower than the reference threshold; the time sub-pool belongs to the T time sub-pool(s), and the detection value is one of the T detection value(s).

In one embodiment, performing energy detection in a given duration refers to performing energy detection in each time sub-pool within the given duration; the given duration is any duration of all defer durations, all additional slot durations, and all additional defer durations comprised in FIG. 11, and the each time sub-pool belongs to the T time sub-pool(s).

In one embodiment, the phrase that a given duration is determined to be idle through energy detection means that each of detection value(s) obtained through energy detection on time sub-pool(s) comprised in the given duration is lower than the reference threshold; the given duration is any duration of all defer durations, all additional slot durations, and all additional defer durations comprised in FIG. 11. The time sub-pool(s) belongs(belong) to the T time sub-pool(s), and the detection value(s) belongs(belong) to the T detection value(s).

In one embodiment, a defer duration lasts 16 μs plus S1 time(s) the length of 9 μs, S1 being a positive integer.

In one subembodiment, a defer duration comprises S1+1 time sub-pools of the T time sub-pools.

In one reference embodiment of the above subembodiment, a first time sub-pool of the S1+1 time sub-pools lasts no longer than 16 μs, while among the other S1 time sub-pool(s) each lasts no longer than 9 μs.

In one subembodiment, the S1 is one of 1, 2, 3 and 7.

In one embodiment, a defer duration comprises multiple slot durations.

In one subembodiment, a first slot duration and a second slot duration among the multiple slot durations are non-consecutive.

In one subembodiment, a first slot duration and a second slot duration among the multiple slot durations are spaced by a time interval of 7 ms.

In one embodiment, an additional defer duration lasts 16 µs plus S2 time(s) the length of 9 µs, S2 being a positive integer.

In one subembodiment, an additional defer duration comprises S2+1 time sub-pools of the T time sub-pools.

In one reference embodiment of the above subembodiment, a first time sub-pool of the S2+1 time sub-pools lasts no longer than 16 µs, while among the other S2 time sub-pool(s) each lasts no longer than 9 µs.

In one subembodiment, the S2 is one of 1, 2, 3 and 7.

In one embodiment, a defer duration lasts as long as an additional defer duration.

In one embodiment, the S1 is equal to the S2.

In one embodiment, an additional defer duration comprises multiple slot durations.

In one subembodiment, a first slot duration and a second slot duration among the multiple slot durations are non-consecutive.

In one subembodiment, a first slot duration and a second slot duration among the multiple slot durations are spaced by a time interval of 7 ms.

In one embodiment, a slot duration lasts 9 µs.

In one embodiment, a slot duration comprises one time sub-pool of the T time sub-pool(s).

In one subembodiment, the one time sub-pool lasts no longer than 9 µs.

In one embodiment, an additional slot duration lasts 9 µs.

In one embodiment, an additional slot duration comprises one time sub-pool of the T time sub-pool(s).

In one subembodiment, the one time sub-pool lasts no longer than 9 µs.

In one embodiment, the K is one of 3, 7, 15, 31, 63, 127, 255, 511, and 1023.

In one embodiment, the K is $CW_p$ in Cat4 LBT, the $CW_p$ refers to contention window size, and for detailed definition of the $CW_p$, refer to 3GPP TS36.213, section 15.

In one embodiment, the K candidate integers are 0, 1, 2 . . . , and K−1.

In one embodiment, the given node randomly selects a value of the K1 from the K candidate integers.

In one embodiment, any of the K candidate integers is chosen as the value of the K1 at equal probability.

In one embodiment, the T energy detection(s) is(are) energy detection(s) in LBT, for the detailed definition and way of implementation of the LBT, refer to 3GPP TR36.889.

In one embodiment, the T energy detection(s) is(are) energy detection(s) in a Clear Channel Assessment (CCA), for the detailed definition and way of implementation of the CCA, 3GPP TR36.889.

In one embodiment, any of the T energy detection(s) is realized in a way defined in 3GPP TS36.213, section 15.

In one embodiment, any of the T energy detection(s) is realized in a way of energy detection in WiFi.

In one embodiment, any of the T energy detection(s) is realized by measuring Received Signal Strength Indication (RSSI).

In one embodiment, any of the T energy detection(s) is realized in a way of energy detection in LTE LAA.

In one embodiment, time-domain resources occupied by any of the T time sub-pool(s) are contiguous.

In one embodiment, the T time sub-pools are mutually orthogonal (that is, non-overlapping) in time domain.

In one embodiment, any of the T time sub-pool(s) lasts either 16 µs or 9 µs.

In one embodiment, at least two of the T time sub-pools are of unequal durations.

In one embodiment, any two of the T time sub-pools are of an equal duration.

In one embodiment, time-domain resources occupied by the T time sub-pool(s) are contiguous.

In one embodiment, among the T time sub-pools there are at least two adjacent time sub-pools occupying non-contiguous time-domain resources.

In one embodiment, among the T time sub-pools any two adjacent time sub-pools occupy non-contiguous time-domain resources.

In one embodiment, any of the T time sub-pool(s) is a slot duration.

In one embodiment, any of the T time sub-pool(s) is a $T_{sl}$, the $T_{sl}$ is a slot duration, and the detailed definition of the $T_{sl}$ can be found in 3GPP TS36.213, section 15.

In one embodiment, any of the T time sub-pools other than an earliest time sub-pool is a slot duration.

In one embodiment, any of the T time sub-pools other than an earliest time sub-pool is a $T_{sl}$, the $T_{sl}$ is a slot duration, and the detailed definition of the $T_{sl}$ can be found in 3GPP TS36.213, section 15.

In one embodiment, among the T time sub-pool(s) there is at least one time sub-pool that lasts 16 µs.

In one embodiment, among the T time sub-pool(s) there is at least one time sub-pool that lasts 9 µs.

In one embodiment, an earliest time sub-pool among the T time sub-pools lasts 16 µs.

In one embodiment, a latest time sub-pool among the T time sub-pools lasts 9 µs.

In one embodiment, the T time sub-pool(s) comprises (comprise) listening time in Cat 4 LBT.

In one embodiment, the T time sub-pool(s) comprises (comprise) slot durations comprised in a defer duration and slot durations comprised in backoff time in Cat 4 LBT.

In one embodiment, the T time sub-pool(s) comprises (comprise) slot durations comprised in a defer duration and slot durations comprised in backoff time in Type 1 UL channel access procedure.

In one embodiment, the T time sub-pool(s) comprises (comprise) slot durations comprised in an initial CCA and an Enhanced Clear Channel Assessment (eCCA).

In one embodiment, the T detection value(s) is(are) respectively obtained by the T energy detection(s).

In one embodiment, the T detection value(s) is(are) respectively T received power(s) acquired by the given node's first sensing power of all radio signals in T time unit(s) in the first sub-band and then averaging in time; the T time unit(s) is(are) consecutive time duration(s) respectively in the T time sub-pool(s).

In one subembodiment, any of the T time unit(s) lasts no shorter than 4 µs.

In one embodiment, the T detection value(s) is(are) respectively T received energy(energies) acquired by the given node's first sensing energy of all radio signals in T time unit(s) in the first sub-band and then averaging in time; the T time unit(s) is(are) consecutive time duration(s) respectively in the T time sub-pool(s).

In one subembodiment, any of the T time unit(s) lasts no shorter than 4 µs.

In one embodiment, any given energy detection of the T energy detection(s) means that the given node monitors a received power in a given time unit, the given time unit is a consecutive duration in one of the T time sub-pool(s) that corresponds to the given energy detection.

In one embodiment, any given energy detection of the T energy detection(s) means that the given node monitors a received energy in a given time unit, the given time unit is a consecutive duration in one of the T time sub-pool(s) that corresponds to the given energy detection.

In one embodiment, the T energy detection(s) is(are) used to determine whether the first sub-band is idle.

In one embodiment, the T energy detection(s) is(are) used to determine whether the first sub-band can be used by the given node for radio signal transmission.

In one embodiment, each of the T detection value(s) is measured by dBm.

In one embodiment, each of the T detection value(s) is measured by mW.

In one embodiment, each of the T detection value(s) is measured by J.

In one embodiment, the T1 is less than the T.

In one embodiment, the T1 is equal to 0.

In one embodiment, the T1 is greater than 0.

In one embodiment, the T is greater than 1.

In one embodiment, the reference threshold is measured by dBm.

In one embodiment, the reference threshold is measured by mW.

In one embodiment, the reference threshold is measured by J.

In one embodiment, the reference threshold is equal to or less than −72 dBm.

In one embodiment, the reference threshold is any value equal to or less than a first given value.

In one subembodiment, the first given value is pre-defined.

In one subembodiment, the first given value is configured by a higher-layer signaling, and the given access detection is the first-type access detection.

In one embodiment, the reference threshold is liberally selected by the given node given that the reference threshold is equal to or less than a first given value.

In one subembodiment, the first given value is pre-defined.

In one subembodiment, the first given value is configured by a higher-layer signaling, and the given access detection is the first-type access detection.

In one embodiment, the T1 is equal to the K1, and the given access detection is the first-type access detection or the third-type access detection.

In one embodiment, the T1 is equal to the K1, and the given access detection is the given second-type access detection, the given second-type access detection corresponding to one of the M2 second radio signal(s) of the present disclosure.

In one embodiment, the T1 is equal to the K1, and the given access detection is the given second-type access detection, the given second-type access detection corresponding to one of the M1 first-type time window(s) of the present disclosure.

In one embodiment, the T1 is less than the K1, and the given access detection is the given second-type access detection, the given second-type access detection corresponding to one of the M second radio signals other than the M2 second radio signal(s).

In one embodiment, the T1 is less than the K1, and the given access detection is the given second-type access detection, the given second-type access detection corresponding to one of the M first-type time windows other than the M1 first-type time window(s).

In one embodiment, among detection value(s) among the T detection values other than the T1 detection value(s) there is at least one detection value lower than the reference threshold.

In one embodiment, among detection value(s) among the T detection values other than the T1 detection value(s) there is at least one detection value not lower than the reference threshold.

In one embodiment, the T1 time sub-pool(s) only comprises(comprise) slot durations in an eCCA.

In one embodiment, the T time sub-pools comprise the T1 time sub-pool(s) and the T2 time sub-pool(s), any one of the T2 time sub-pool(s) not belonging to the T1 time sub-pool(s); T2 is no greater than a different between the T and the T1.

In one subembodiment, the T2 time sub-pool(s) comprises(comprise) slot durations in an initial CCA.

In one subembodiment, positions of the T2 time sub-pools in the T time sub-pools are consecutive.

In one subembodiment, at least one of the T2 time sub-pool(s) corresponds to a detection value lower than the reference threshold.

In one subembodiment, at least one of the T2 time sub-pool(s) corresponds to a detection value no lower than the reference threshold.

In one subembodiment, the T2 time sub-pool(s) comprises(comprise) all slot durations within all defer durations.

In one subembodiment, the T2 time sub-pool(s) comprises(comprise) all slot durations within at least one additional defer duration.

In one subembodiment, the T2 time sub-pool(s) comprises(comprise) at least one additional slot duration.

In one subembodiment, the T2 time sub-pool(s) comprises(comprise) all slot durations within all additional slot durations and all additional defer durations in FIG. 11 determined to be non-idle through energy detection.

In one embodiment, the T1 time sub-pool(s) respectively belongs(belong) to T1 sub-pool set(s), and any of the T1 sub-pool set(s) comprises a positive integer number of time sub-pool(s) of the T time sub-pool(s); any time sub-pool in the T1 sub-pool set(s) corresponds to a detection value lower than the reference threshold.

In one subembodiment, among the T1 sub-pool set(s) there is at least one sub-pool set comprising 1 time sub-pool.

In one subembodiment, among the T1 sub-pool set(s) there is at least one sub-pool set comprising more than 1 time sub-pool.

In one subembodiment, among the T1 sub-pool sets there are at least two sub-pool sets comprising unequal numbers of time sub-pools.

In one subembodiment, none of the T time sub-pools belongs to two sub-pool sets of the T1 sub-pool sets simultaneously.

In one subembodiment, each time sub-pools comprised in any of the T1 sub-pool set(s) belongs to a same additional defer duration or additional slot duration determined to be idle through energy detection.

In one subembodiment, among time sub-pool(s) of the T time sub-pools not belonging to the T1 sub-pool set(s) there is at least one time sub-pool corresponding to a detection value lower than the given threshold.

In one subembodiment, among time sub-pool(s) of the T time sub-pools not belonging to the T1 sub-pool set(s) there is at least one time sub-pool corresponding to a detection value no lower than the given threshold.

Embodiment 12

Figure 12:
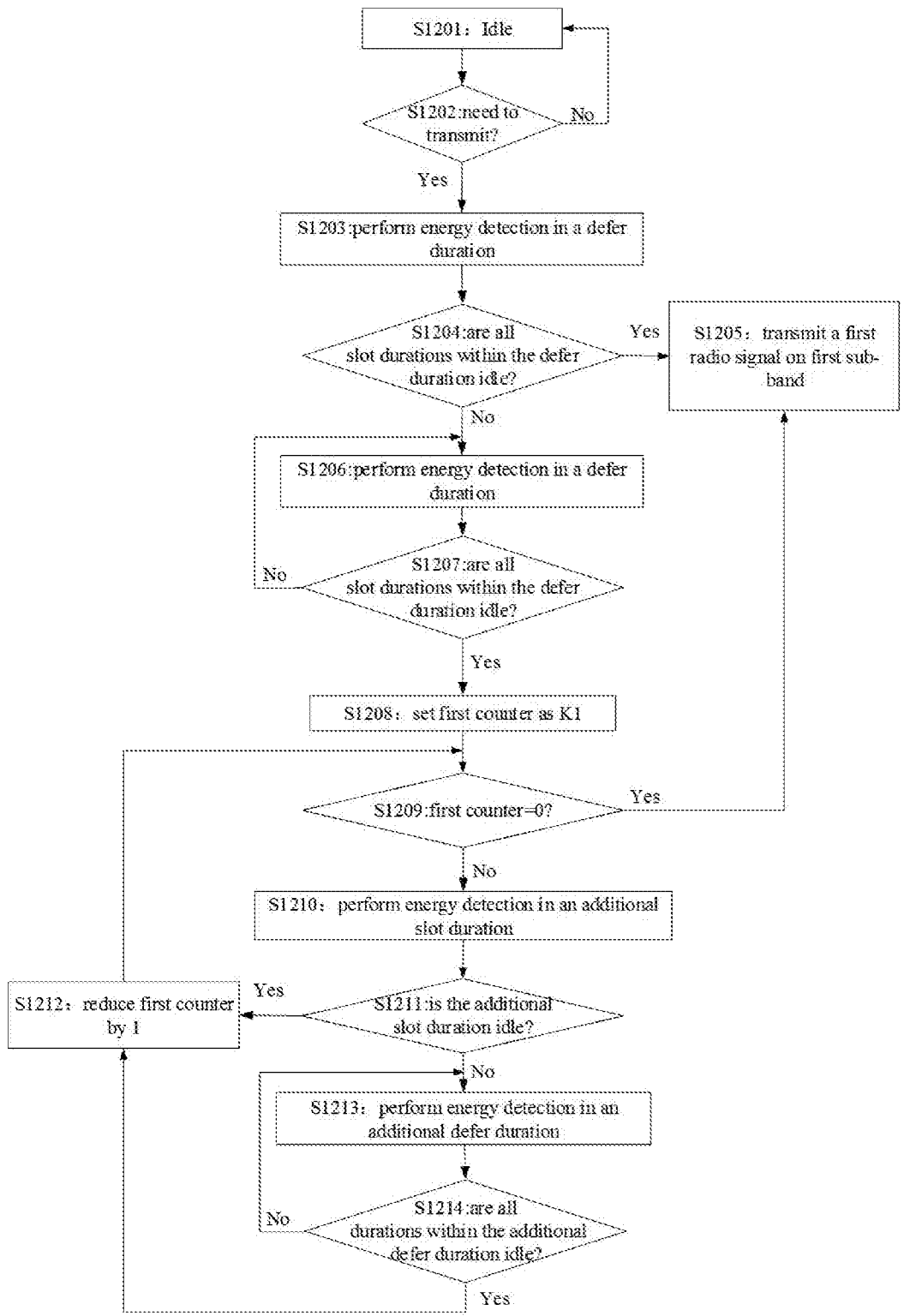
FIG. 12 illustrates a schematic diagram of a given access detection according to one embodiment of the present disclosure.

Embodiment 12 illustrates a schematic diagram of a given access detection, as shown in FIG. 12. The given access detection is one of the first-type access detection of the present disclosure, the given second-type access detection of the present disclosure or the third-type access detection of the present disclosure.

In Embodiment 12, the given access detection comprises: performing T energy detection(s) respectively in T time sub-pool(s) in the first sub-band of the present disclosure to obtain T detection value(s); herein, each of T1 detection value(s) among the T detection value(s) is lower than a reference threshold; T is a positive integer, and T1 is a positive integer no greater than the T. T1 time sub-pool(s) is(are) time sub-pool(s) respectively corresponding to the T1 detection value(s) among the T time sub-pool(s). The process of the T energy detection(s) can be depicted by the flowchart in FIG. 12. If the given access detection is the first-type access detection, T is equal to the Q of the present disclosure, T1 is equal to the Q1 of the present disclosure, and the reference threshold is the fourth threshold of the present disclosure; if the given access detection is the given second-type access detection, T is equal to the P of the present disclosure, T1 is equal to the P1 of the present disclosure, and the reference threshold is the fifth threshold of the present disclosure; if the given access detection is the third-type access detection, T is equal to the W of the present disclosure, T1 is equal to the W1 of the present disclosure, and the reference threshold is the seventh threshold of the present disclosure.

In Embodiment 12, a given node is idle in step S1201, and determines in step S1202 whether there is need to transmit; performs energy detection in a defer duration in step S1203; and determine in step S1204 whether all slot durations within the defer duration are idle, if yes, move forward to step S1205 to transmit a radio signal in the first sub-band of the present disclosure; otherwise move forward to step S1206 to perform energy detection in a defer duration; and determines in step S1207 whether all slot durations within the defer duration are idle, if yes, move forward to step S1208 to set a first counter as K1; otherwise go back to step S1206; the given node determines whether the first counter is 0 in step S1209, if yes, move back to step S1205 to transmit a radio signal in the first sub-band; otherwise move forward to step S1210 to perform energy in an additional slot duration; the given node determine in step S1211 whether the additional slot duration is idle, if yes, move forward to step S1212 to reduce the first counter by 1 and then go back to step S1209; otherwise move forward to step S1213 to perform energy detection in an additional defer duration; and determines in step S1214 whether all slot durations within the additional defer duration are idle, if yes, move back to step S1212; otherwise go back to step S1213. If the given access detection is the first-type access detection, the given node is the UE of the present disclosure; if the given access detection is the given second-type access detection or the third-type access detection, the given node is the base station of the present disclosure. K1 is one of K candidate integer(s), where K is a positive integer.

In Embodiment 12, a first given duration comprises a positive integer number of time sub-pool(s) of the T time sub-pool(s), and the first given duration is any duration of all defer durations, all additional slot durations, and all additional defer durations comprised in FIG. 12. A second given duration comprises one of the T1 time sub-pool(s), and the second given duration is any duration of all additional slot durations and all additional defer durations in FIG. 12, which is determined as idle through energy detection.

In one embodiment, the T1 is equal to 0, and the given node determines in the step S1204 that all slot durations within the defer duration are idle.

In one embodiment, the T1 is equal to the K1, and the given node determines in the step S1204 that not all slot durations within the defer duration are idle, the given access detection being either the first-type access detection or the third-type access detection.

In one embodiment, the T1 is equal to the K1, and the given node determines in the step S1204 that not all slot durations within the defer duration are idle, the given access detection being the given second-type access detection, and the given second-type access detection corresponding to one of the M2 second radio signal(s).

In one embodiment, the T1 is equal to the K1, and the given node determines in the step S1204 that not all slot durations within the defer duration are idle, the given access detection being the given second-type access detection, and the given second-type access detection corresponding to one of the M1 first-type time window(s).

Embodiment 13

Figure 13:
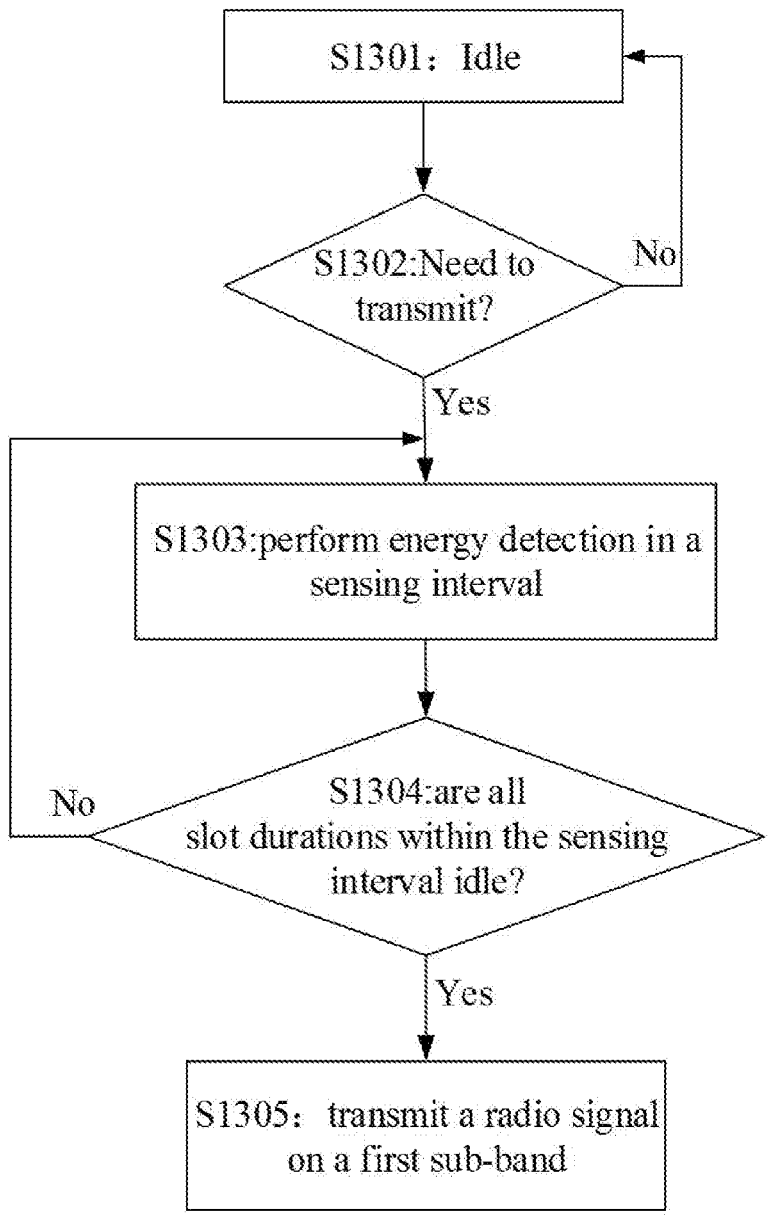
FIG. 13 illustrates a schematic diagram of a given access detection according to one embodiment of the present disclosure.

Embodiment 13 illustrates a schematic diagram of a given access detection; as shown in FIG. 13. The given access detection is one of the first-type access detection of the present disclosure, the given second-type access detection of the present disclosure or the third-type access detection of the present disclosure.

In Embodiment 13, the given access detection comprises: performing T energy detection(s) respectively in T time sub-pool(s) in the first sub-band of the present disclosure to obtain T detection value(s); herein, each of T1 detection value(s) among the T detection value(s) is lower than a reference threshold; T is a positive integer, and T1 is a positive integer no greater than the T. T1 time sub-pool(s) is(are) time sub-pool(s) respectively corresponding to the T1 detection value(s) among the T time sub-pool(s). The process of the T energy detection(s) can be depicted by the flowchart in FIG. 13. If the given access detection is the first-type access detection, T is equal to the Q of the present disclosure, T1 is equal to the Q1 of the present disclosure, and the reference threshold is the fourth threshold of the present disclosure; if the given access detection is the given second-type access detection, T is equal to the P of the present disclosure, T1 is equal to the P1 of the present disclosure, and the reference threshold is the fifth threshold of the present disclosure; if the given access detection is the third-type access detection, T is equal to the W of the present disclosure, T1 is equal to the W1 of the present disclosure, and the reference threshold is the seventh threshold of the present disclosure.

In Embodiment 13, a given node is idle in step S1301, and determines in step S1302 whether there is need to transmit; performs energy detection in a sensing interval in step S1303; and determines in step S1304 whether all slot durations within the sensing interval are idle, if yes, move forward to step S1305 to transmit a radio signal in the first sub-band of the present disclosure; otherwise go back to step S1303. If the given access detection is the first-type access detection, the given node is the UE of the present disclosure; if the given access detection is the given second-type access detection or the third-type access detection, the given node is the base station of the present disclosure.

In Embodiment 13, a first given duration comprises a positive integer number of time sub-pool(s) of the T time sub-pool(s), and the first given duration is any duration of all sensing intervals comprised in FIG. 13. A second given duration comprises one of the T1 time sub-pool(s), and the second given duration is a sensing interval in FIG. 13, which is determined as idle through energy detection.

In one embodiment, the T1 is equal to 2.
In one embodiment, the T1 is equal to the T.
In one embodiment, the T1 is less than the T.
In one embodiment, the T1 is less than 2.
In one embodiment, the T1 is equal to 0.
In one embodiment, a sensing interval lasts 25 μs.
In one embodiment, a sensing interval comprises 2 slot durations, and the 2 slot durations are non-contiguous in time domain.

In one subembodiment, the 2 slot durations are spaced by a time interval of 7 μs.

In one embodiment, the T time sub-pool(s) comprises (comprise) listening time in Cat 2 LBT.

In one embodiment, the T time sub-pool(s) comprises (comprise) slots comprised in a sensing interval in Type2 UL channel access procedure, for the detailed definition of the sensing interval, refer to 3GPP TS36.213, section 15.2, and the given access detection is the first-type access detection.

In one subembodiment, the sensing interval lasts 25 μs.

In one embodiment, the T time sub-pool(s) comprises (comprise) $T_f$ and $T_{sl}$ in a sensing interval in Type2 UL channel access procedure, where the $T_f$ and the $T_{sl}$ are two time intervals and the detailed definitions of the the $T_f$ and the $T_{sl}$ can be found in 3GPP TS36.213, section 15.2.

In one subembodiment, the $T_f$ lasts 16 μs.
In one subembodiment, the $T_{sl}$ lasts 9 μs.
In one embodiment, a first time sub-pool of the T1 time sub-pools lasts 16 μs and a second time sub-pool of the T1 time sub-pools lasts 9 μs, T1 being equal to 2.

In one embodiment, each of the T1 time sub-pools lasts 9 μs; a first time sub-pool and a second time sub-pool of the T1 time sub-pools are spaced by a time interval of 7 μs, T1 being equal to 2.

Embodiment 14

Figure 14:
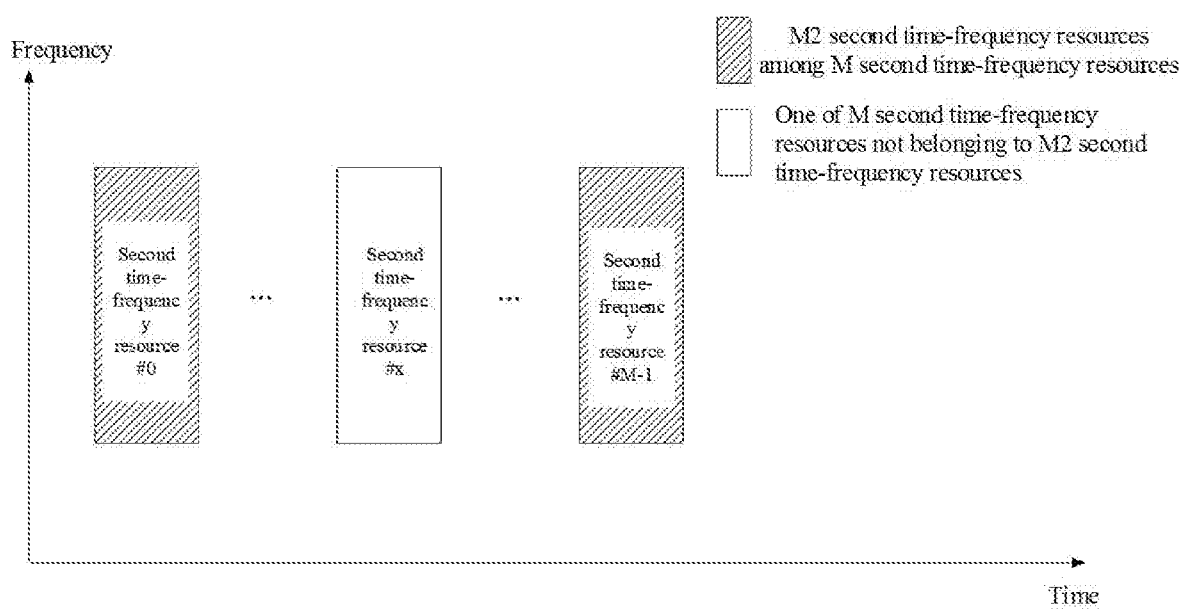
FIG. 14 illustrates a schematic diagram of resource mapping of M second time-frequency resources in time-frequency domain according to one embodiment of the present disclosure.

Embodiment 14 illustrates a schematic diagram of resource mapping of M second time-frequency resources in time-frequency domain; as shown in FIG. 14.

In Embodiment 14, the UE of the present disclosure monitors the M second radio signals respectively in the M second time-frequency resources and detects M2 second radio signals of the M second radio signals. M2 second time-frequency resources are second time-frequency resources of the M second time-frequency resources respectively corresponding to the M2 second radio signals. Any of the M second time-frequency resources comprises a positive integer number of contiguous subcarriers in frequency domain.

In FIG. 14, indexes of the M second time-frequency resources are #0, . . . #x . . . , and #M−1, respectively, where x is a positive integer less than M−1. The blank box represents one of M second time-frequency resources not belonging to M2 second time-frequency resources, while each slash-filled box represents one of M2 second time-frequency resources among M second time-frequency resources.

In one embodiment, the base station of the present disclosure transmits the M2 second radio signals respectively in the M2 second time-frequency resources.

In one embodiment, the base station of the present disclosure drops transmitting a corresponding second radio signal in any of the M second time-frequency resources not belonging to the M2 second time-frequency resources.

In one embodiment, time resources occupied by the M second time-frequency resources are mutually orthogonal (i.e., non-overlapping).

In one embodiment, any of the M second time-frequency resources comprises a positive integer number of multicarrier symbol(s) in time domain.

In one embodiment, any of the M second time-frequency resources comprises a positive integer number of contiguous multicarrier symbols in time domain.

In one embodiment, any of the M second time-frequency resources comprises a positive integer number of contiguous PRBs in frequency domain.

In one embodiment, any of the M second time-frequency resources comprises a positive integer number of contiguous RBs in frequency domain.

In one embodiment, time resources respectively occupied by any two of the M second time-frequency resources are of equal size.

In one embodiment, frequency resources respectively occupied by any two of the M second time-frequency resources are of equal size.

Embodiment 15

Figure 15:
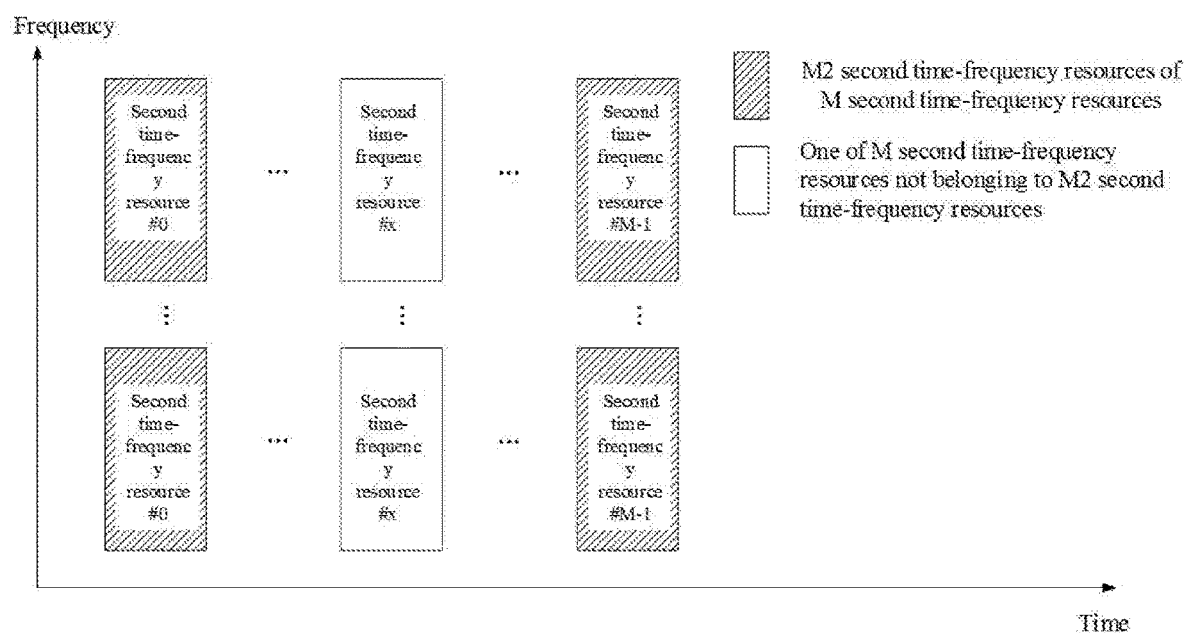
FIG. 15 illustrates a schematic diagram of resource mapping of M second time-frequency resources in time-frequency domain according to one embodiment of the present disclosure.

Embodiment 15 illustrates a schematic diagram of resource mapping of M second time-frequency resource(s) in time-frequency domain; as shown in FIG. 15.

In Embodiment 15, the UE of the present disclosure monitors the M second radio signals respectively in the M second time-frequency resources and detects M2 second radio signals of the M second radio signals. M2 second time-frequency resources are second time-frequency resources of the M second time-frequency resources respectively corresponding to the M2 second radio signals. Any of the M second time-frequency resources comprises a positive integer number of non-contiguous subcarriers in frequency domain.

In FIG. 15, indexes of the M second time-frequency resources are #0, . . . #x . . . , and #M−1, respectively, where x is a positive integer less than M−1. The blank box represents one of M second time-frequency resources not belonging to M2 second time-frequency resources, while each slash-filled box represents one of M2 second time-frequency resources among M second time-frequency resources.

In one embodiment, any of the M second time-frequency resources comprises a positive integer number of non-contiguous PRBs in frequency domain.

In one embodiment, any of the M second time-frequency resources comprises a positive integer number of non-contiguous RBs in frequency domain.

Embodiment 16

Figure 16:
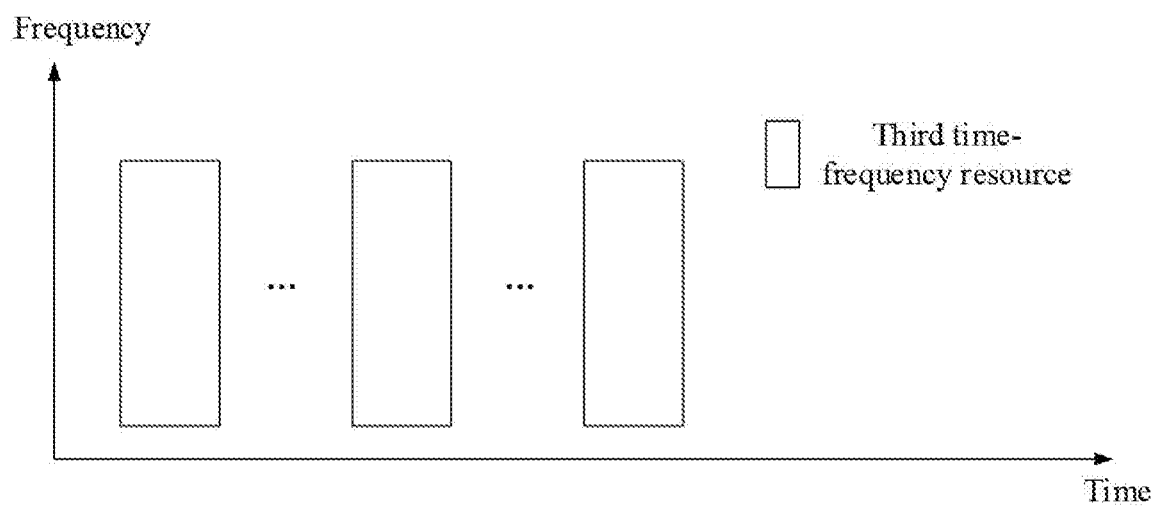
FIG. 16 illustrates a schematic diagram of resource mapping of a third time-frequency resource in time-frequency domain according to one embodiment of the present disclosure.

Embodiment 16 illustrates a schematic diagram of resource mapping of a third time-frequency resource in time-frequency domain; as shown in FIG. 16.

In Embodiment 16, the UE of the present disclosure monitors the second signaling of the present disclosure in the third time-frequency resource. The third time-frequency resource occurs multiple times in time domain, and the third time-frequency resource comprises a positive integer number of contiguous subcarriers in frequency domain.

In one embodiment, the third time-frequency resource is a COntrol REsource SET (CORESET).

In one embodiment, the third time-frequency resource is a dedicated CORESET.

In one embodiment, the third time-frequency resource is a search space.

In one embodiment, the third time-frequency resource is a dedicated search space.

In one embodiment, the third time-frequency resource comprises a positive integer number of multicarrier symbol(s) in time domain.

In one embodiment, the third time-frequency resource comprises a positive integer number of non-contiguous multicarrier symbols in time domain.

In one embodiment, the third time-frequency resource comprises a positive integer number of contiguous PRBs in frequency domain.

In one embodiment, the third time-frequency resource comprises a positive integer number of contiguous RBs in frequency domain.

In one embodiment, any two adjacent occurrences of the third time-frequency resource in time domain are spaced by an equal time interval.

Embodiment 17

Figure 17:
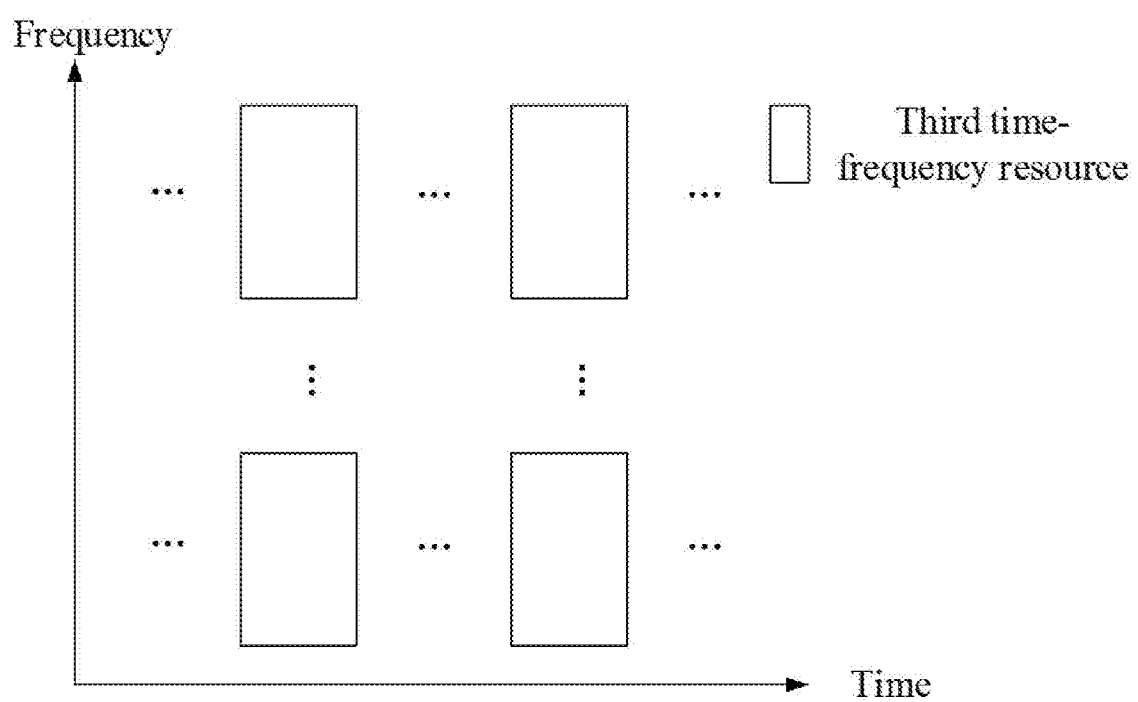
FIG. 17 illustrates a schematic diagram of resource mapping of a third time-frequency resource in time-frequency domain according to one embodiment of the present disclosure.

Embodiment 17 illustrates a schematic diagram of resource mapping of a third time-frequency resource in time-frequency domain; as shown in FIG. 17.

In Embodiment 17, the UE of the present disclosure monitors the second signaling of the present disclosure in the third time-frequency resource. The third time-frequency resource occurs multiple times in time domain, and the third time-frequency resource comprises a positive integer number of non-contiguous subcarriers in frequency domain.

In one embodiment, the third time-frequency resource comprises a positive integer number of non-contiguous PRBs in frequency domain.

In one embodiment, the third time-frequency resource comprises a positive integer number of non-contiguous RBs in frequency domain.

Embodiment 18

Figure 18:
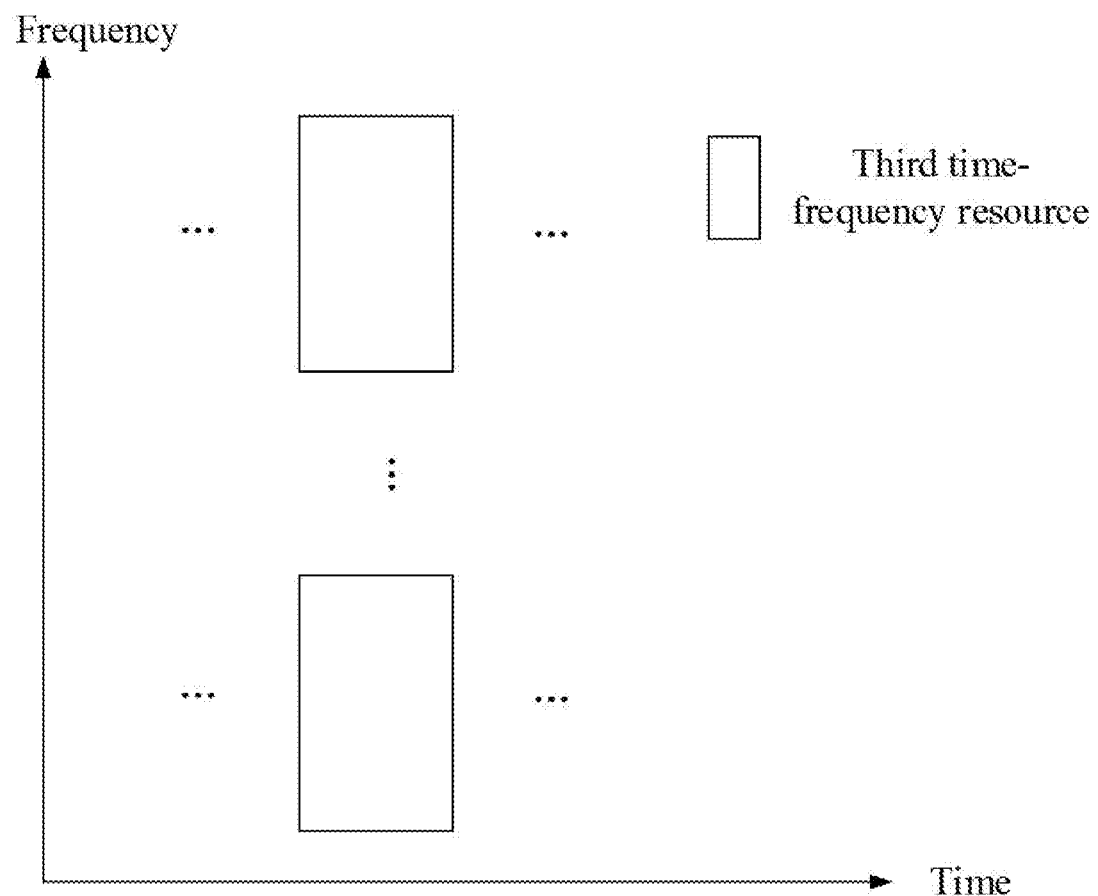
FIG. 18 illustrates a schematic diagram of resource mapping of a third time-frequency resource in time-frequency domain according to one embodiment of the present disclosure.

Embodiment 18 illustrates a schematic diagram of resource mapping of a third time-frequency resource in time-frequency domain; as shown in FIG. 18.

In Embodiment 18, the UE of the present disclosure monitors the second signaling of the present disclosure in the third time-frequency resource. The third time-frequency resource occurs only once in time domain, and the third time-frequency resource comprises a positive integer number of non-contiguous subcarriers in frequency domain.

Embodiment 19

Figure 19:
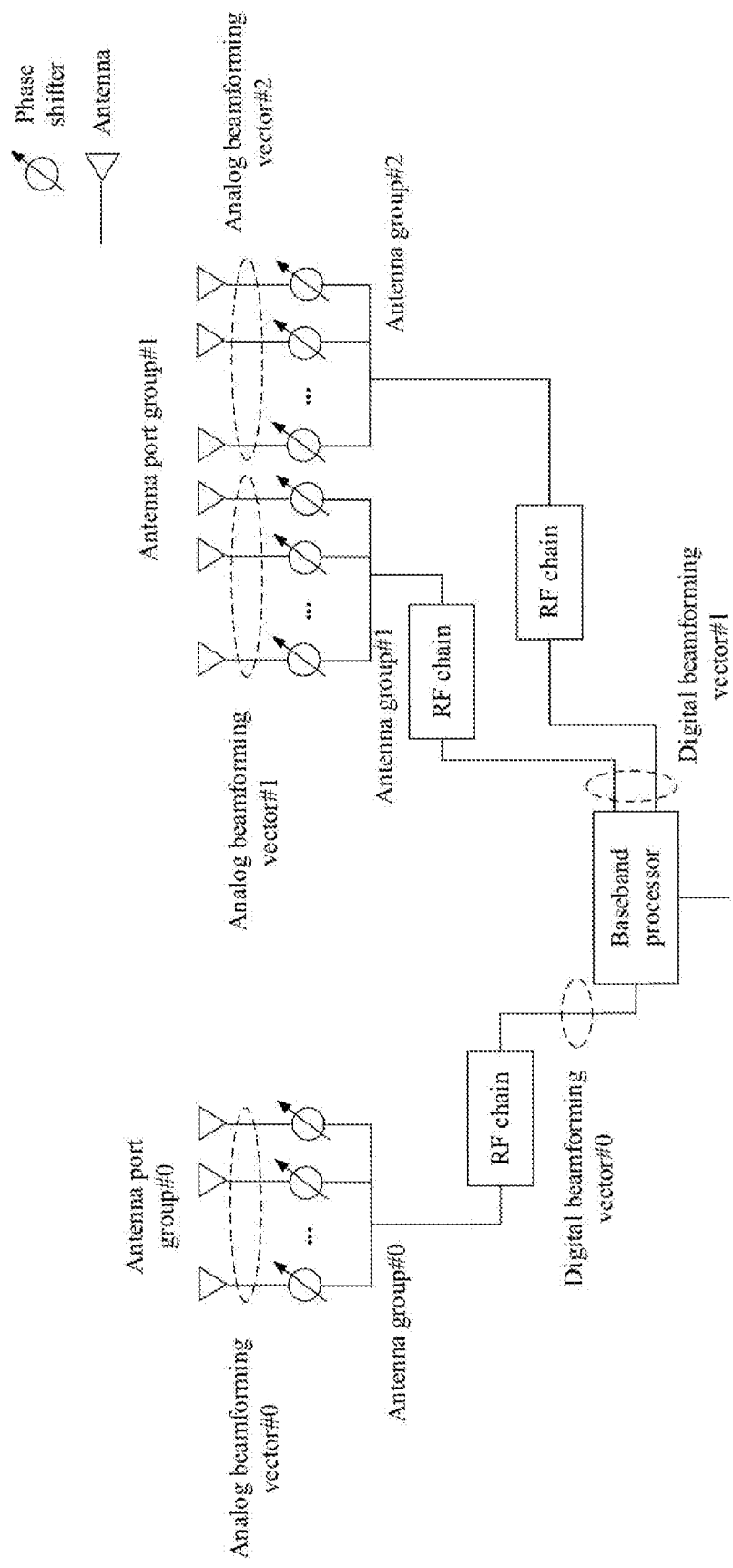
FIG. 19 illustrates a schematic diagram of antenna ports and antenna port groups according to one embodiment of the present disclosure.

Embodiment 19 illustrates a schematic diagram of antenna ports and antenna port groups; as shown in FIG. 19.

In Embodiment 19, an antenna port group comprises a positive integer number of antenna port(s); an antenna port is formed by superimposing antennas in a positive integer number of antenna group(s) through antenna virtualization; an antenna group comprises a positive integer number of antenna(s). An antenna group is connected to a baseband processor via a Radio Frequency (RF) chain, so different antenna groups correspond to different RF chains. Mapping coefficients of all antennas in a positive integer number of antenna group(s) comprised by a given antenna port to the given antenna port constitute a beamforming vector corresponding to the given antenna port. Mapping coefficients of multiple antennas in any given antenna group among a positive integer number of antenna group(s) comprised by the given antenna port to the given antenna port constitute an analog beamforming vector of the given antenna group. Analog beamforming vector(s) respectively corresponding to the positive integer number of antenna group(s) comprised by the given antenna port is(are) diagonally arranged to form an analog beamforming matrix corresponding to the given antenna port. Mapping coefficient(s) of the positive integer number of antenna group(s) comprised by the given antenna port to the given antenna port constitutes(constitute) a digital beamforming vector corresponding to the given antenna port. A beamforming vector corresponding to the given antenna port is a product of an analog beamforming matrix corresponding to the given antenna port and a digital beamforming vector corresponding to the given antenna port. Each of antenna ports in an antenna port group is composed of (a) same antenna group(s), while different antenna ports in a same antenna port group correspond to different beamforming vectors.

Two antenna port groups are presented in FIG. 19, which are antenna port group #0 and antenna port group #1. Herein, the antenna port group #0 is composed of antenna group #0, while the antenna port group #1 is composed of antenna group #1 and antenna group #2. Mapping coefficients of multiple antennas in the antenna group #0 to the antenna port group #0 constitute an analog beamforming vector #0, while a mapping coefficient of the antenna group #0 to the antenna port group #0 constitutes a digital beamforming vector #0. Mapping coefficients of multiple antennas in the antenna group #1 and of multiple antennas in the antenna group #2 to the antenna port group #1 respectively constitute an analog beamforming vector #1 and an analog beamforming vector #2; and mapping coefficients of the antenna group #1 and of the antenna group #2 to the antenna port group #1 constitute a digital beamforming vector #1. A beamforming vector corresponding to any antenna port in the antenna port group #0 is a product of the analog beamforming vector #0 and the digital beamforming vector #0. A beamforming vector corresponding to any antenna port in the antenna port group #1 is a product of the digital beamforming vector #1 and an analog beamforming matrix formed by diagonally arranging of the analog beamforming vector #1 and the analog beamforming vector #2.

In one embodiment, an antenna port group only comprises one antenna group, which is a RF chain, for instance, the antenna port group #0 in FIG. 19.

In one subembodiment, an analog beamforming matrix corresponding to an antenna port in the antenna port group is dimensionally reduced to an analog beamforming vector, and a digital beamforming vector corresponding to an antenna port in the antenna port group is dimensionally reduced to a scaler, and a beamforming vector corresponding to an antenna port in the antenna port group is equivalent to a corresponding analog beamforming vector. For example, the antenna port group #0 in FIG. 19 only comprises the antenna group #0, the digital beamforming vector #0 in FIG. 19 is dimensionally reduced to a scaler, and a beamforming vector corresponding to an antenna port in the antenna port group #0 is the analog beamforming vector #0.

In one subembodiment, the antenna port group comprises one antenna port.

In one embodiment, an antenna port group comprises multiple antenna groups, i.e., multiple RF chains, as exemplified by the antenna port group #1 in FIG. 19.

In one subembodiment, the antenna port group comprises multiple antenna ports.

In one subembodiment, each antenna port in the antenna port group corresponds to a same analog beamforming matrix.

In one subembodiment, each antenna port in the antenna port group corresponds to a different digital beamforming vector.

In one embodiment, antenna ports respectively comprised by different antenna port groups correspond to different analog beamforming matrixes.

In one embodiment, any two antenna ports in an antenna port group are QCL.

In one embodiment, any two antenna ports in an antenna port group are spatial QCL.

In one embodiment, small-scale channel parameters experienced by one radio signal transmitted by an antenna port can be used to infer small-scale channel parameters experienced by another radio signal transmitted by the antenna port.

In one subembodiment, the small-scale channel parameters include one or more of Channel Impulse Response (CIR), Precoding Matrix Indicator (PMI), CQI, and Rank Indicator (RI).

Embodiment 20

Figure 20:
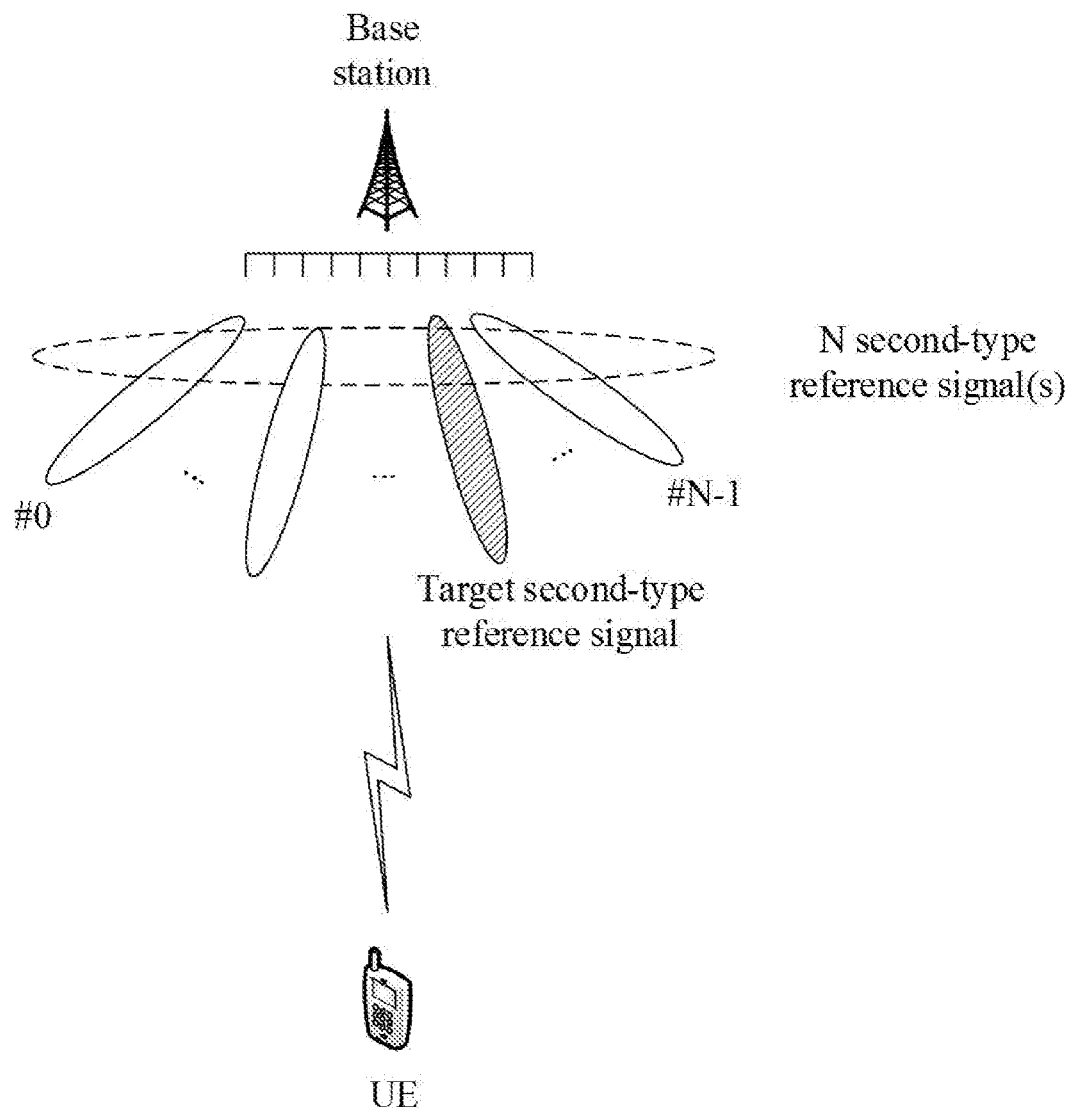
FIG. 20 illustrates a schematic diagram of relation between N second-type reference signal(s) and a first antenna port group according to one embodiment of the present disclosure.

Embodiment 20 illustrates a schematic diagram of relation between N second-type reference signal(s) and a first antenna port group; as shown in FIG. 20.

In Embodiment 20, the N second-type reference signal(s) is(are) respectively transmitted by N antenna port group(s); measurement(s) on the N second-type reference signal(s) is(are) used by the UE of the present disclosure to determine the first radio signal of the present disclosure; the first radio signal is used by the base station of the present disclosure to determine a first antenna port group, and the first antenna port group is one of the N antenna port group(s); any transmission antenna port of the second signaling of the present disclosure is QCL with one antenna port in the first antenna port group; the first radio signal is transmitted in the first time-frequency resource.

In FIG. 20, index(indexes) of the N second-type reference signal(s) is(are) respectively #0 . . . , and #N−1; the slash-filled ellipsis represents a target second-type reference signal, and the target second-type reference signal is one of the N second-type reference signal(s) transmitted by the first antenna port group.

In one embodiment, the Quasi-Co-Located is also called QCL.

In one embodiment, the Quasi-Co-Located refers to spatial QCL.

In one embodiment, measurement(s) on the N second-type reference signal(s) is(are) used to determine N received quality(qualities), among which a received quality corresponding to the target second-type reference signal is a greatest received quality.

In one subembodiment, each of the N received quality (qualities) is a RSRP.

In one subembodiment, each of the N received quality (qualities) is a RSRQ.

In one subembodiment, each of the N received quality (qualities) is a CQI.

In one subembodiment, each of the N received quality (qualities) is a Signal-to-Noise Ratio (SNR).

In one subembodiment, each of the N received quality (qualities) is a Signal-to-Interference plus Noise Ratio (SINR).

In one embodiment, the N is greater than 1.

In one embodiment, the first radio signal explicitly indicates the first antenna port group.

In one embodiment, the first radio signal implicitly indicates the first antenna port group.

In one embodiment, the first radio signal explicitly indicates an index of the first antenna port group among the N antenna port groups.

In one embodiment, the first radio signal implicitly indicates an index of the first antenna port group among the N antenna port groups.

In one embodiment, an index of the first antenna port group among the N antenna port groups is used by the UE to determine the first time-frequency resource.

In one embodiment, the first time-frequency resource is used by the base station to determine an index of the first antenna port group among the N antenna port groups.

In one embodiment, the first time-frequency resource belongs to a first time-frequency resource pool, wherein the first time-frequency resource pool comprises a positive integer number of time-frequency resource(s).

In one subembodiment, an index of the first time-frequency resource in the first time-frequency resource pool is used to determine the first antenna port group.

In one subembodiment, an index of the first time-frequency resource in the first time-frequency resource pool is used to determine an index of the first antenna port group among the N antenna port groups.

In one subembodiment, the first time-frequency resource is reserved for the UE.

In one subembodiment, the UE itself selects the first time-frequency resource from the first time-frequency resource pool.

In one embodiment, the first radio signal is generated by modulation of a first characteristic sequence.

In one subembodiment, an index of the first antenna port group among the N antenna port groups is used by the UE to determine the first characteristic sequence.

In one subembodiment, the first characteristic sequence is used by the base station to determine an index of the first antenna port group among the N antenna port groups.

In one subembodiment, the first characteristic sequence belongs to a first characteristic sequence set, and the first characteristic sequence set comprises a positive integer number of characteristic sequence(s).

In one reference embodiment of the above subembodiment, an index of the first characteristic sequence in the first characteristic sequence set is used to determine the first antenna port group.

In one reference embodiment of the above subembodiment, an index of the first characteristic sequence in the first characteristic sequence set is used to determine an index of the first antenna port group among the N antenna port groups.

In one reference embodiment of the above subembodiment, the first characteristic sequence set is reserved for the UE.

In one reference embodiment of the above subembodiment, the UE itself selects the first characteristic sequence from the first characteristic sequence set.

In one embodiment, the first radio signal is generated by modulation of a first characteristic sequence; the first time-frequency resource and the first characteristic sequence compose a first radio resource, the first radio resource belongs to a first radio resource pool, and the first radio resource pool comprises a positive integer number of radio resource(s), of which each comprises a time-frequency resource and a characteristic sequence.

In one subembodiment, an index of the first radio resource in the first radio resource pool is used to determine the first antenna port group.

In one subembodiment, an index of the first radio resource in the first radio resource pool is used to determine an index of the first antenna port group among the N antenna port groups.

In one subembodiment, the first radio resource pool is reserved for the UE.

In one subembodiment, the UE itself selects the first radio resource from the first radio resource pool.

In one embodiment, the first antenna port group comprises one antenna port.

In one embodiment, the first antenna port group comprises multiple antenna ports.

In one embodiment, the second signaling is transmitted by one antenna port.

In one embodiment, the second signaling is transmitted by multiple antenna ports.

In one embodiment, the phrase that the two antenna ports are QCL means that all or part of large-scale properties of a radio signal transmitted by one of the two antenna ports can be used to infer all or part of large-scale properties of a radio signal transmitted by the other of the two antenna ports; the large-scale properties include multi-antenna-related large-properties and multi-antenna-unrelated large-properties.

In one embodiment, multi-antenna-related large-scale properties of a given radio signal comprise one or more of angle of arrival, angle of departure, spatial correlation, Spatial Tx parameters and Spatial Rx parameters.

In one embodiment, Spatial Tx parameters comprise one or more of a transmission antenna port, a transmission antenna port group, a transmitting beam, a transmission analog beamforming matrix, a transmission analog beamforming vector, a transmission beamforming vector and a transmitting spatial filtering.

In one embodiment, Spatial Rx parameters comprise one or more of a receiving beam, a reception analog beamforming matrix, a reception analog beamforming vector, a reception beamforming vector and a receiving spatial filtering.

In one embodiment, multi-antenna-unrelated large-scale properties of a given radio signal comprise one or more of delay spread, Doppler spread, Doppler shift, path loss, average gain and average delay.

In one embodiment, the phrase that two antenna ports are QCL means that the two antenna ports at least share a same QCL parameter, which includes multi-antenna-related QCL parameters and multi-antenna-unrelated QCL parameters.

In one embodiment, the multi-antenna-related QCL parameters comprise one or more of angle of arrival, angle of departure, spatial correlation, Spatial Tx parameters, and Spatial Rx parameters.

In one embodiment, the multi-antenna-unrelated QCL parameters comprise one or more of delay spread, Doppler spread, Doppler shift, path loss and average gain.

In one embodiment, the phrase that two antenna ports are QCL means that at least one QCL parameter of one of the two antenna ports can be used to infer at least one QCL parameter of the other of the two antenna ports.

In one embodiment, the phrase that two antenna ports are spatial QCL means that all or part of multi-antenna-related large-scale properties of a radio signal transmitted by one of the two antenna ports can be used to infer all or part of multi-antenna-related large-scale properties of a radio signal transmitted by the other of the two antenna ports.

In one embodiment, the phrase that two antenna ports are spatial QCL means that there is at least one same multi-antenna-related QCL parameter (spatial QCL parameter) shared by the two antenna ports.

In one embodiment, the phrase that two antenna ports are spatial QCL means that at least one multi-antenna-related QCL parameter of one of the two antenna ports can be used to infer at least one multi-antenna-related QCL parameter of the other of the two antenna ports.

Embodiment 21

Figure 21:
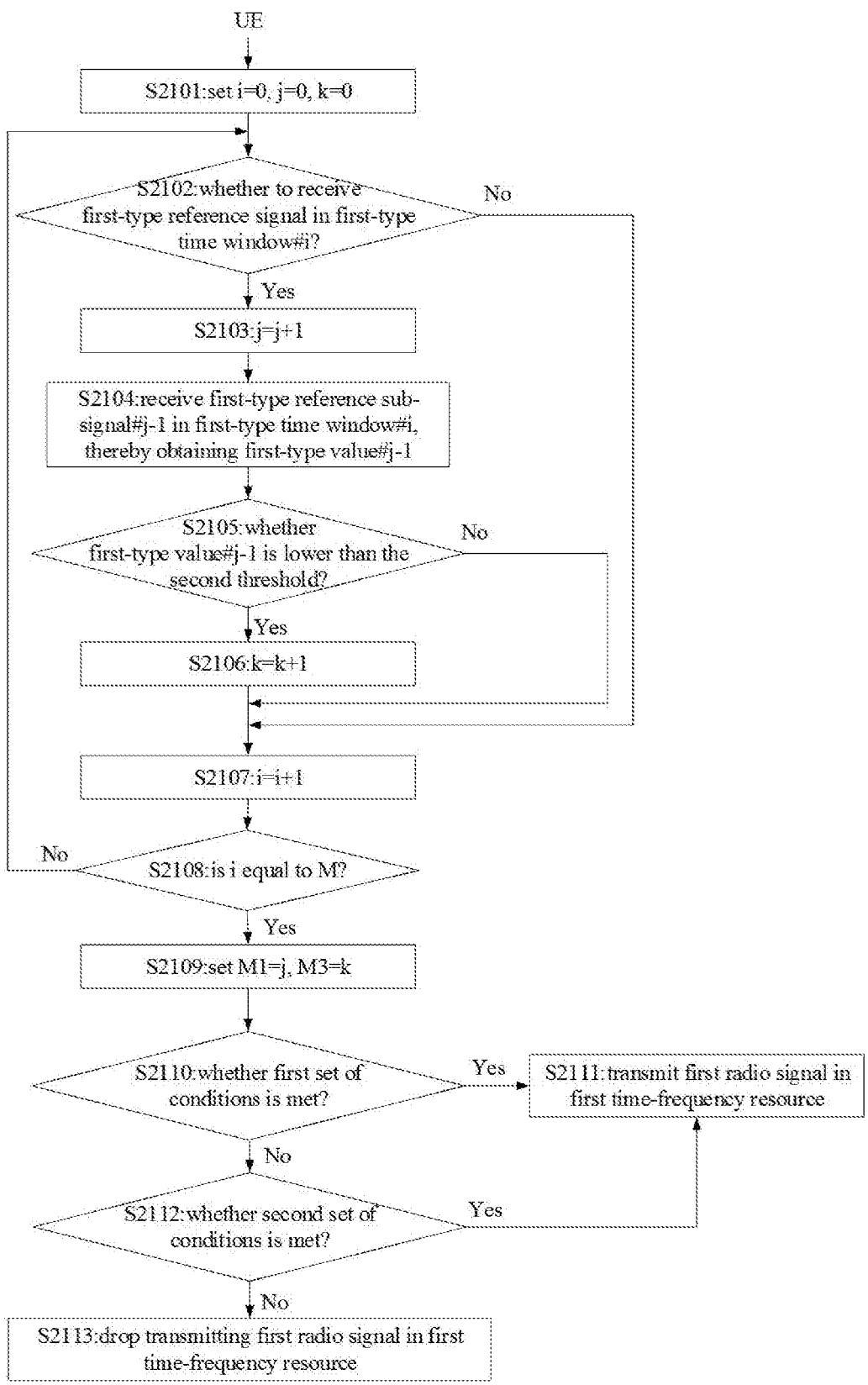
FIG. 21 illustrates a schematic diagram of a UE determining whether a first radio signal is transmitted in a first time-frequency resource according to one embodiment of the present disclosure.

Embodiment 21 illustrates a schematic diagram of a UE determining whether a first radio signal is transmitted in a first time-frequency resource; as shown in FIG. 21.

In Embodiment 21, M first-type time window(s) in the first sub-band of the present disclosure is(are) reserved for the first-type reference signal of the present disclosure. The UE determines that it is only needed to receive the first-type reference signal in M1 first-type time window(s) of the M first-type time window(s) in the first sub-band. The UE receives M1 first-type reference sub-signal(s) respectively in the M1 first-type time window(s), herein, the first-type reference signal comprises the M1 first-type reference sub-signal(s), and the M1 first-type time window(s) is(are) respectively reserved for the M1 first-type reference sub-signal(s). Measurement(s) on the M1 first-type reference sub-signal(s) is(are) respectively used to determine M1 first-type value(s); among the M1 first-type value(s) only M3 first-type value(s) is(are) lower than the second threshold. M1 and M3 are used by the UE to determine whether a first set of conditions and a second set of conditions are satisfied. When at least one of the first set of conditions or the second set of conditions is met, the UE transmits the first radio signal in the first time-frequency resource. When neither of the first set of conditions and the second set of conditions is met, the UE drops transmitting the first radio signal in the first time-frequency resource. The first set of conditions comprises that the M1 is no greater than a first threshold and that the M3 is greater than a third threshold; while the second set of conditions comprises that the M3 is greater than a sixth threshold.

The whole process of determination in Embodiment 21 is illustrated by FIG. 21. In FIG. 21, one of the M first-type time window(s) is represented by first-type time window #i, one of the M1 first-type reference sub-signal(s) is represented by first-type reference sub-signal #j, and one of the M1 first-type value(s) is represented by first-type value #j. Herein, i is a non-negative integer no greater than the M, and j is a non-negative integer no greater than the M1.

In FIG. 21, the UE first sets i=0, j=0, and k=0 in step S2101; determines in step S2102 whether the first-type reference signal is received in first-type time window #i of the M first-type time window(s); if yes, increase j by 1 in step S2103, otherwise move forward to step S2107; the UE receives first-type reference sub-signal #j−1 of the M1 first-type reference sub-signal(s) in the first-type time window #i in step S2104, thereby obtaining first-type value #j−1 of the M1 first-type value(s); and determines in step S2105 whether the first-type value #j−1 is lower than the second threshold, if yes, increase k by 1 in step S2106, otherwise move forward to step S2107; the UE increases the i by 1 in step S2107; and determines in step 2108 whether the i is equal to the M, if yes, move forward to step S2109, otherwise go back to step S2102; the UE sets M1=j, and M3=k in step S2109; and determines in step S2110 whether the first set of conditions is met, if yes, the UE transmits the first radio signal in the first time-frequency resource in step S2111, otherwise move forward to step S2112; and determines in step S2112 whether the second set of conditions is met, if yes, move back to step S2111, otherwise the UE drops transmitting the first radio signal in the first time-frequency resource in step S2113.

In one embodiment, the M1 first-type value(s) is(are) BLock Error Rate(s) (BLER), respectively.

In one embodiment, the M1 first-type value(s) is(are) hypothetical BLER (s), respectively.

In one embodiment, the M1 first-type value(s) is(are) Bit Error Rate(s) (BER), respectively.

In one embodiment, the M1 first-type value(s) is(are) hypothetical BER(s), respectively.

In one embodiment, the M1 first-type value(s) is(are) RSRP(s), respectively.

In one embodiment, the M1 first-type value(s) is(are) RSRQ(s), respectively.

In one embodiment, the M1 first-type value(s) is(are) CQI(s), respectively.

In one embodiment, the M1 first-type value(s) is(are) SNR(s), respectively.

In one embodiment, the M1 first-type value(s) is(are) SINR(s), respectively.

In one embodiment, measurement(s) on the M1 first-type reference sub-signal(s) is(are) respectively used to determine M1 received quality(qualities), and the M1 received quality(qualities) is(are) respectively used to determine M1 first-type value(s).

In one subembodiment, the M1 received quality(qualities) is(are) RSRP(s) respectively.

In one subembodiment, the M1 received quality(qualities) is(are) RSRQ(s) respectively.

In one subembodiment, the M1 received quality(qualities) is(are) CQI(s) respectively.

In one subembodiment, the M1 received quality(qualities) is(are) SNR(s) respectively.

In one subembodiment, the M1 received quality(qualities) is(are) SINR(s) respectively.

In one embodiment, the first threshold is a positive integer.

In one embodiment, the first threshold is unrelated to the M.

In one embodiment, the first threshold is related to the M.

In one embodiment, the first threshold is equal to a product of the M and a first factor, where the first factor is a positive real number greater than 0 and no greater than 1.

In one subembodiment, the first factor is fixed.

In one subembodiment, the first factor is configurable.

In one embodiment, the first threshold is equal to the M minus a first value, the first value being a positive integer no greater than the M.

In one subembodiment, the first value is fixed.

In one subembodiment, the first value is configurable.

In one embodiment, the first threshold is equal to the M.

In one embodiment, the first threshold is less than the M.

In one embodiment, the first threshold is fixed.

In one embodiment, the first threshold is configurable.

In one embodiment, the first threshold is UE-specific.

In one embodiment, the first threshold is cell-common.

In one embodiment, the first threshold is configured by a higher-layer signaling.

In one embodiment, the second threshold is a positive real number.

In one embodiment, the second threshold is a real number.

In one embodiment, the second threshold is fixed.

In one embodiment, the second threshold is configurable.

In one embodiment, the second threshold is UE-specific.

In one embodiment, the second threshold is cell-common.

In one embodiment, the second threshold is configured by a higher-layer signaling.

In one embodiment, the third threshold is a positive integer.

In one embodiment, the third threshold is fixed.

In one embodiment, the third threshold is configurable.

In one embodiment, the third threshold is UE-specific.

In one embodiment, the third threshold is cell-common.

In one embodiment, the third threshold is configured by a higher-layer signaling.

In one embodiment, if neither of the first set of conditions and the second set of conditions is met, the UE drops transmitting the first radio signal in the first time-frequency resource.

In one embodiment, the sixth threshold is greater than the third threshold.

In one embodiment, the sixth threshold is a positive integer.

In one embodiment, the sixth threshold is fixed.

In one embodiment, the sixth threshold is configurable.

In one embodiment, the sixth threshold is UE-specific.

In one embodiment, the sixth threshold is cell-common.

In one embodiment, the sixth threshold is configured by a higher-layer signaling.

In one embodiment, the first information of the present disclosure is used to determine the second set of conditions.

In one embodiment, positions of M3 first-type time windows among the M first-type time windows are consecutive, and the M3 first-type time windows are first-type time windows of the M first-type time windows respectively corresponding to the M3 first-type values.

In one embodiment, positions of M3 first-type time windows among the M first-type time windows are non-consecutive, and the M3 first-type time windows are first-type time windows of the M first-type time windows respectively corresponding to the M3 first-type values.

Embodiment 22

Figure 22:
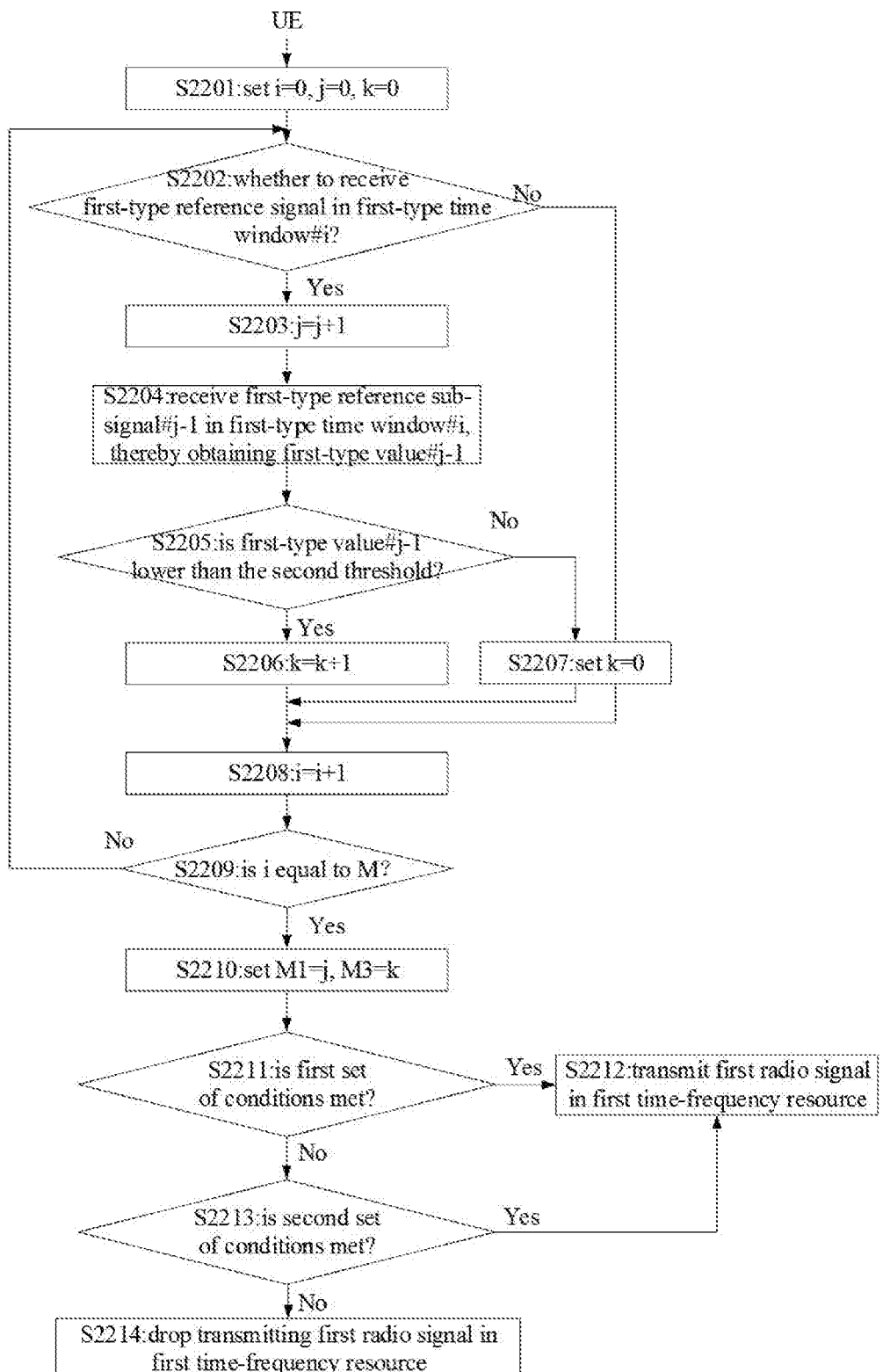
FIG. 22 illustrates a schematic diagram of a UE determining whether a first radio signal is transmitted in a first time-frequency resource according to one embodiment of the present disclosure.

Embodiment 22 illustrates a schematic diagram of a UE determining whether a first radio signal is transmitted in a first time-frequency resource; as shown in FIG. 22.

In Embodiment 22, M first-type time window(s) in the first sub-band of the present disclosure is(are) reserved for the first-type reference signal of the present disclosure. The UE determines that it is only needed to receive the first-type reference signal in M1 first-type time window(s) of the M first-type time window(s) in the first sub-band. The UE receives M1 first-type reference sub-signal(s) respectively in the M1 first-type time window(s), herein, the first-type reference signal comprises the M1 first-type reference sub-signal(s), and the M1 first-type time window(s) is(are) respectively reserved for the M1 first-type reference sub-signal(s). Measurement(s) on the M1 first-type reference sub-signal(s) is(are) respectively used to determine M1 first-type value(s); among the M1 first-type value(s) M3 first-type value(s) is(are) lower than the second threshold. M1 and M3 are used by the UE to determine whether a first set of conditions and a second set of conditions are satisfied. When at least one of the first set of conditions or the second set of conditions is met, the UE transmits the first radio signal in the first time-frequency resource. When neither of the first set of conditions and the second set of conditions is met, the UE drops transmitting the first radio signal in the first time-frequency resource. The first set of conditions comprises that the M1 is no greater than a first threshold and that the M3 is greater than a third threshold; while the second set of conditions comprises that the M3 is greater than a sixth threshold.

The whole process of determination in Embodiment 22 is illustrated by FIG. 22. In FIG. 22, one of the M first-type time window(s) is represented by first-type time window #i, one of the M1 first-type reference sub-signal(s) is represented by first-type reference sub-signal #j, and one of the M1 first-type value(s) is represented by first-type value #j. Herein, i is a non-negative integer no greater than the M, and j is a non-negative integer no greater than the M1.

In FIG. 22, the UE first sets i=0, j=0, and k=0 in step S2201; determines in step S2202 whether the first-type reference signal is received in first-type time window #i of the M first-type time window(s); if yes, increase j by 1 in step S2203, otherwise move forward to step S2208; the UE receives first-type reference sub-signal #j−1 of the M1 first-type reference sub-signal(s) in the first-type time window #i in step S2204, thereby obtaining first-type value #j−1 of the M1 first-type value(s); and determines in step S2205 whether the first-type value #j−1 is lower than the second threshold, if yes, increase k by 1 in step S2206, otherwise move forward to step S2207; the UE sets k=0 in step S2207; increases the i by 1 in step S2208; and determines in step 2209 whether the i is equal to the M, if yes, move forward to step S2210, otherwise go back to step S2202; the UE sets M1 j, and M3=k in step S2210; and determines in step S2211 whether the first set of conditions is met, if yes, the UE transmits the first radio signal in the first time-frequency resource in step S2212, otherwise move forward to step S2213; and determines in step S2213 whether the second set of conditions is met, if yes, move back to step S2212, otherwise the UE drops transmitting the first radio signal in the first time-frequency resource in step S2214.

In one embodiment, positions of the M3 first-type values among the M1 first-type values are consecutive.

In one embodiment, positions of the M3 first-type time windows among the M first-type time windows are consecutive, and the M3 first-type time windows are first-type time windows of the M first-type time windows respectively corresponding to the M3 first-type values.

In one embodiment, among the M1 first-type value(s) only the M3 first-type value(s) is(are) lower than a second threshold.

In one embodiment, among first-type value(s) of the M1 first-type values other than the M3 first-type value(s) there is at least one first-type value lower than the second threshold.

Embodiment 23

Figure 23:
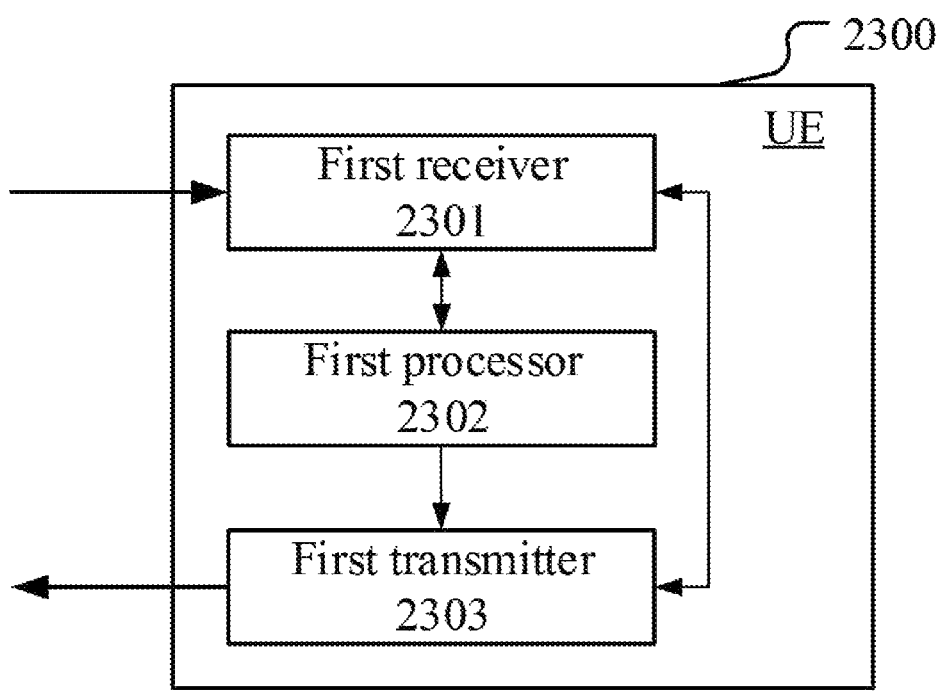
FIG. 23 illustrates a structure block diagram of a processing device in a UE according to one embodiment of the present disclosure.

Embodiment 23 illustrates a structure block diagram of a processing device in a UE; as shown in FIG. 23. In FIG. 23, a processing device 2300 in a UE comprises a first receiver 2301, a first processor 2302 and a first transmitter 2303.

In Embodiment 23, the first receiver 2301 receives a first signaling, the first signaling is used to indicate M first-type time window(s) in a first sub-band, and the M first-type time window(s) in the first sub-band is(are) reserved for a first-type reference signal; the first processor 2302 determines that it is only needed to receive the first-type reference signal in M1 first-type time window(s) of the M first-type time window(s) in the first sub-band; the first transmitter 2303 transmits a first radio signal in a first time-frequency resource when a first set of conditions is met.

In Embodiment 23, the M is a positive integer, the M1 is a positive integer no greater than the M, and the first set of conditions comprises that the M1 is no greater than a first threshold.

In one embodiment, the first receiver 2301 receives M1 first-type reference sub-signal(s) respectively in the M1 first-type time window(s); herein, the first-type reference signal comprises the M1 first-type reference sub-signal(s), the M1 first-type time window(s) respectively being reserved for the M1 first-type reference sub-signal(s); measurement(s) on the M1 first-type reference sub-signal(s) is(are) respectively used to determine M1 first-type value(s), among the M1 first-type value(s) there is(are) M3 first-type value(s) lower than a second threshold; the first set of conditions comprises that M3 is greater than a third threshold.

In one embodiment, the first receiver 2301 monitors M second radio signal(s) respectively in M second time-frequency resource(s), and detects M2 second radio signal(s) of the M second radio signal(s); herein, the M second radio signal(s) respectively corresponds(correspond) to the M first-type time window(s); among the M2 second radio signal(s) there is(are) M1 second radio signal(s) being respectively used to indicate that the first-type reference signal is to be received in the M1 first-type time window(s).

In one subembodiment, the M2 is equal to the M1.

In one subembodiment, the M2 is greater than the M1, any second radio signal of the M2 second radio signals other than the M1 second radio signal(s) is used to indicate that the first-type reference signal is not to be received in a corresponding first-type time window.

In one embodiment, the first receiver 2301 performs a first-type access detection in the first sub-band; herein, the UE transmits the first radio signal in the first time-frequency resource, the first radio signal being transmitted in the first sub-band, and the first-type access detection comprising:

performing Q energy detection(s) respectively in Q time sub-pool(s) in the first sub-band to obtain Q detection value(s);

herein each of Q1 detection value(s) among the Q detection value(s) is lower than a fourth threshold; Q being a positive integer, and Q1 being a positive integer no greater than the Q.

In one embodiment, the first receiver 2301 monitors a second signaling in a third time-frequency resource; herein, the second signaling is used to determine that the first radio signal is correctly received.

In one embodiment, the first radio signal is used to determine a first antenna port group, and any transmission antenna port of the second signaling is QCL with one antenna port in the first antenna port group.

In one embodiment, the first receiver 2301 receives N second-type reference signal(s); herein, measurement(s) on the N second-type reference signal(s) is(are) used to determine the first radio signal, N being a positive integer.

In one embodiment, the first receiver 2301 receives first information; herein, the first information is used to determine the first set of conditions.

In one embodiment, the first receiver 2301 comprises at least one of the antenna 452, the receiver 454, the receiving processor 456, the multi-antenna receiving processor 458, the controller/processor 459, the memory 460 or the data source 467 in Embodiment 4.

In one embodiment, the first processor 2302 comprises at least one of the receiving processor 456, the multi-antenna receiving processor 458, the controller/processor 459, the memory 460 or the data source 467 in Embodiment 4.

In one embodiment, the first transmitter 2303 comprises at least one of the antenna 452, the transmitter 454, the transmitting processor 468, the multi-antenna transmitting processor 457, the controller/processor 459, the memory 460 or the data source 467 in Embodiment 4.

Embodiment 24

Figure 24:
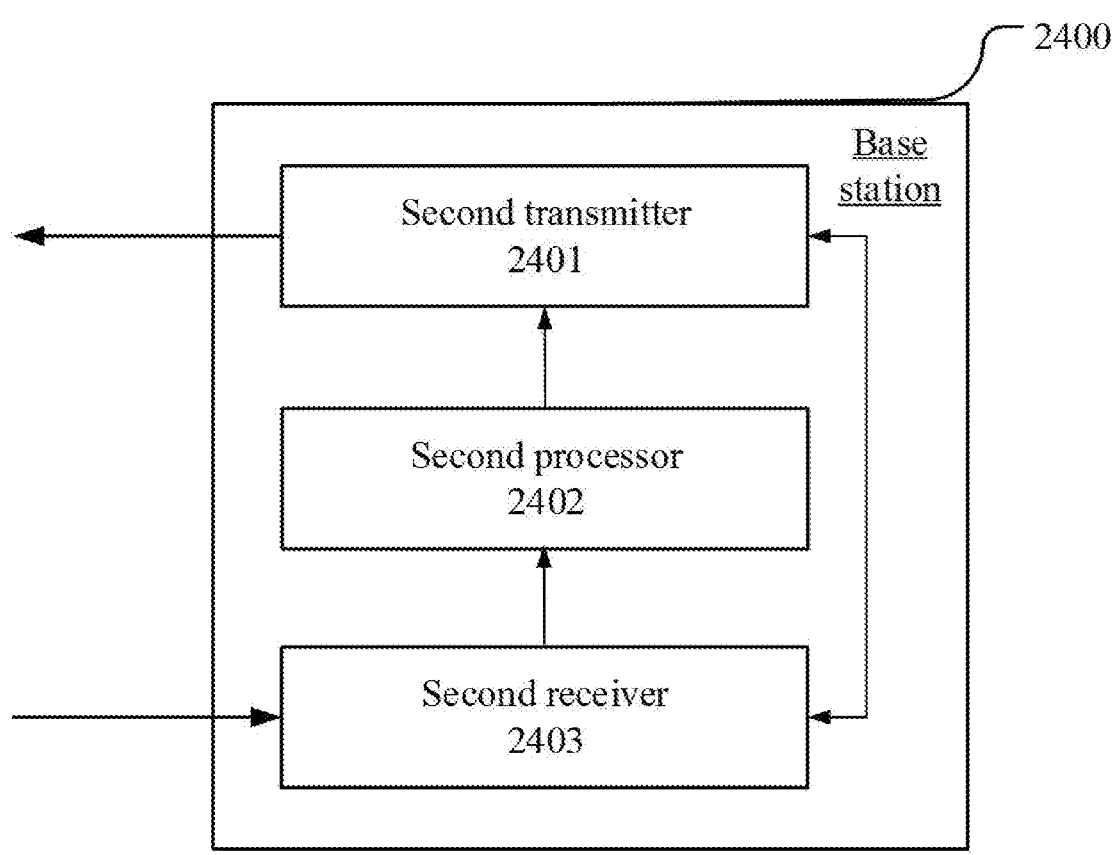
FIG. 24 illustrates a structure block diagram of a processing device in a base station according to one embodiment of the present disclosure.

Embodiment 24 illustrates a structure block diagram of a processing device in a base station; as shown in FIG. 24. In FIG. 24, a processing device 2400 in a base station comprises a second transmitter 2401, a second processor 2402 and a second receiver 2403.

In Embodiment 24, the second transmitter 2401 transmits a first signaling, the first signaling being used to indicate M first-type time window(s) in a first sub-band, the M first-type time window(s) in the first sub-band being reserved for a first-type reference signal; the second processor 2402 determines that it is only needed to receive the first-type reference signal in M1 first-type time window(s) of the M first-type time window(s) in the first sub-band; the second receiver 2403 monitors a first radio signal in a first time-frequency resource.

In Embodiment 24, the M is a positive integer, the M1 is a positive integer no greater than the M, a first set of conditions is used to determine whether the first radio signal is transmitted, and the first set of conditions comprises that the M1 is no greater than a first threshold.

In one embodiment, the second transmitter 2401 transmits M1 first-type reference sub-signal(s) respectively in the M1 first-type time window(s); herein, the first-type reference signal comprises the M1 first-type reference sub-signal(s), and the M1 first-type time window(s) is(are) respectively reserved for the M1 first-type reference sub-signal(s); measurement(s) on the M1 first-type reference sub-signal(s) is(are) respectively used to determine M1 first-type value(s), among the M1 first-type value(s) there is(are) M3 first-type value(s) lower than a second threshold; the first set of conditions comprises that M3 is greater than a third threshold.

In one embodiment, the second transmitter 2401 transmits M2 second radio signal(s) of M second radio signal(s) respectively in M2 second time-frequency resource(s); herein, the M second radio signal(s) respectively corresponds(correspond) to the M first-type time window(s); M1 second radio signal(s) of the M2 second radio signals is(are) respectively used to indicate that the first-type reference signal is to be received in the M1 first-type time window(s).

In one subembodiment, the M2 is equal to the M1.

In one subembodiment, the M2 is greater than the M1, any second radio signal of the M2 second radio signals other than the M1 second radio signal(s) is used to indicate that the first-type reference signal is not to be received in a corresponding first-type time window.

In one embodiment, the second receiver 2403 performs M second-type access detection(s) respectively in the first sub-band; herein, start time(s) for the M first-type window(s) is(are) no earlier than end time(s) for the M second-type access detection(s) respectively; a given second-type access detection comprises:

performing P energy detection(s) respectively in P time sub-pool(s) in the first sub-band to obtain P detection value(s);

herein the given second-type access detection is one of the M second-type access detection(s), and each of P1 detection value(s) among the P detection value(s) is lower than a fifth threshold; P is a positive integer, and P1 is a non-negative integer no greater than the P.

In one embodiment, the second transmitter 2401 transmits a second signaling in a third time-frequency resource; herein, the first radio signal is detected in the first time-frequency resource, and the second signaling is used to determine that the first radio signal is correctly received.

In one embodiment, the first radio signal is used to determine a first antenna port group, and any transmission antenna port of the second signaling is QCL with one antenna port in the first antenna port group.

In one embodiment, the second receiver 2403 performs a third-type access detection in the first sub-band; herein, a start time for time resources occupied by the third time-frequency resource is no earlier than an end time for the third-type access detection; the third-type access detection comprises:

performing W energy detection(s) respectively in W time sub-pool(s) in the first sub-band to obtain W detection value(s);

herein, each of W1 detection value(s) among the W detection value(s) is lower than a seventh threshold; W is a positive integer, and W1 is a positive integer no greater than the W.

In one embodiment, the second transmitter 2401 transmits N second-type reference signal(s); herein, measurement(s) on the N second-type reference signal(s) is(are) used to determine the first radio signal, N being a positive integer.

In one embodiment, the second transmitter 2401 transmits first information; herein, the first information is used to determine the first set of conditions.

In one embodiment, the second transmitter 2401 comprises at least one of the antenna 420, the transmitter 418, the transmitting processor 416, the multi-antenna transmitting processor 471, the controller/processor 475 or the memory 476 in Embodiment 4.

In one embodiment, the second processor 2402 comprises at least one of the receiving processor 470, the multi-antenna receiving processor 472, the controller/processor 475 or the memory 476 in Embodiment 4.

In one embodiment, the second receiver 2403 comprises at least one of the antenna 420, the receiver 418, the receiving processor 470, the multi-antenna receiving processor 472, the controller/processor 475 or the memory 476 in Embodiment 4.

Embodiment 25

Figure 25:
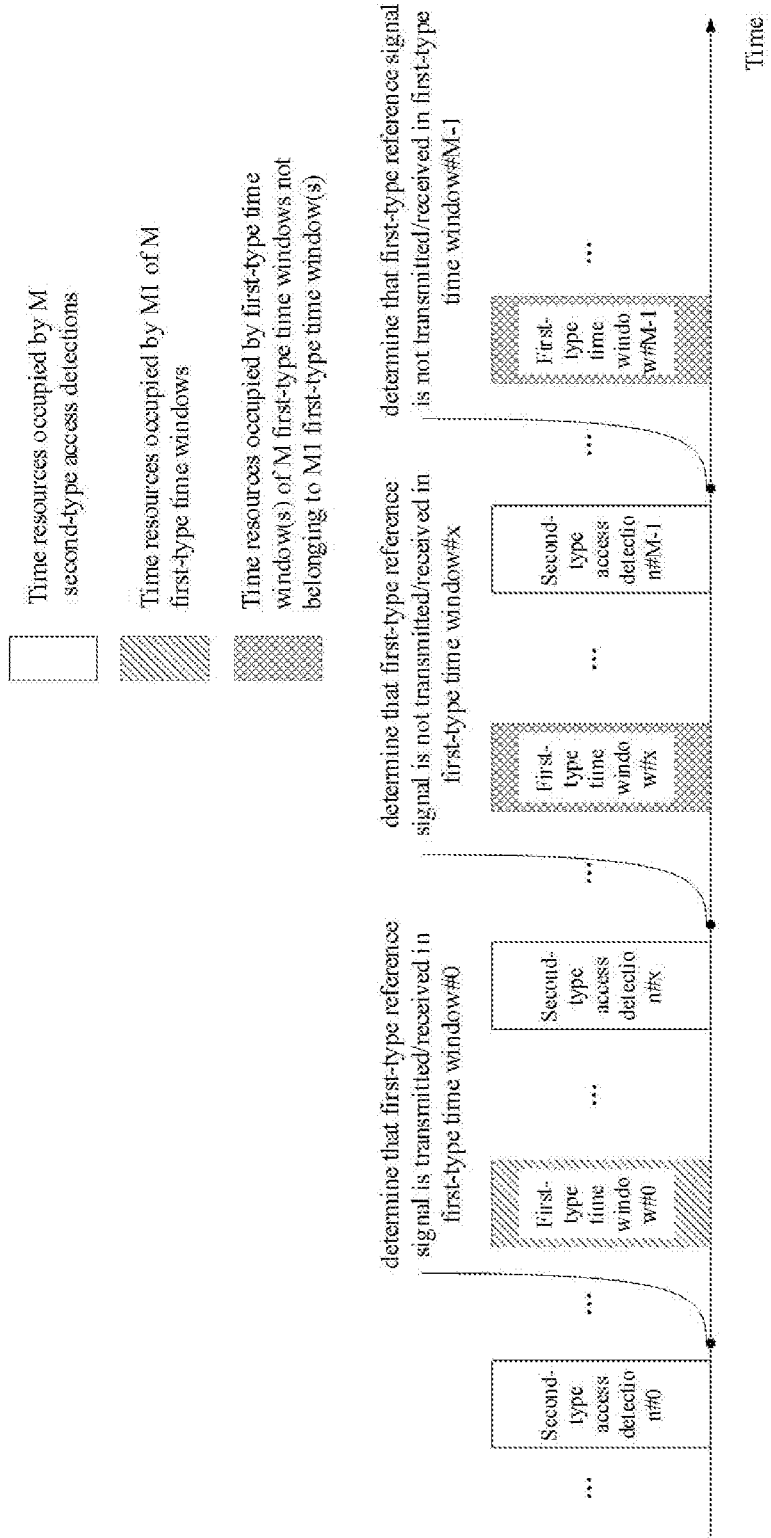
FIG. 25 illustrates a schematic diagram of sequential relation(s) of M first-type time window(s) and M second-type access detection(s) in time domain according to one embodiment of the present disclosure.

Embodiment 25 illustrates a schematic diagram of sequential relation(s) of M first-type time window(s) and M second-type access detection(s); as shown in FIG. 25.

In Embodiment 25, the M first-type time window(s) is(are) reserved for the first-type reference signal of the present disclosure, the UE of the present disclosure determines that it is only needed to receive the first-type reference signal in M1 first-type time window(s) of the M first-type time window(s) in the first sub-band, while the base station of the present disclosure determines that it is only needed to transmit the first-type reference signal in M1 first-type time window(s) of the M first-type time window(s) in the first sub-band. The base station determines whether the first-type reference signal is transmitted in the M first-type time window(s) respectively according to result(s) of the M second-type access detection(s). The M is a positive integer, and the M1 is a positive integer no greater than the M. Start time(s) for the M first-type time window(s) is(are) no earlier than end time(s) for the M second-type access detection(s) respectively.

In FIG. 25, indexes of the M first-type time windows and the M second-type access detections are #0 . . . , #x . . . , and #M−1, respectively, where x is a positive integer less than M−1. The base station determines that the first-type reference signal is transmitted in first-type time window #0 and that the first-type reference signal is not transmitted in first-type time window #x and first-type time window #M−1 respectively according to results of second-type access detection #0, second-type access detection #x and second-type access detection #M−1. The UE determines that the first-type reference signal is received in first-type time window #0, and that the first-type reference signal is not received in first-type time window #x and first-type time window #M−1. In FIG. 25, blank boxes represent time resources occupied by the M second-type access detections, back-slash-filled box represents time resources occupied by M1 of M first-type time windows, and cross-filled boxes represent time resources occupied by first-type time window(s) of M first-type time windows not belonging to M1 first-type time window(s).

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communications, comprising:

receiving a first signaling, the first signaling being used to indicate M first-type time window(s) in a first sub-band, the M first-type time window(s) in the first sub-band being reserved for a first-type reference signal, and M being a positive integer; and determining that it is only needed to receive the first-type reference signal in M1 first-type time window(s) of the M first-type time window(s) in the first sub-band, M1 being a positive integer no greater than the M;

in instances in which a first set of conditions is met, a first radio signal is transmitted in a first time-frequency resource;

wherein whether the first set of conditions is met is used to determine whether the first radio signal is transmitted;

the first set of conditions comprises that the M1 is no greater than a first threshold; and the first-type reference signal comprises CSI-RS, or, the first-type reference signal comprises either PSS or SSS or both.

2. The method according to claim 1, comprising:

receiving M1 first-type reference sub-signal(s) respectively in the M1 first-type time window(s);

wherein the first-type reference signal comprises the M1 first-type reference sub-signal(s), and the M1 first-type time window(s) is(are) respectively reserved for the M1 first-type reference sub-signal(s); measurement(s) on the M1 first-type reference sub-signal(s) is(are) respectively used to determine M1 first-type value(s), among the M1 first-type value(s) there is(are) M3 first-type value(s) lower than a second threshold; the first set of conditions comprises that M3 is greater than a third threshold.

3. The method according to claim 1, comprising:

monitoring M second radio signal(s) respectively in M second time-frequency resource(s), and detecting M2 second radio signal(s) of the M second radio signal(s);

wherein the M second radio signal(s) respectively corresponds(correspond) to the M first-type time window(s); among the M2 second radio signal(s) there is(are) M1 second radio signal(s) being respectively used to indicate that the first-type reference signal is to be received in the M1 first-type time window(s); the M2 is equal to the M1, or, the M2 is greater than the M1 and second radio signal(s) of the M2 second radio signals other than the M1 second radio signal(s) is(are) respectively used to indicate that the first-type reference signal is not to be received in (a) corresponding first-type time window(s).

4. The method according to claim 1, comprising at least one of:

performing a first-type access detection in the first sub-band; wherein the UE transmits the first radio signal in the first time-frequency resource, the first radio signal being transmitted in the first sub-band, and the first-type access detection comprising:

performing Q energy detection(s) respectively in Q time sub-pool(s) in the first sub-band to obtain Q detection value(s); wherein each of Q1 detection value(s) among the Q detection value(s) is lower than a fourth threshold; Q being a positive integer, and Q1 being a positive integer no greater than the Q;

receiving N second-type reference signal(s); wherein measurement(s) on the N second-type reference signal(s) is(are) used to determine the first radio signal, N being a positive integer; and receiving first information; wherein the first information is used to determine the first set of conditions.

5. The method according to claim 1, comprising:
monitoring a second signaling in a third time-frequency resource; wherein the second signaling is used to determine that the first radio signal is correctly received; or,
monitoring a second signaling in a third time-frequency resource; wherein the second signaling is used to determine that the first radio signal is correctly received; the first radio signal is used to determine a first antenna port group, and any transmission antenna port of the second signaling is QCL with one antenna port in the first antenna port group.

6. A method in a base station for wireless communications, comprising:
transmitting a first signaling, the first signaling being used to indicate M first-type time window(s) in a first sub-band, the M first-type time window(s) in the first sub-band being reserved for a first-type reference signal, and M being a positive integer;
determining that it is only needed to transmit the first-type reference signal in M1 first-type time window(s) of the M first-type time window(s) in the first sub-band, M1 being a positive integer no greater than the M; and
monitoring a first radio signal in a first time-frequency resource;
wherein whether a first set of conditions is met is used to determine whether the first radio signal is transmitted, and the first set of conditions comprises that the M1 is no greater than a first threshold; the first-type reference signal comprises CSI-RS, or, the first-type reference signal comprises either PSS or SSS or both.

7. The method according to claim 6, comprising:
transmitting M1 first-type reference sub-signal(s) respectively in the M1 first-type time window(s);
wherein the first-type reference signal comprises the M1 first-type reference sub-signal(s), and the M1 first-type time window(s) is(are) respectively reserved for the M1 first-type reference sub-signal(s); measurement(s) on the M1 first-type reference sub-signal(s) is(are) respectively used to determine M1 first-type value(s), among the M1 first-type value(s) there is(are) M3 first-type value(s) lower than a second threshold; the first set of conditions comprises that M3 is greater than a third threshold.

8. The method according to claim 6, comprising at least one of:
transmitting M2 second radio signal(s) of M second radio signal(s) respectively in M2 second time-frequency resource(s); wherein the M second radio signal(s) respectively corresponds(correspond) to the M first-type time window(s); among the M2 second radio signal(s) there is(are) M1 second radio signal(s) being respectively used to indicate that the first-type reference signal is to be received in the M1 first-type time window(s); the M2 is equal to the M1, or, the M2 is greater than the M1 and second radio signal(s) of the M2 second radio signals other than the M1 second radio signal(s) is(are) respectively used to indicate that the first-type reference signal is not to be received in (a) corresponding first-type time window(s);
transmitting N second-type reference signal(s); wherein measurement(s) on the N second-type reference signal(s) is(are) used to determine the first radio signal, N being a positive integer; and
transmitting first information; wherein the first information is used to determine the first set of conditions.

9. The method according to claim 6, comprising:
performing M second-type access detection(s) respectively in the first sub-band; wherein start time(s) for the M first-type time window(s) is(are) no earlier than end time(s) for the M second-type access detection(s) respectively; a given second-type access detection comprises:
performing P energy detection(s) respectively in P time sub-pool(s) in the first sub-band to obtain P detection value(s); wherein the given second-type access detection is one of the M second-type access detection(s), and each of P1 detection value(s) among the P detection value(s) is lower than a fifth threshold; P is a positive integer, and P1 is a non-negative integer no greater than the P.

10. The method according to claim 6, comprising:
transmitting a second signaling in a third time-frequency resource; wherein the first radio signal is detected in the first time-frequency resource, and the second signaling is used to determine that the first radio signal is correctly received;
or,
transmitting a second signaling in a third time-frequency resource; wherein the first radio signal is detected in the first time-frequency resource, and the second signaling is used to determine that the first radio signal is correctly received; the first radio signal is used to determine a first antenna port group, and any transmission antenna port of the second signaling is QCL with one antenna port in the first antenna port group;
or,
performing a third-type access detection in the first sub-band and transmitting a second signaling in a third time-frequency resource; wherein the first radio signal is detected in the first time-frequency resource, and the second signaling is used to determine that the first radio signal is correctly received; a start time for time resources occupied by the third time-frequency resource is no earlier than an end time for the third-type access detection; the third-type access detection comprises:
performing W energy detection(s) respectively in W time sub-pool(s) in the first sub-band to obtain W detection value(s); wherein each of W1 detection value(s) among the W detection value(s) is lower than a seventh threshold; W is a positive integer, and W1 is a positive integer no greater than the W.

11. A UE for wireless communications, comprising:
a first receiver, which receives a first signaling, the first signaling being used to indicate M first-type time window(s) in a first sub-band, the M first-type time window(s) in the first sub-band being reserved for a first-type reference signal, and M being a positive integer;
a first processor, which determines that it is only needed to receive the first-type reference signal in M1 first-type time window(s) of the M first-type time window(s) in the first sub-band, M1 being a positive integer no greater than the M; and
a first transmitter, which transmits a first radio signal in a first time-frequency resource in instances in which a first set of conditions is met;
wherein whether the first set of conditions is met is used to determine whether the first radio signal is transmitted; the first set of conditions comprises that the M1 is no greater than a first threshold; the first-type reference signal comprises CSI-RS, or, the first-type reference signal comprises either PSS or SSS or both.

12. The UE according to claim 11, wherein the first receiver receives M1 first-type reference sub-signal(s) respectively in the M1 first-type time window(s); wherein the first-type reference signal comprises the M1 first-type reference sub-signal(s), and the M1 first-type time window(s) is(are) respectively reserved for the M1 first-type reference sub-signal(s); measurement(s) on the M1 first-type reference sub-signal(s) is(are) respectively used to determine M1 first-type value(s), among the M1 first-type value(s) there is(are) M3 first-type value(s) lower than a second threshold; the first set of conditions comprises that M3 is greater than a third threshold.

13. The UE according to claim 11, wherein the first receiver monitors M second radio signal(s) respectively in M second time-frequency resource(s) and detects M2 second radio signal(s) of the M second radio signal(s); wherein the M second radio signal(s) respectively corresponds(correspond) to the M first-type time window(s); among the M2 second radio signal(s) there is(are) M1 second radio signal(s) being respectively used to indicate that the first-type reference signal is to be received in the M1 first-type time window(s); the M2 is equal to the M1, or, the M2 is greater than the M1 and second radio signal(s) of the M2 second radio signals other than the M1 second radio signal(s) is(are) respectively used to indicate that the first-type reference signal is not to be received in (a) corresponding first-type time window(s).

14. The UE according to claim 11, wherein the first receiver performs at least one of:
performing a first-type access detection in the first sub-band; wherein the UE transmits the first radio signal in the first time-frequency resource, the first radio signal being transmitted in the first sub-band, and the first-type access detection comprising:
performing Q energy detection(s) respectively in Q time sub-pool(s) in the first sub-band to obtain Q detection value(s); wherein each of Q1 detection value(s) among the Q detection value(s) is lower than a fourth threshold; Q being a positive integer, and Q1 being a positive integer no greater than the Q;
receiving N second-type reference signal(s); wherein measurement(s) on the N second-type reference signal(s) is(are) used to determine the first radio signal, N being a positive integer; and
receiving first information; wherein the first information is used to determine the first set of conditions.

15. The UE according to claim 11, wherein the first receiver monitors a second signaling in a third time-frequency resource; wherein the second signaling is used to determine that the first radio signal is correctly received; or, the first receiver monitors a second signaling in a third time-frequency resource; wherein the second signaling is used to determine that the first radio signal is correctly received; the first radio signal is used to determine a first antenna port group, and any transmission antenna port of the second signaling is QCL with one antenna port in the first antenna port group.

16. A base station for wireless communications, comprising:
a second transmitter, which transmits a first signaling, the first signaling being used to indicate M first-type time window(s) in a first sub-band, the M first-type time window(s) in the first sub-band being reserved for a first-type reference signal, and M being a positive integer;
a second processor, which determines that it is only needed to transmit the first-type reference signal in M1 first-type time window(s) of the M first-type time window(s) in the first sub-band, M1 being a positive integer no greater than the M; and
a second receiver, which monitors a first radio signal in a first time-frequency resource;
wherein whether a first set of conditions is met is used to determine whether the first radio signal is transmitted, and the first set of conditions comprises that the M1 is no greater than a first threshold; the first-type reference signal comprises CSI-RS, or, the first-type reference signal comprises either PSS or SSS or both.

17. The base station according to claim 16, wherein the second transmitter transmits M1 first-type reference sub-signal(s) respectively in the M1 first-type time window(s); wherein the first-type reference signal comprises the M1 first-type reference sub-signal(s), and the M1 first-type time window(s) is(are) respectively reserved for the M1 first-type reference sub-signal(s); measurement(s) on the M1 first-type reference sub-signal(s) is(are) respectively used to determine M1 first-type value(s), among the M1 first-type value(s) there is(are) M3 first-type value(s) lower than a second threshold; the first set of conditions comprises that M3 is greater than a third threshold.

18. The base station according to claim 16, wherein the second transmitter performs at least one of:
transmitting M2 second radio signal(s) of M second radio signal(s) respectively in M2 second time-frequency resource(s); wherein the M second radio signal(s) respectively corresponds(correspond) to the M first-type time window(s); among the M2 second radio signal(s) there is(are) M1 second radio signal(s) being respectively used to indicate that the first-type reference signal is to be received in the M1 first-type time window(s); the M2 is equal to the M1, or, the M2 is greater than the M1 and second radio signal(s) of the M2 second radio signals other than the M1 second radio signal(s) is(are) respectively used to indicate that the first-type reference signal is not to be received in (a) corresponding first-type time window(s);
transmitting N second-type reference signal(s); wherein measurement(s) on the N second-type reference signal(s) is(are) used to determine the first radio signal, N being a positive integer; and
transmitting first information; wherein the first information is used to determine the first set of conditions.

19. The base station according to claim 16, wherein the second receiver performs M second-type access detection(s) respectively in the first sub-band; wherein start time(s) for the M first-type time window(s) is(are) no earlier than end time(s) for the M second-type access detection(s) respectively; a given second-type access detection comprises:
performing P energy detection(s) respectively in P time sub-pool(s) in the first sub-band to obtain P detection value(s); wherein the given second-type access detection is one of the M second-type access detection(s), and each of P1 detection value(s) among the P detection value(s) is lower than a fifth threshold; P is a positive integer, and P1 is a non-negative integer no greater than the P.

20. The base station according to claim 16, wherein the second transmitter transmits a second signaling in a third time-frequency resource; wherein the first radio signal is detected in the first time-frequency resource, and the second signaling is used to determine that the first radio signal is correctly received;

or, the second transmitter transmits a second signaling in a third time-frequency resource; wherein the first radio signal is detected in the first time-frequency resource, and the second signaling is used to determine that the first radio signal is correctly received; the first radio signal is used to determine a first antenna port group, and any transmission antenna port of the second signaling is QCL with one antenna port in the first antenna port group;

or, the second receive performs a third-type access detection in the first sub-band, and the second transmitter transmits a second signaling in a third time-frequency resource; wherein the first radio signal is detected in the first time-frequency resource, and the second signaling is used to determine that the first radio signal is correctly received, a start time for time resources occupied by the third time-frequency resource is no earlier than an end time for the third-type access detection; the third-type access detection comprises:

performing W energy detection(s) respectively in W time sub-pool(s) in the first sub-band to obtain W detection value(s); wherein each of W1 detection value(s) among the W detection value(s) is lower than a seventh threshold; W is a positive integer, and W1 is a positive integer no greater than the W.

* * * * *